(12) United States Patent
Igarashi et al.

(10) Patent No.: US 10,198,392 B2
(45) Date of Patent: Feb. 5, 2019

(54) PERIPHERAL DEVICE, HOST DEVICE, AND PROCESSING METHOD

(71) Applicant: Sony Corporation, Tokyo (JP)

(72) Inventors: Go Igarashi, Tokyo (JP); Yasunobu Murata, Tokyo (JP); Kohei Asada, Kanagawa (JP); Tetsunori Itabashi, Kanagawa (JP); Mitsuhiro Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 81 days.

(21) Appl. No.: 15/301,735

(22) PCT Filed: Apr. 2, 2015

(86) PCT No.: PCT/JP2015/001890
§ 371 (c)(1),
(2) Date: Oct. 4, 2016

(87) PCT Pub. No.: WO2015/155963
PCT Pub. Date: Oct. 15, 2015

(65) Prior Publication Data
US 2017/0031859 A1 Feb. 2, 2017

(30) Foreign Application Priority Data
Apr. 11, 2014 (JP) .................. 2014-082138

(51) Int. Cl.
*G06F 13/40* (2006.01)
*G06F 13/42* (2006.01)
(Continued)

(52) U.S. Cl.
CPC ...... *G06F 13/4081* (2013.01); *G06F 13/4022* (2013.01); *G06F 13/4068* (2013.01);
(Continued)

(58) Field of Classification Search
CPC .... G06F 11/3051; G06F 3/16; G06F 13/4081; G06F 13/4022; H04R 1/10; H04R 1/06
See application file for complete search history.

(56) References Cited

U.S. PATENT DOCUMENTS 5,729,368 A 3/1998 Pugaczewski
2010/0284525 A1 11/2010 Sander et al.
(Continued)

FOREIGN PATENT DOCUMENTS

JP 3025870 U 4/1996
JP 2012-004734 A 1/2012
(Continued)

OTHER PUBLICATIONS

U.S. Appl. No. 14/893,741, filed Nov. 24, 2015, Ookuri et al.

*Primary Examiner* — Ernest Unelus
(74) *Attorney, Agent, or Firm* — Wolf, Greenfield & Sacks, P.C.

(57) ABSTRACT

There is provided a peripheral device including a multi-pole plug inserted into a jack of a jack device, the jack device including the jack, a conversion unit that converts a physical amount into an electrical signal or converts an electrical signal into a physical amount, a detection unit that detects whether the jack device is a corresponding device capable of handling multiplexed data obtained by multiplexing the electrical signal input and output to and from the conversion unit, a transmission and reception processing unit that transmits or receives the multiplexed data via a predetermined terminal of the multi-pole plug when the jack device is a corresponding device, and a function switching unit that performs assignment of an electrical function of a terminal other than the predetermined terminal of the multi-pole plug.

17 Claims, 52 Drawing Sheets

(51) Int. Cl.
*H04R 1/10* (2006.01)
*H04R 1/06* (2006.01)
(52) U.S. Cl.
CPC ............ *G06F 13/4282* (2013.01); *H04R 1/06* (2013.01); *H04R 1/10* (2013.01)

(56) References Cited

U.S. PATENT DOCUMENTS

2011/0093643 A1* 4/2011 Hung .................... G06F 13/409
710/316
2016/0127815 A1 5/2016 Ookuri et al.

FOREIGN PATENT DOCUMENTS

| | | |
|---|---|---|
| JP | 2012-053792 A | 3/2012 |
| JP | 2012-220334 A | 11/2012 |
| WO | WO 2004/001552 A2 | 12/2003 |
| WO | WO 2013/081578 A1 | 6/2013 |
| WO | WO 2014/196399 A1 | 12/2014 |

* cited by examiner

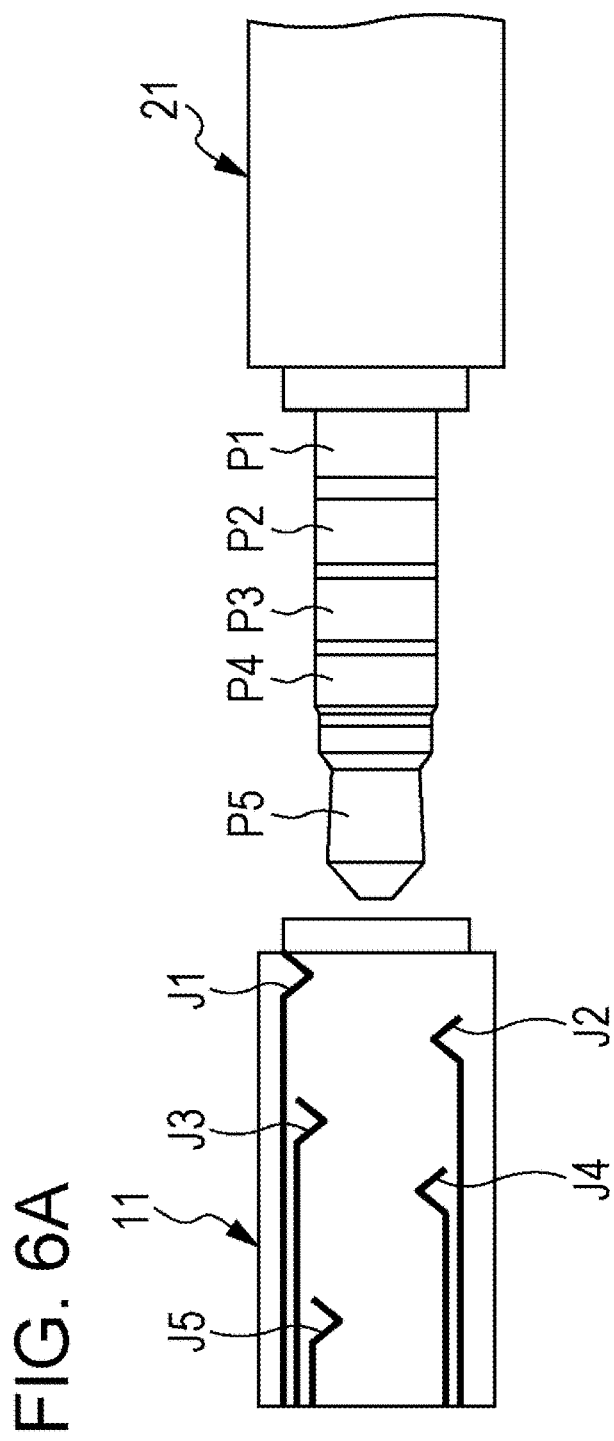

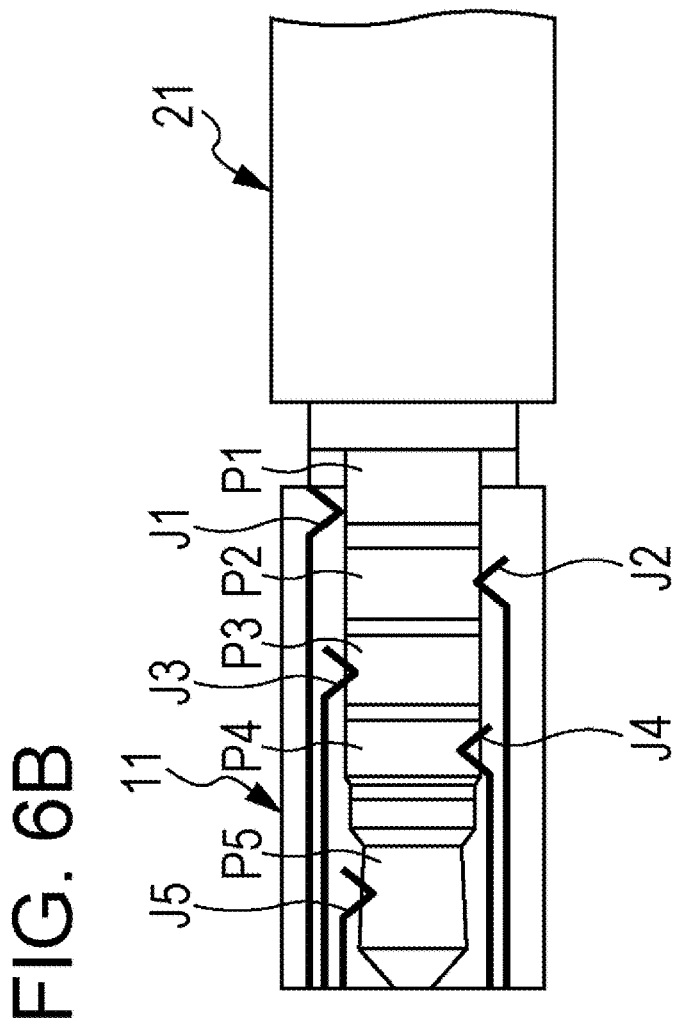

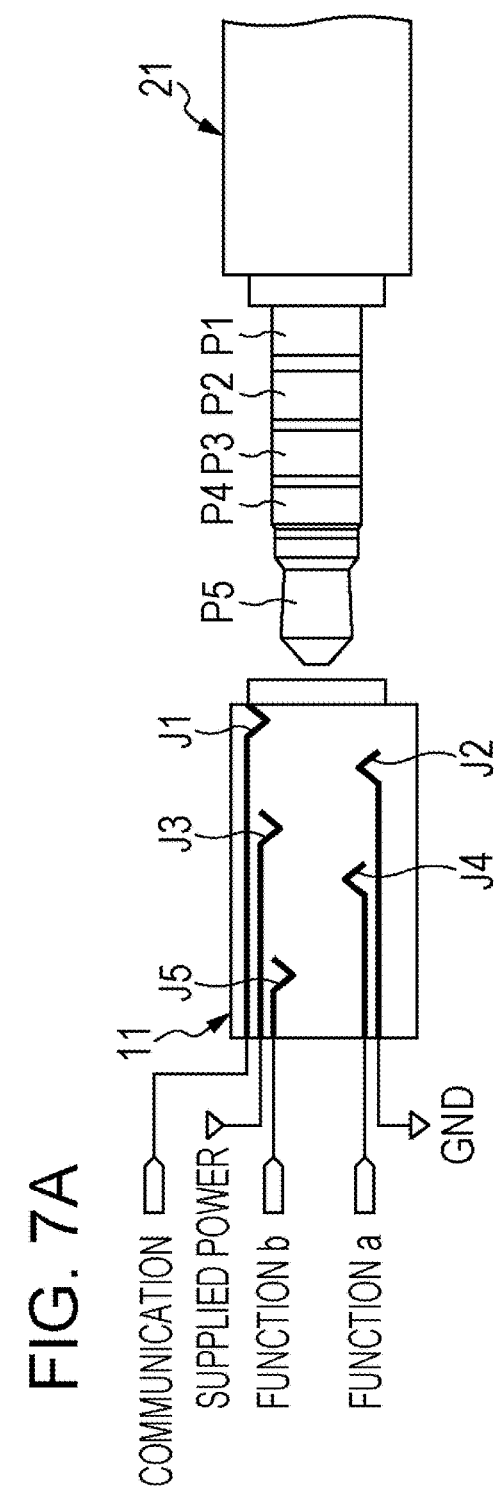

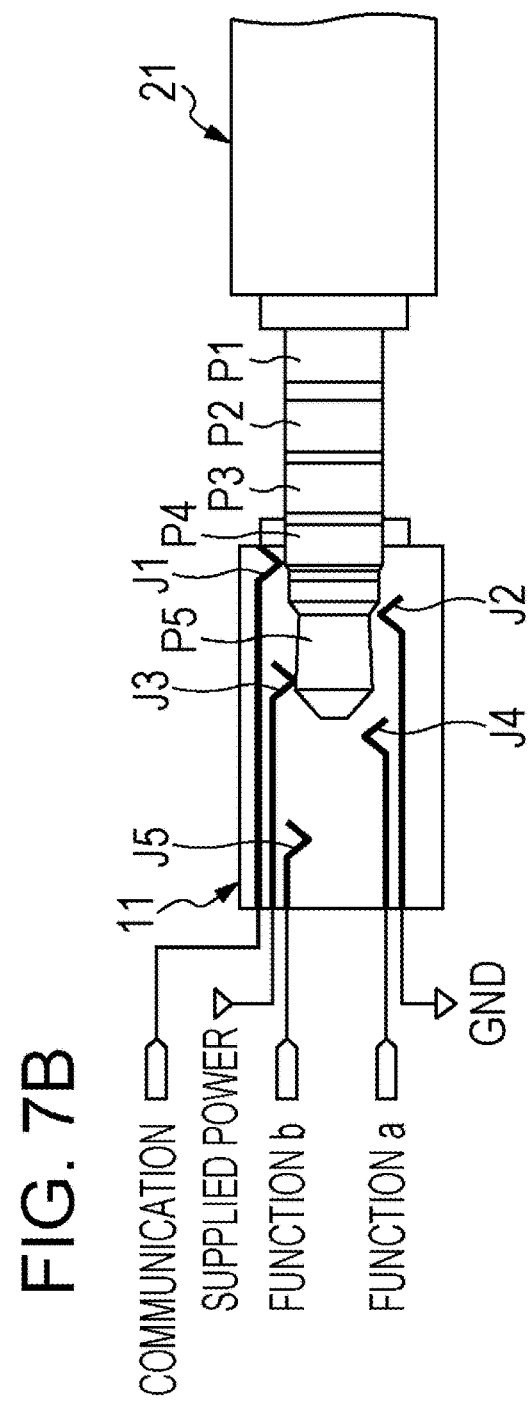

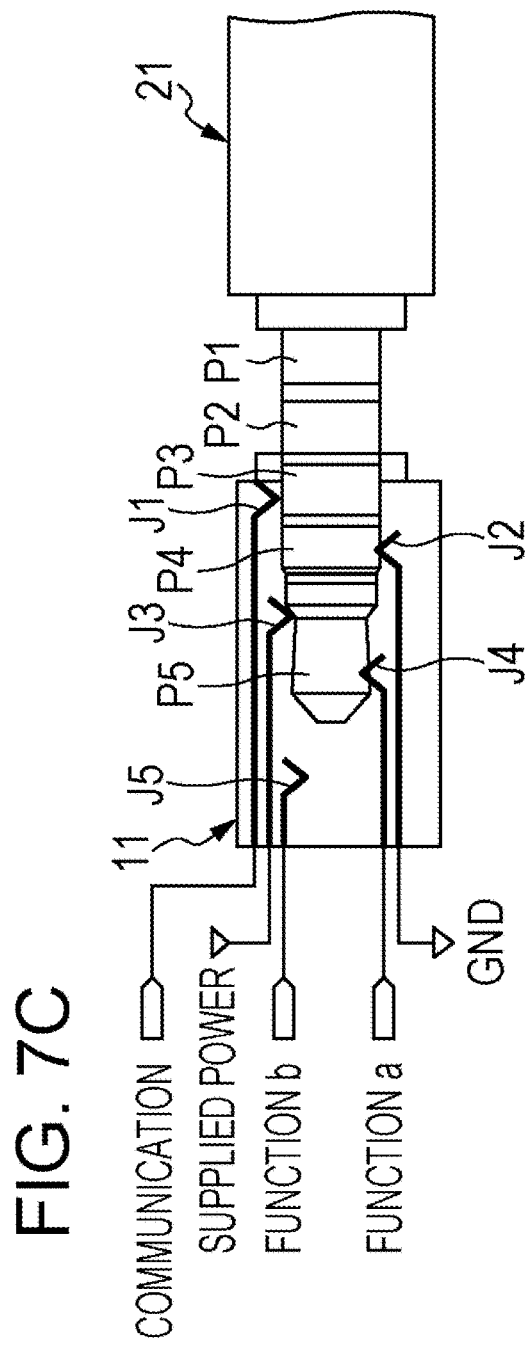

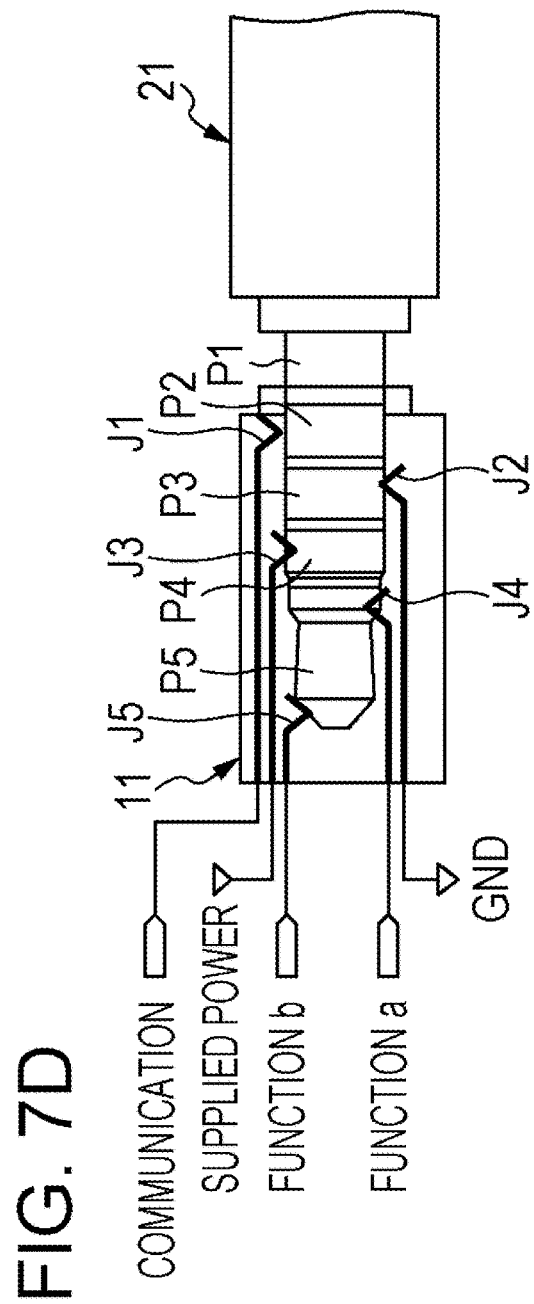

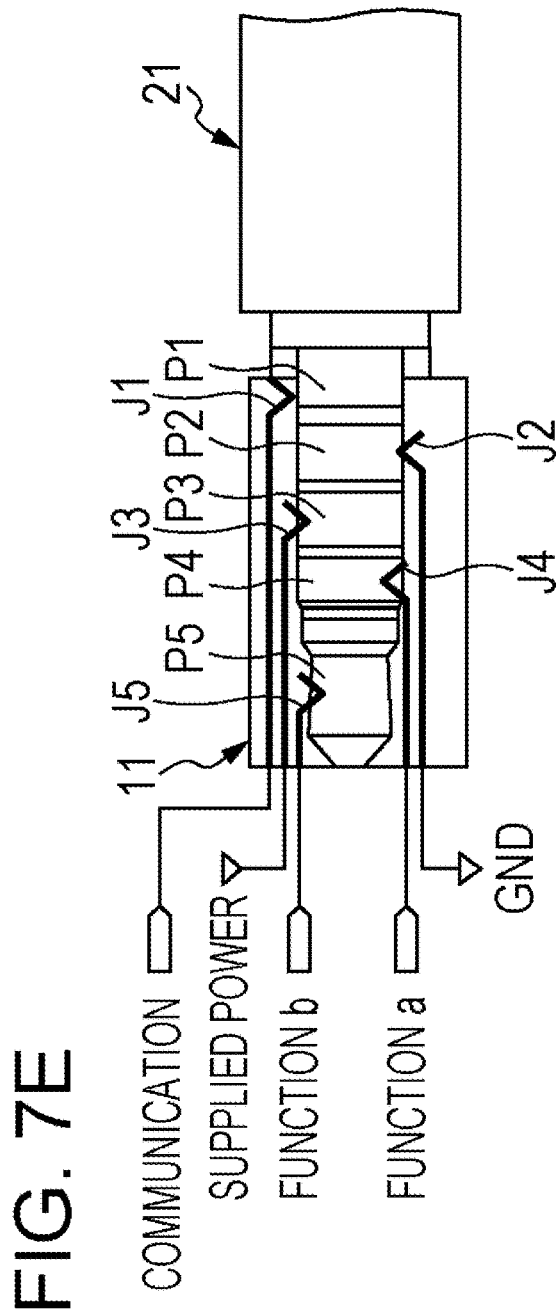

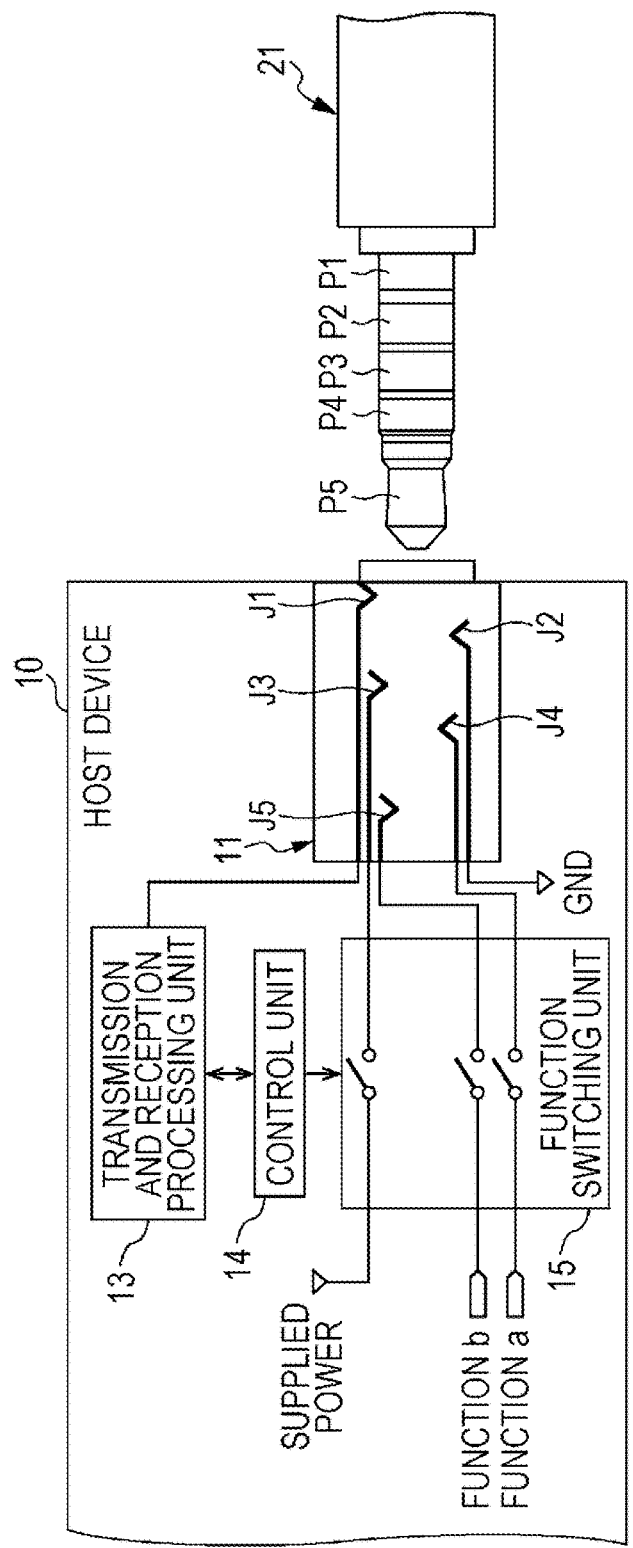

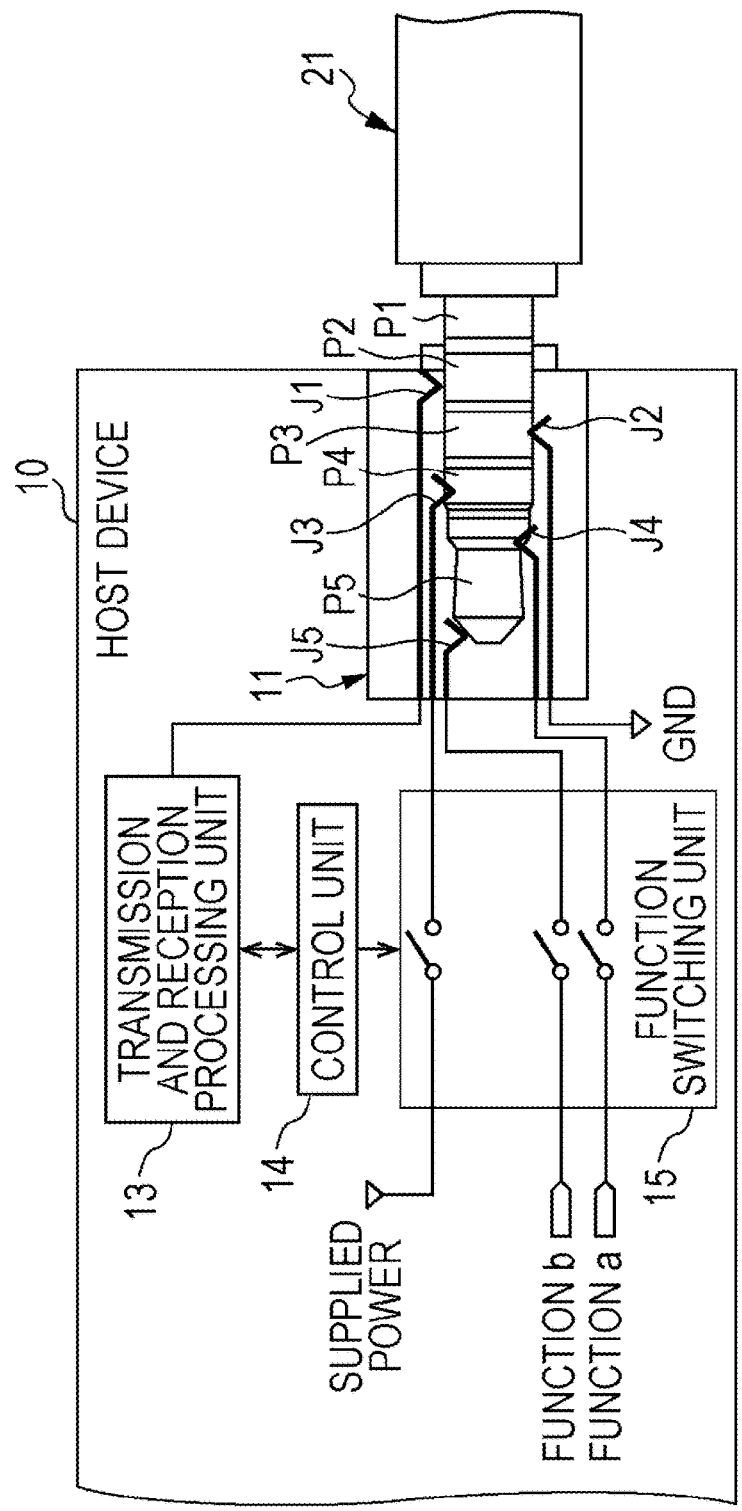

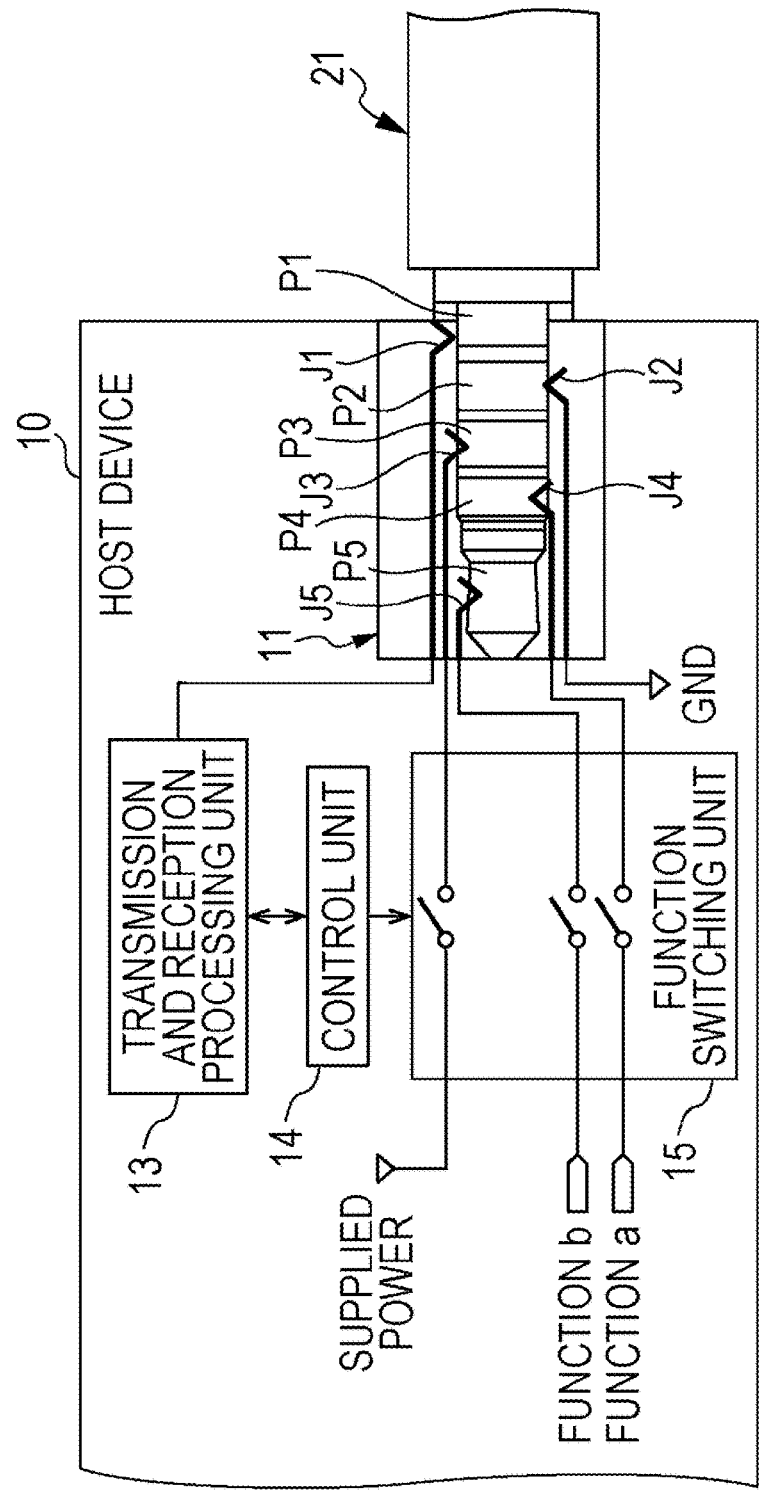

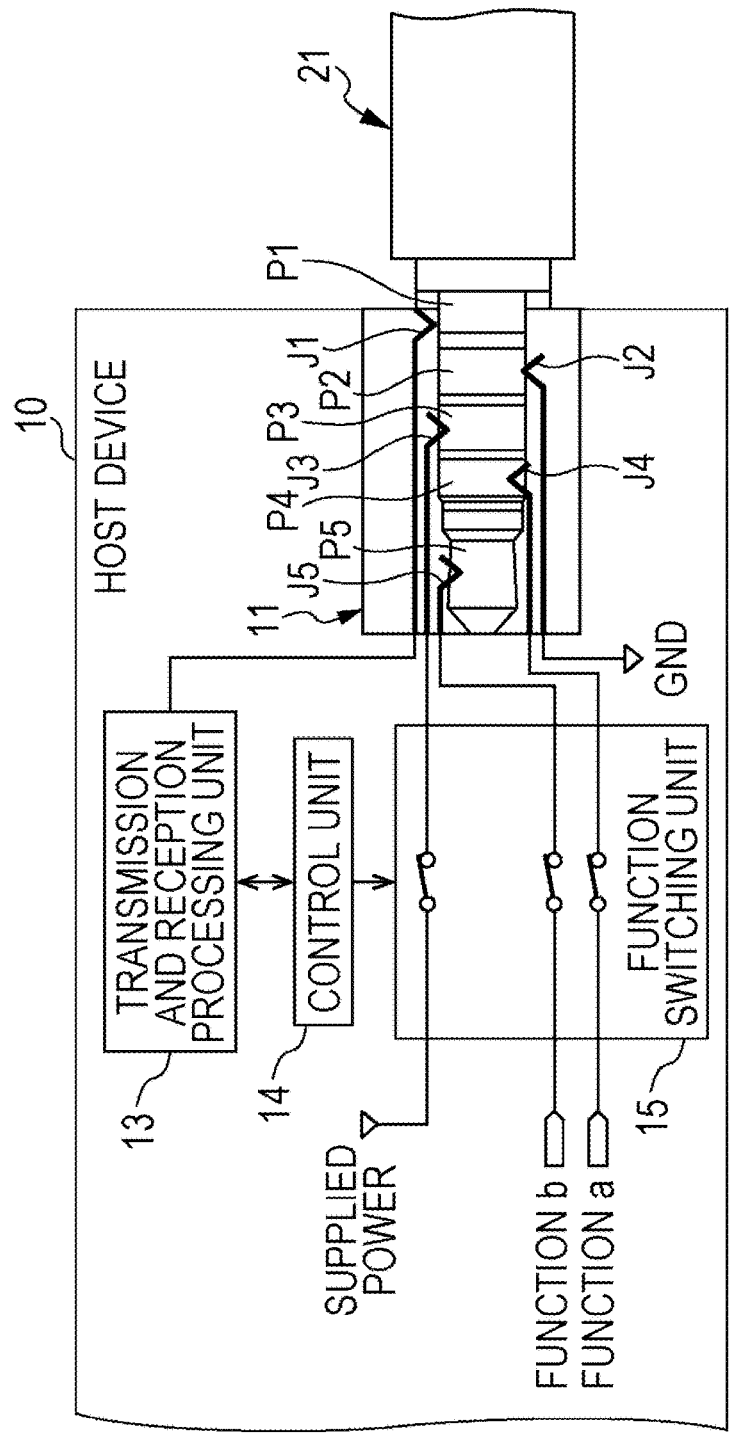

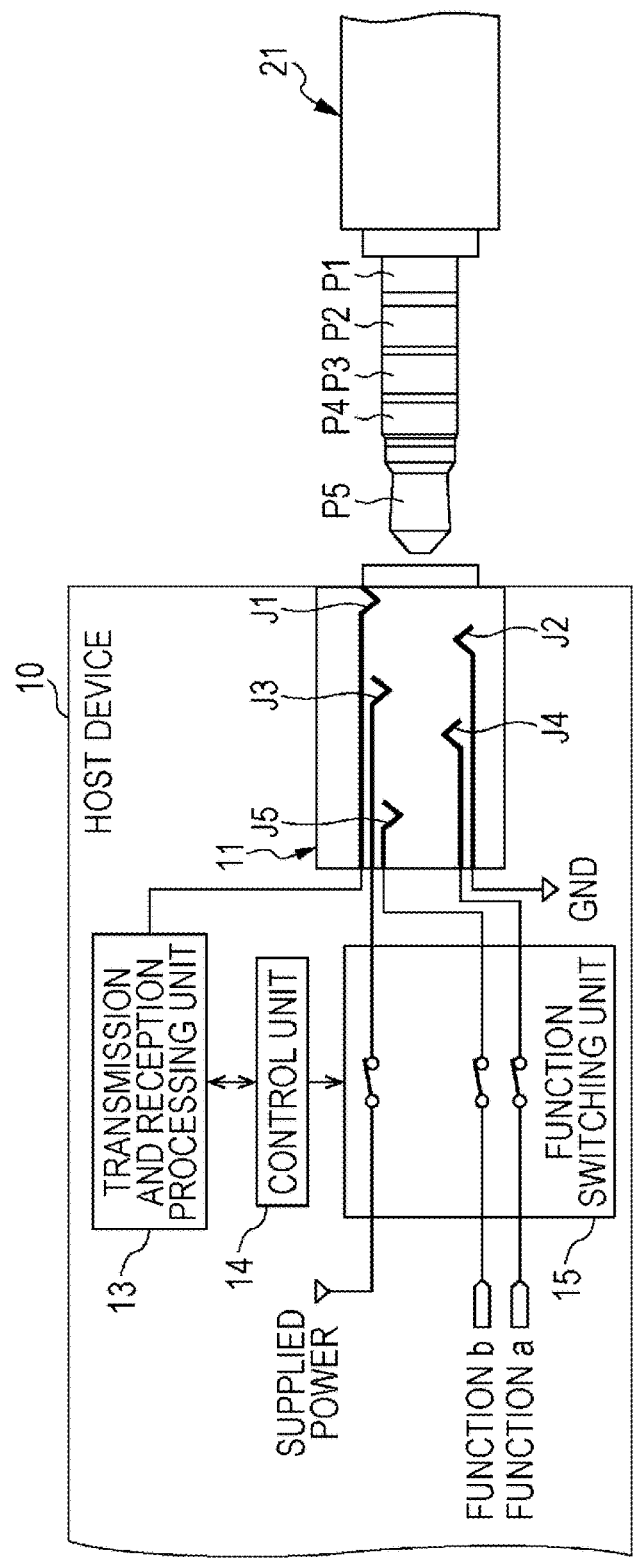

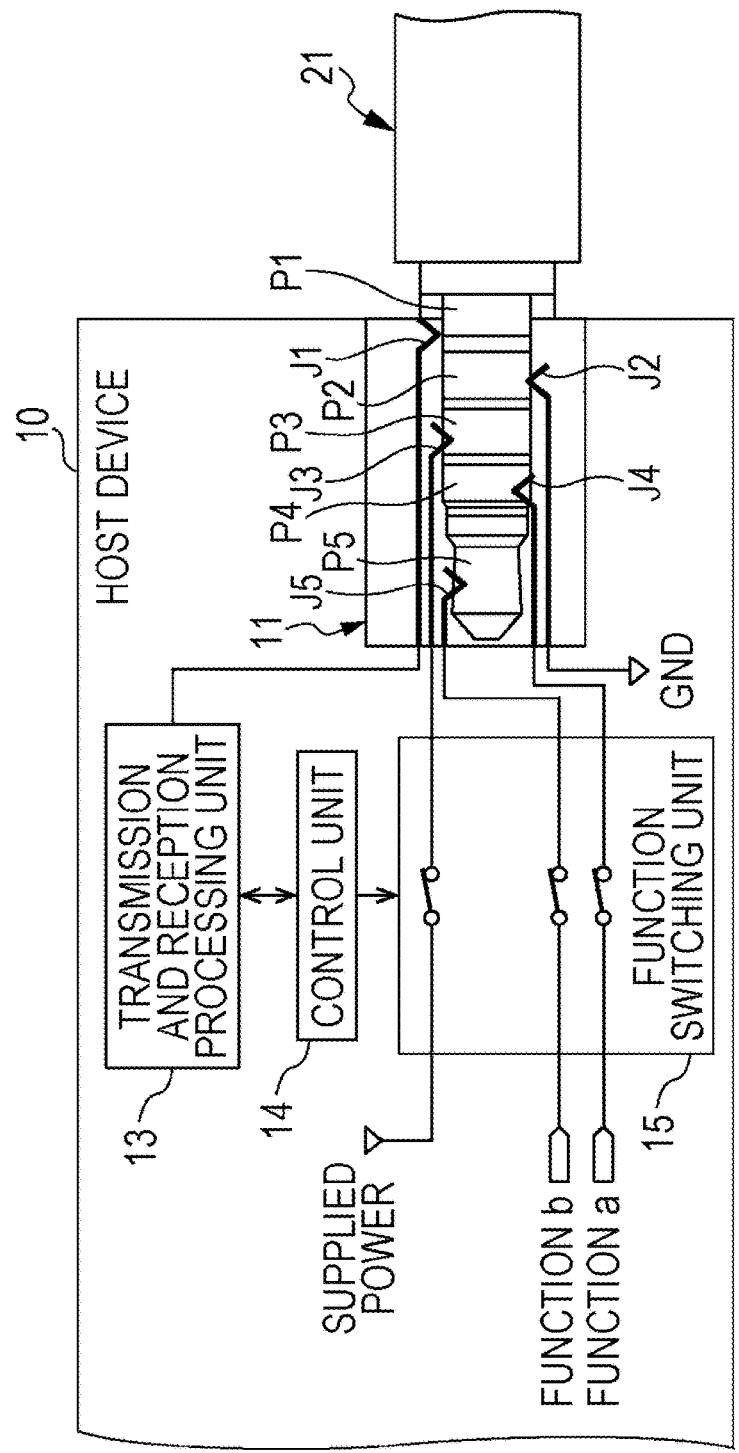

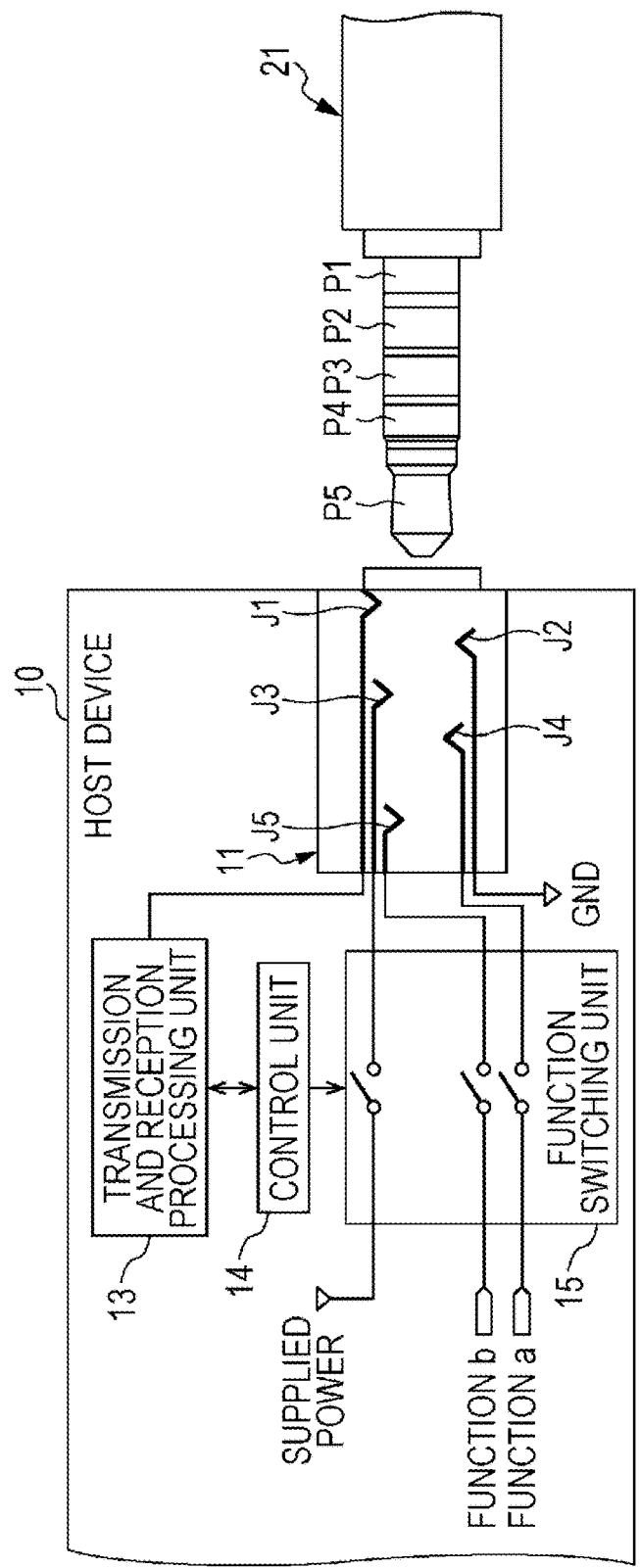

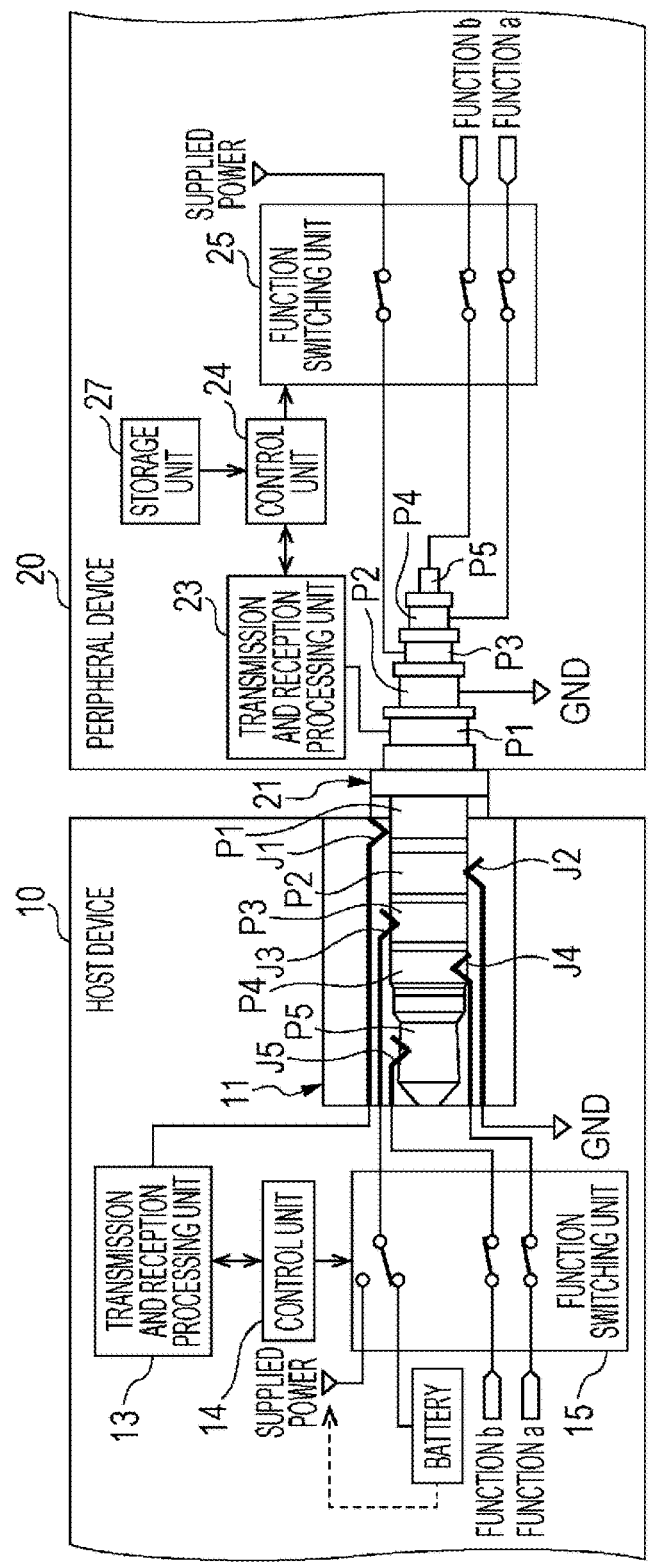

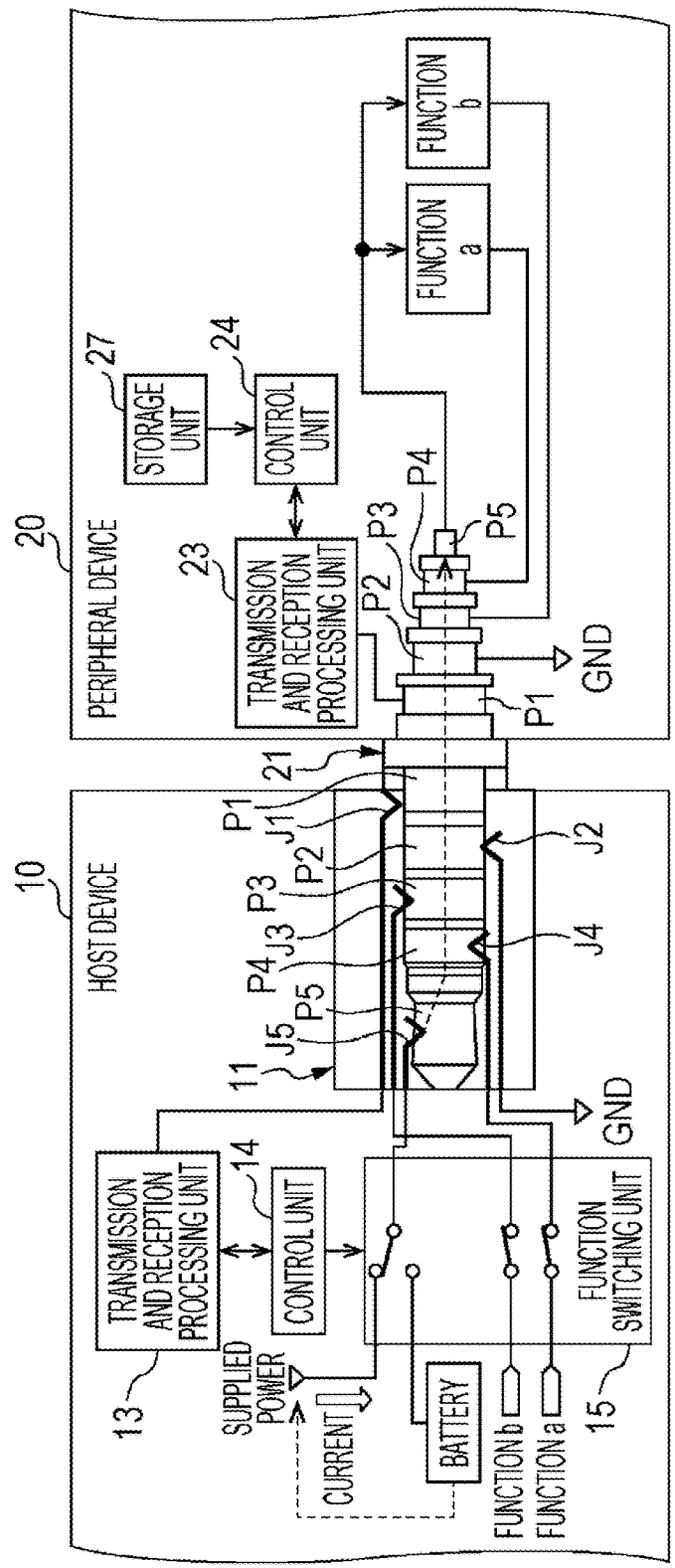

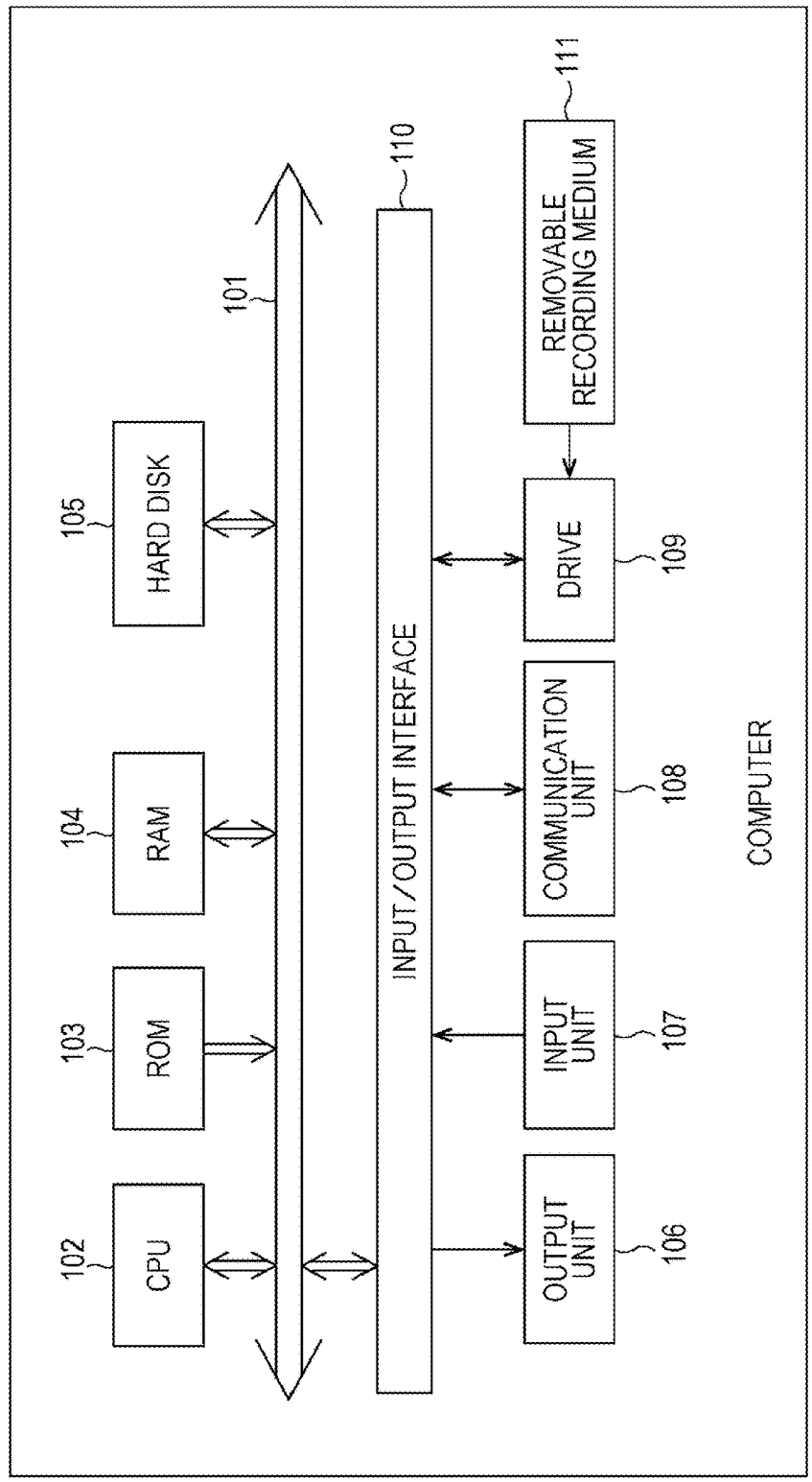

PERIPHERAL DEVICE, HOST DEVICE, AND PROCESSING METHOD

TECHNICAL FIELD

The present technology relates to a peripheral device, a host device, and a processing method and, particularly, for example, to a peripheral device, a host device, and a processing method in which an electrical function assigned to a terminal of a plug or of a jack can be switched in a plug device having a plug or a jack device having a jack.

CROSS REFERENCE TO RELATED APPLICATIONS

The present application is a national stage application under 35 U.S.C. § 371 of International Patent Application No. PCT/JP2015/001890 filed Apr. 2, 2015, and titled "PERIPHERAL DEVICE, HOST DEVICE, AND PROCESSING METHOD," which claims priority to Japanese Priority Patent Application JP 2014-082138 filed Apr. 11, 2014, the entire contents of each of which are hereby incorporated by reference.

BACKGROUND ART

An example of a plug device having a plug or a jack device having a jack includes a charged device described in PTL 1, a data holding device, or a charging adapter.

The charged device described in PTL 1 is a plug device having a plug, and the data holding device and the charging adapter are jack devices having a jack.

A data line for transferring data is connected to the plug of the charged device. When the plug of the charged device is connected to the jack of the data holding device, the charged device acquires data from the data holding device via the data line.

Further, the charging adapter has a mechanical detection switch, and when a connection of the plug of the charged device to the jack of the charging adapter is mechanically detected by the detection switch, a built-in battery built into the charged device is charged using the data line, in the charged device.

CITATION LIST

Patent Literature

PTL 1: Japanese Unexamined Patent Application Publication No. 2013-055774

SUMMARY OF INVENTION

Technical Problem

Incidentally, in recent years, a technology capable of switching an electrical function of a terminal of a plug or a jack while transmitting and receiving multiplexed data obtained by multiplexing a plurality of electrical signals between a plug device and a jack device has been necessary.

It is desirable to enable switching an electrical function of a terminal of a plug or a jack while transmitting and receiving multiplexed data obtained by multiplexing a plurality of electrical signals between a plug device and a jack device.

Solution to Problem

A peripheral device according to an embodiment of the present technology is a peripheral device comprising a plug having a plurality of terminals and configured to be removably inserted into a jack of a host device, at least one processor coupled to a first terminal of the plug, the at least one processor configured to transmit and/or receive multiplexed data via the first terminal, a detector coupled to the first terminal and configured to detect, when the plug is inserted into the jack, whether the host device is capable of handling the multiplexed data, and a function switch coupled to at least a second terminal of the plug and configured to assign an electrical function to the second terminal.

A processing method for a peripheral device according to another embodiment of the present technology is a processing method for a peripheral device, the peripheral device comprising a plug having a plurality of terminals and configured to be removably inserted into a jack of a host device, at least one processor coupled to a first terminal of the plug, the at least one processor configured to transmit and/or receive multiplexed data via the first terminal, and a detection unit coupled to the first terminal and configured to detect, when the plug is inserted into the jack, whether the host device is capable of handling the multiplexed data, the method comprising causing the peripheral device to assign an electrical function to a second terminal, different from the first terminal.

A host device according to still another embodiment of the present technology is a host device comprising a jack having a plurality of terminals and configured to receive a plug of a plug device, at least one processor coupled to a first terminal of the jack, the at least one processor configured to transmit and/or receive multiplexed data via the first terminal, a detection unit coupled to the first terminal and configured to detect, when the plug is inserted into the jack, whether the plug device is capable of handling the multiplexed data, and a function switching unit coupled to at least a second terminal of the jack and configured to assign an electrical function to the second terminal.

A processing method for a host device according to still another embodiment of the present technology is a processing method for a host device, the host device comprising a jack having a plurality of terminals and configured to receive a plug of a plug device, at least one processor coupled to a first terminal of the jack, the at least one processor configured to transmit and/or receive multiplexed data via the first terminal, and a detection unit coupled to the first terminal and configured to detect, when the plug is inserted into the jack, whether the plug device is capable of handling the multiplexed data, the method comprising causing the host device to assign an electrical function to a second terminal, different from the first terminal.

Advantageous Effects of Invention

According to the present technology, for example, it is possible to switch the electrical function of the terminal of the plug or the jack while performing transmission and reception of the multiplexed data obtained by multiplexing a plurality of electrical signal between the plug device and the jack device.

Further, effects described herein are not necessarily limited, and may be any one effect described in this disclosure.

BRIEF DESCRIPTION OF DRAWINGS

FIG. 6A is a diagram illustrating insertion and removal of a plug into and from a jack.

FIG. 6B is a diagram illustrating insertion and removal of a plug into and from a jack.

FIG. 7A is a diagram illustrating a state in which a plug is inserted into a jack from a removal state.

FIG. 7B is a diagram illustrating a state in which a plug is inserted into a jack from a removal state.

FIG. 7C is a diagram illustrating a state in which a plug is inserted into a jack from a removal state.

FIG. 7D is a diagram illustrating a state in which a plug is inserted into a jack from a removal state.

FIG. 7E is a diagram illustrating a state in which a plug is inserted into a jack from a removal state.

FIG. 9A is a diagram illustrating a technology for preventing an unintended short-circuit when the plug is inserted into the jack in a case in which power that is supplied power is supplied from the host device to the peripheral device.

FIG. 9C is a diagram illustrating a technology for preventing an unintended short-circuit when the plug is inserted into the jack in a case in which power that is supplied power is supplied from the host device to the peripheral device.

FIG. 9D is a diagram illustrating a technology for preventing an unintended short-circuit when the plug is inserted into the jack in a case in which power that is supplied power is supplied from the host device to the peripheral device.

FIG. 9E is a diagram illustrating a technology for preventing an unintended short-circuit when the plug is inserted into the jack in a case in which power that is supplied power is supplied from the host device to the peripheral device.

FIG. 11E is a diagram illustrating a state in which the plug is removed from the jack from a full insertion state.

FIG. 12B is a diagram illustrating a technology for preventing an unintended short-circuit when the plug is removed from the jack in a case in which power that is supplied power is supplied from the host device to the peripheral device.

FIG. 12E is a diagram illustrating a technology for preventing an unintended short-circuit when the plug is removed from the jack in a case in which power that is supplied power is supplied from the host device to the peripheral device.

FIG. 14E is a diagram illustrating a technology for preventing an unintended short-circuit when the plug is inserted into the jack in a case in which power that is supplied power is supplied from the peripheral device to the host device.

FIG. 16E is a diagram illustrating a method of preventing a power supply from being short-circuited upon insertion and removal of the plug when power that is supplied power is supplied from the host device to the peripheral device.

FIG. 18 is a block diagram illustrating a configuration example of an embodiment of a computer to which the present technology is applied.

DESCRIPTION OF EMBODIMENTS

<Embodiments of Signal Processing System to which the Present Technology is Applied>

Figure 1:
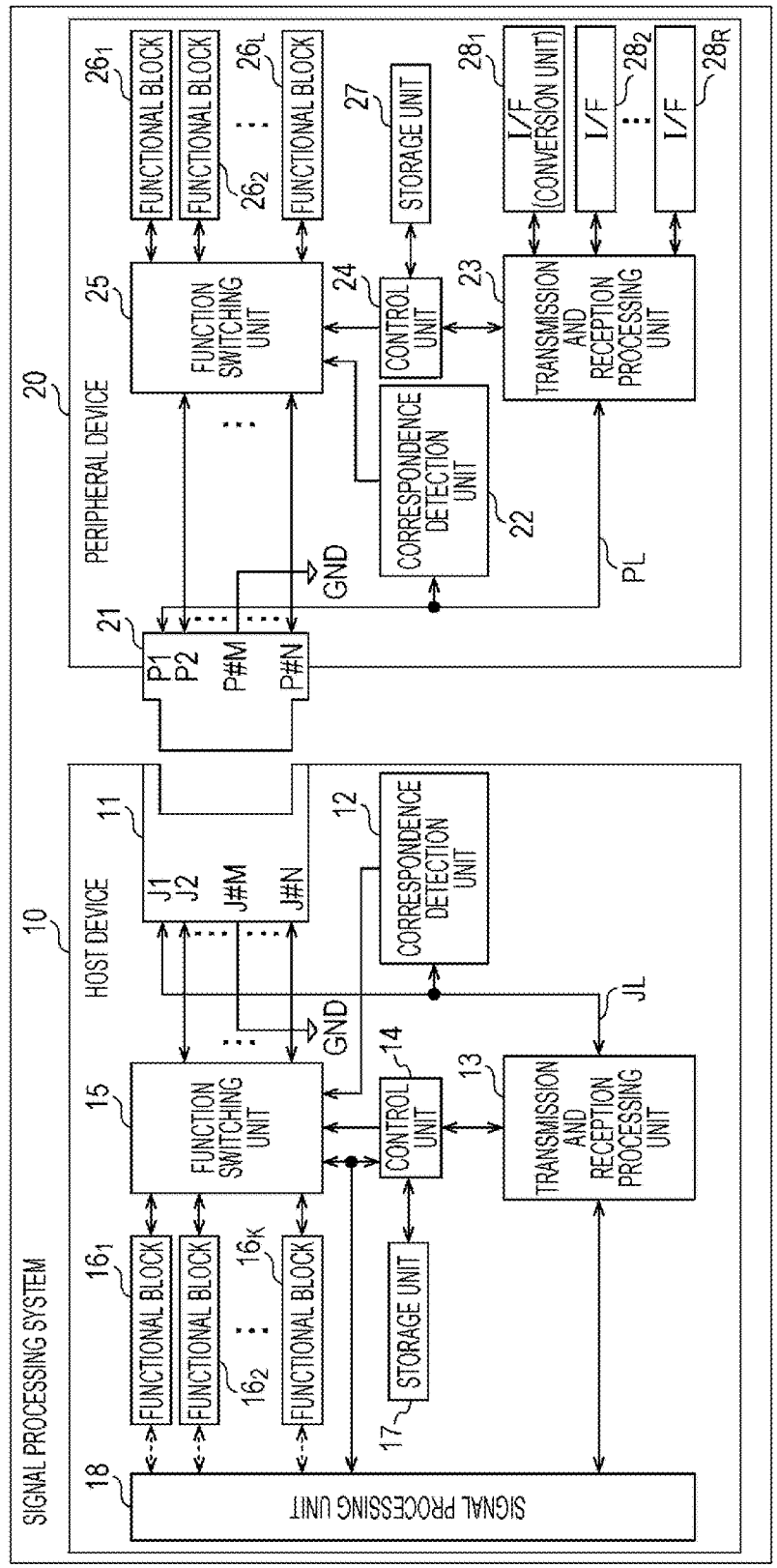
FIG. 1 is a block diagram illustrating a configuration example of an embodiment of a signal processing system to which the present technology is applied.

FIG. 1 is a block diagram illustrating a configuration example of an embodiment of a signal processing system to which the present technology is applied.

In FIG. 1, the signal processing system includes a host device 10 and a peripheral device 20.

The host device 10 includes a jack 11, a correspondence detection unit 12, a transmission and reception processing unit 13, a control unit 14, a function switching unit 15, one or more (K) functional blocks $16_1$, $16_2$, ... $16_K$, a storage unit 17, and a signal processing unit 18.

Since the host device 10 includes the jack 11, the host device 10 is a jack device.

The jack 11 is, for example, a multi-pole single-headed jack into which a multi-pole single-headed plug is inserted and has a plurality of (N) terminals (N poles) J1, J2, ..., J#N.

For example, the terminal J1 that is a predetermined terminal among the N terminals J1 to J#N of the jack 11 is connected to a multiplexing communication line JL used for transmission and reception of multiplexed data, and is further connected to the correspondence detection unit 12 and the transmission and reception processing unit 13 via the multiplexing communication line JL.

One terminal J#M other than the terminal J1 among the N terminals J1 to J#N of the jack 11 (M is an integer equal to or greater than 2 and equal to or smaller than N) is connected to ground (grounded).

Also, N−2 other terminal J#n among the terminals J1 to J#N of the jack 11 ((N−2) terminals J#n other than the terminals J1 and J#M) are connected to the function switching unit 15.

The correspondence detection unit 12 detects whether the plug device of which a plug is inserted into the jack 11 is a device capable of handling predetermined multiplexed data (hereinafter referred to as a corresponding device).

That is, the correspondence detection unit 12 monitors the multiplexing communication line JL, and detects that the plug device of which the plug is inserted into the jack 11 is a corresponding device when receiving multiplexed data having a predetermined authentication pattern PTNP via the multiplexing communication line JL.

The correspondence detection unit 12 supplies detection information indicating a detection result indicating whether the plug device of which the plug is inserted into the jack 11 is a corresponding device capable of handling predetermined multiplexed data to the transmission and reception processing unit 13. Further, the correspondence detection unit 12 controls the function switching unit 15 based on the detection information, as necessary.

Here, since the host device 10 and the peripheral device 20 can handle the multiplexed data as will be described below, the host device 10 and the peripheral device 20 are both corresponding devices.

When the detection information from the correspondence detection unit 12 indicates that the plug device (the plug) inserted into the jack 11 is a corresponding device, the transmission and reception processing unit 13 transmits and receives multiplexed data to and from the plug device (corresponding device) inserted into the jack 11 via the multiplexing communication line JL and the terminal J1.

That is, the transmission and reception processing unit 13 multiplexes, for example, a plurality of digital signals (information) supplied from the control unit 14 or the signal processing unit 18 into a predetermined format of multiplexed data (for example, arranges a digital signal indicating previously determined information in each bit of a frame having a predetermined bit length as the multiplexed data), and transmits the multiplexed data to the plug device of which the plug is inserted into the jack 11 via the multiplexing communication line JL and the terminal J1.

Further, the transmission and reception processing unit 13 receives the multiplexed data transmitted from the plug device of which the plug is inserted into the jack 11 via the multiplexing communication line JL and the terminal J1, and demultiplexes (demodulates) the multiplexed data to separate the multiplexed data into a plurality of original digital signals. Also, the transmission and reception processing unit 13 supplies the digital signals separated from the multiplexed data to the signal processing unit 18 or the control unit 14.

Further, the transmission and reception processing unit 13 supplies communication state information indicating a communication state of the multiplexed data to the control unit 14.

The control unit 14 controls the entire host device 10.

Further, the control unit 14 controls the function switching unit 15 depending on the information (signal) from the transmission and reception processing unit 13.

Further, the control unit 14 reads the device information regarding the host device 10 from the storage unit 17 and supplies the information to the transmission and reception processing unit 13, as necessary. Here, the transmission and reception processing unit 13 includes the device information supplied from the control unit 14 in the multiplexed data, and transmits the multiplexed data to the plug device of which the plug is inserted into the jack 11 via the multiplexing communication line JL and the terminal J1.

The function switching unit 15 electrically connects, for example, the terminal J#n of the jack 11 to any one functional block $16_k$ among the functional blocks $16_1$ to $16_K$ under control of the correspondence detection unit 12, the control unit 14, or the signal processing unit 18 to thereby assign the electrical function of the functional block $16_k$ to the terminal J#n of the jack 11.

Therefore, the function switching unit 15 can switch the electrical function assigned to the terminal J#n of the jack 11 by changing the functional block $16_k$ connected to the terminal J#n of the jack 11.

The functional block $16_k$ provides a predetermined function. The function provided by the functional block $16_k$ includes, for example, a power supply function of transferring (power that is) supplied power, an analog audio output function of outputting analog audio, or an analog audio input function of receiving (inputting) analog audio.

When the functional block $16_k$ provides, for example, the power supply function, the functional block $16_k$ outputs, for example, power that is supplied power from a battery (not illustrated) to the function switching unit 15, or the functional block $16_k$ receives supply of the power from the function switching unit 15 and charges the battery (not illustrated) with the power.

When the functional block $16_k$ has, for example, the analog audio output function, the functional block $16_k$ acquires, for example, a digital audio signal supplied from the signal processing unit 18, performs DA (Digital to Analog) conversion, performs amplification as necessary, and outputs a resultant analog audio signal to the function switching unit 15.

When the functional block $16_k$ has, for example, the analog audio input function, the functional block $16_k$ includes, for example, a signal line pulled up by a resistor, which is a signal line having one end connected to the function switching unit 15 and the other end connected to the signal processing unit 18, and supplies the analog audio signal supplied from the function switching unit 15 to the signal processing unit 18 via the pull-up signal line.

The storage unit 17 stores device information regarding the host device 10. The device information can include, for example, information indicating what type of device (for example, a smartphone, a tablet or a PC (Personal Computer)) the host device 10 is, information indicating functions of the host device 10 (functions of the functional blocks $16_1$ to $16_k$ or signal processing that can be performed by the signal processing unit 18), or information indicating which of functions of the host device 10 is provided to (the type of) the plug device connected to (inserted into) the jack 11.

Further, the device information can include a vendor ID (Identification) identifying a manufacturer or the like of the host device 10, or a product ID for identifying a model or the like of the host device 10 (entity).

Further, the device information can include configuration information indicating a configuration, a model, a use, performance or the like of the host device 10.

The signal processing unit 18 processes, for example, various signals using the digital signal separated from the multiplexed data supplied from the transmission and reception processing unit 13 and the signal supplied from the functional block $16_k$.

Further, the signal processing unit 18 performs supply of a signal obtained through signal processing or the like to the functional block $16_k$ or supply of a command directed to the peripheral device 20 to the transmission and reception processing units 13, as necessary.

Further, when a plug 21 of the peripheral device 20 that is a corresponding device is inserted into the jack 11, the transmission and reception processing unit 13 can include the device information of the peripheral device 20 to be described below in the multiplexed data that is exchanged with the peripheral device 20 via the terminal J1 and the multiplexing communication line JL.

The control unit 14 or the signal processing unit 18 can control the function switching unit 15 based on the device information of the peripheral device 20 separated from the multiplexed data.

Further, the signal processing unit 18 can perform signal processing for the peripheral device 20 based on the device information of the peripheral device 20 separated from the multiplexed data.

The peripheral device 20 includes the plug 21, a correspondence detection unit 22, a transmission and reception processing unit 23, a control unit 24, a function switching unit 25, one or more (L) functional blocks $26_1, 26_2, \ldots 26_L$, a storage unit 27, and a plurality of (R) I/Fs (Interfaces) $28_1, 28_2, \ldots, 28_R$.

Since the peripheral device 20 includes the plug 21, the peripheral device 20 is a plug device.

The plug 21 is, for example, a multi-pole single-headed plug, and includes a plurality of (N) terminals (N poles) P1, P2, ..., P#N. When the plug 21 is inserted into the jack 11, the terminal P#n of the plug 21 is (electrically) connected to the terminal J#n of the jack 11.

For example, the terminal P1 that is a predetermined terminal among the N terminals P1 to P#N of the plug 21 is connected to a multiplexing communication line PL used for transmission and reception of multiplexed data, and is further connected to the correspondence detection unit 22 and the transmission and reception processing unit 23 via the multiplexing communication line PL.

One terminal P#M other than the terminal P1 among the N terminals P1 to P#N of the plug 21 is connected to the ground.

Also, N−2 other terminals P#n (N−2 terminals P#n other than the terminals P1 and P#M) among the terminals P1 to P#N of the plug 21 are connected to the function switching unit 25.

The correspondence detection unit 22 detects whether the jack device in which the plug 21 is inserted into the jack is a corresponding device capable of handling predetermined multiplexed data.

That is, the correspondence detection unit 22 monitors the multiplexing communication line PL, and when the correspondence detection unit 22 receives multiplexed data of a predetermined authentication pattern PTNJ via the multiplexing communication line PL, the correspondence detection unit 22 detects that the jack device in which the plug 21 has been inserted into the jack is a corresponding device.

The correspondence detection unit 22 supplies detection information indicating a detection result of whether the jack device in which the plug 21 has been inserted into the jack is a corresponding device capable of handling predetermined multiplexed data, to the transmission and reception processing unit 23. Further, the correspondence detection unit 22 controls the function switching unit 25 based on the detection information, as necessary.

When detection information from the correspondence detection unit 22 indicates that the jack device into which the plug 21 is inserted (into the jack) is a corresponding device, the transmission and reception processing unit 23 transmits and receives multiplexed data to and from the jack device (corresponding device) into which the plug 21 is inserted, via the multiplexing communication line PL and the terminal P1.

That is, the transmission and reception processing unit 23 multiplexes, for example, a plurality of digital signals (information) supplied from the control unit 24 or the I/F $28_r$, into a predetermined format of multiplexed data, and transmits the multiplexed data to the jack device into which the plug 21 is inserted, via the multiplexing communication line PL and the terminal P1.

Further, the transmission and reception processing unit 23 receives the multiplexed data transmitted from the jack device into which the plug 21 is inserted, via the terminal P1 and the multiplexing communication line PL, and separates the multiplexed data into a plurality of original digital signals by demultiplexing the multiplexed data. Also, the transmission and reception processing unit 23 supplies the digital signal separated from the multiplexed data to the I/F $28_r$ or the control unit 24.

Further, the transmission and reception processing unit 23 supplies communication state information indicating a communication state of the multiplexed data to the control unit 24.

The control unit 24 controls the entire peripheral device 20.

Further, the control unit 24 controls the function switching unit 25 depending on information (signal) from the transmission and reception processing unit 23.

Further, the control unit 24 reads device information regarding the peripheral device 20 from the storage unit 27, as necessary, and supplies the device information to the transmission and reception processing unit 23. Here, the transmission and reception processing unit 23 includes the device information supplied from the control unit 24 in the multiplexed data, and transmits the device information to the jack device into which the plug 21 is inserted, via the multiplexing communication line PL and the terminal P1.

For example, the function switching unit 25 assigns an electrical function of the functional block $26_1$ to the terminal P#n of the plug 21 by electrically connecting the terminal P#n of the plug 21 to any one functional block $26_1$ among the functional blocks $26_1$ to $26_L$ under control of the correspondence detection unit 22 or the control unit 24.

Therefore, the function switching unit 25 can switch the electrical function assigned to the terminal P#n by changing the functional block $26_1$ to be connected to the terminal P#n of the plug 21.

The functional block $26_1$ provides a predetermined function. The function provided by the functional block $26_1$ includes, for example, the power supply function, the analog audio output function, and the analog audio input function described above.

When the functional block $26_1$ provides, for example, the power supply function, the functional block $26_1$ outputs, for example, power that is supplied power from a battery (not illustrated) or the like to the function switching unit 25, or, the functional block $26_1$ receives supply of the power from the function switching unit 25, and charges a battery (not illustrated) with the power or operates with the power as a power supply.

When the plug 21 is inserted into the jack 11 in a case in which the functional block $26_1$ provides such a power supply function, and when the function switching unit 25 assigns the power supply function of the functional block $26_1$ to the terminal P#n of the plug 21, for example, in the host device 10, the functional block $16_k$ having the power supply function is connected to the terminal J#n of the jack 11 in the function switching unit 15, and thus, the power supply function of the functional block $16_k$ is assigned to the terminal J#n.

Also, transfer of the power is performed between the functional block $26_k$ having the power supply function in the host device 10 and the functional block $16_1$ having the power supply function in the peripheral device 20 via the function switching unit 15, the terminal J#n of the jack 11, the terminal P#n of the plug 21, and the function switching unit 25.

When the functional block $26_1$ has, for example, an analog audio output function, the functional block $26_1$ includes, for example, a driver (for example, a transducer including a coil and a vibration plate, which converts an audio signal into sound (sound waves) as vibration of air) (may be called a speaker), and outputs (emits) sound corresponding to an analog audio signal supplied from the function switching unit 25.

When the plug 21 is inserted into the jack 11 in a case in which the functional block $26_1$ provides such an analog audio output function, and when the function switching unit 25 assigns the analog audio output function of the functional block $26_1$ to the terminal P#n of the plug 21, for example, in the host device 10, the functional block $16_k$ having the analog audio output function is connected to the terminal J#n of the jack 11 in the function switching unit 15, and thus, the analog audio output function of the functional block $16_k$ is assigned to the terminal J#n.

Also, the analog audio signal output by the functional block $16_k$ having an analog audio output function in the host device 10 is supplied to the functional block $26_1$ having an analog audio output function in the peripheral device 20 via the function switching unit 15, the terminal J#n of the jack 11, the terminal P#n of the plug 21, and the function switching unit 25, and a corresponding analog audio is output in the driver of the functional block $26_1$.

When the functional block $26_1$ has, for example, an analog audio input function, the functional block $26_1$ includes, for example, a microphone (not illustrated) as a transducer that converts sound (sound waves) that is a physical amount into an audio signal that is an electrical signal and, for example, collects sound such as a voice of the user and outputs a corresponding analog audio signal to the function switching unit 25.

When the plug 21 is inserted into the jack 11 in a case in which the functional block $26_1$ provides such an analog audio input function, and when the function switching unit 25 assigns the analog audio input function of the functional block $26_1$ to the terminal P#n of the plug 21, for example, in the host device 10, the functional block $16_k$ having the analog audio input function is connected to the terminal J#n of the jack 11 in the function switching unit 15, and thus, the analog audio input function of the functional block $16_k$ is assigned to the terminal J#n.

Also, the analog audio signal output by the microphone of the functional block $26_1$ having the analog audio input function in the peripheral device 20 is supplied to the functional block $16_k$ having an analog audio input function of the host device 10 via the function switching unit 25, the terminal P#n of the plug 21, the terminal J#n of the jack 11 and the function switching unit 15, and supplied to the signal processing unit 18 via the functional block $16_k$.

The storage unit 27 stores device information regarding the peripheral device 20. The device information can include, for example, information indicating what type of peripheral device (a headset (a headphone or an earphone) having no microphone, a headset having a microphone, or the like) the peripheral device 20 is, information indicating functions of the peripheral device 20 (functions of the functional blocks $26_1$ to $26_L$ or processing of the I/F 28 to $28_R$), or information indicating which of functions of the peripheral device 20 is provided to (the type of) the jack device into which the plug 21 is inserted.

Further, the device information can include a vendor ID for identifying a manufacturer or the like of the peripheral device 20 or a product ID for identifying a model or the like of the peripheral device 20 (entity).

Further, the device information can include configuration information indicating a configuration, a model, a use, performance or the like of the peripheral device 20.

The I/F $28_r$ is an interface for exchanging an electrical signal with the transmission and reception processing unit 23. In the I/F $28_r$, at least one of output of the electrical signal to the transmission and reception processing unit 23 and input of the electrical signal from the transmission and reception processing unit 23 is performed.

For example, a USB (Universal Serial Bus) interface, a GPIO (General Purpose Input/Output) interface, or a unit to which a device corresponding to the interface is connected may be adopted as the I/F $28_r$.

Further, the I/F $28_1$ to $28_R$ can include a plurality of physical amount input devices for inputting a physical amount as a conversion unit that converts a physical amount into a digital signal as an electrical signal and outputs the digital signal to the transmission and reception processing unit 23, or a plurality of physical amount output devices for outputting a physical amount as a conversion unit that converts the digital signal as an electrical signal input (supplied) from the transmission and reception processing unit 23 into a physical amount and outputs the physical amount.

An example of the physical amount input device includes a digital microphone unit, a switch unit, or a sensor unit, and an example of the physical amount output device includes a driver unit or a light emitting unit.

A digital microphone unit includes, for example, a microphone that converts sound as a physical amount into an analog audio signal, an amplifier that amplifies the analog audio signal, and an ADC (Analog Digital Converter) that performs AD (Analog to Digital) conversion (delta-sigma modulation) on the analog audio signal after amplification into, for example, a 1-bit digital audio signal, and collects the sound as the physical amount, converts the sound into a corresponding digital audio signal, and supplies (outputs) the digital audio signal to the transmission and reception processing unit 23.

The switch unit includes, for example, a switch pressed by a user, and converts a pressing operation (pressure) of the switch by the user, which is a physical amount, into a 1-bit digital signal (impedance) indicating ON or OFF of the switch, which is an electrical signal, and supplies (outputs) the digital signal to the transmission and reception processing unit 23.

The sensor unit includes, for example, a sensor that detects a physical amount such as temperature (including a body temperature), humidity, light, or speed, and outputs a corresponding electrical signal, and an ADC that AD-converts the electrical signal output by the sensor and detects the physical amount such as temperature, and converts the physical amount into a corresponding digital signal and supplies (outputs) the digital signal to the transmission and reception processing unit 23.

The driver unit includes a DAC (Digital to Analog Converter) that performs, for example, DA (Digital to Analog) conversion on a digital audio signal and outputs an analog audio signal, an amplifier that amplifies the analog audio signal, and a driver (speaker) that outputs sound corresponding to the audio signal after amplification, and converts a digital audio signal as an electrical signal supplied (input) from the transmission and reception processing unit 23 into corresponding audio as a physical amount and outputs the audio.

The light-emitting unit includes, for example, a light emitting device that emits infrared rays, converts a digital signal as an electrical signal supplied from the transmission and reception processing unit 23 into light such as infrared rays as a physical amount, and outputs the light.

Here, a physical amount input device or a physical amount output device can be configured so that some or all components thereof are detachably mounted on (the transmission and reception processing unit 23 of) the peripheral device 20.

That is, for example, the digital microphone unit including a microphone, an amplifier, and an ADC can be configured so that the microphone can be detachably mounted on the peripheral device 20. Further, for example, the driver unit including a DAC, an amplifier and a driver can be configured so that the driver or the driver and the amplifier can be detachably mounted on the peripheral device 20.

Further, when the plug 21 is inserted into the jack 11 of the host device 10 that is a corresponding device, digital multiplexed data is exchanged between the transmission and reception processing units 13 and 23 via the multiplexing communication line JL, the terminal J1 of the jack 11, the terminal P1 of the plug 21, and the multiplexing communication line PL.

The multiplexed data exchanged between the transmission and reception processing units 13 and 23 can include device information of the host device 10 stored in the storage unit 17, the device information of the peripheral device 20 stored in the storage unit 27, a command from the host device 10 to the peripheral device 20, a digital signal output by the I/F $28_r$, and a digital signal supplied (input) to the I/F $28_r$.

Also, the control unit 24 can control the function switching unit 25 based on the device information of the host device 10 separated from the multiplexed data.

Further, in FIG. 1, in the host device 10, the multiplexing communication line JL is connected to the terminal J1 of the jack 11, and a function of multiplexed data communication (hereinafter referred to as multiplexing communication) is assigned to the terminal J1 of the jack 11 in a fixed manner. Further, the terminal J#M of the jack 11 is connected to the ground, and thus, a function of the ground is assigned to the terminal J#M in a fixed manner.

Thus, in the host device 10, target terminals to which the function switching unit 15 assigns functions are N−2 terminals other than the terminals J1 and J#M among the terminals J1 to J#N of the jack 11, but the terminals J1 and J#M can be the target terminals to which the function switching unit 15 assigns functions.

In this regard, the same applies the terminals P1 to P#N of the plug 21 of the peripheral device 20.

Figure 2:
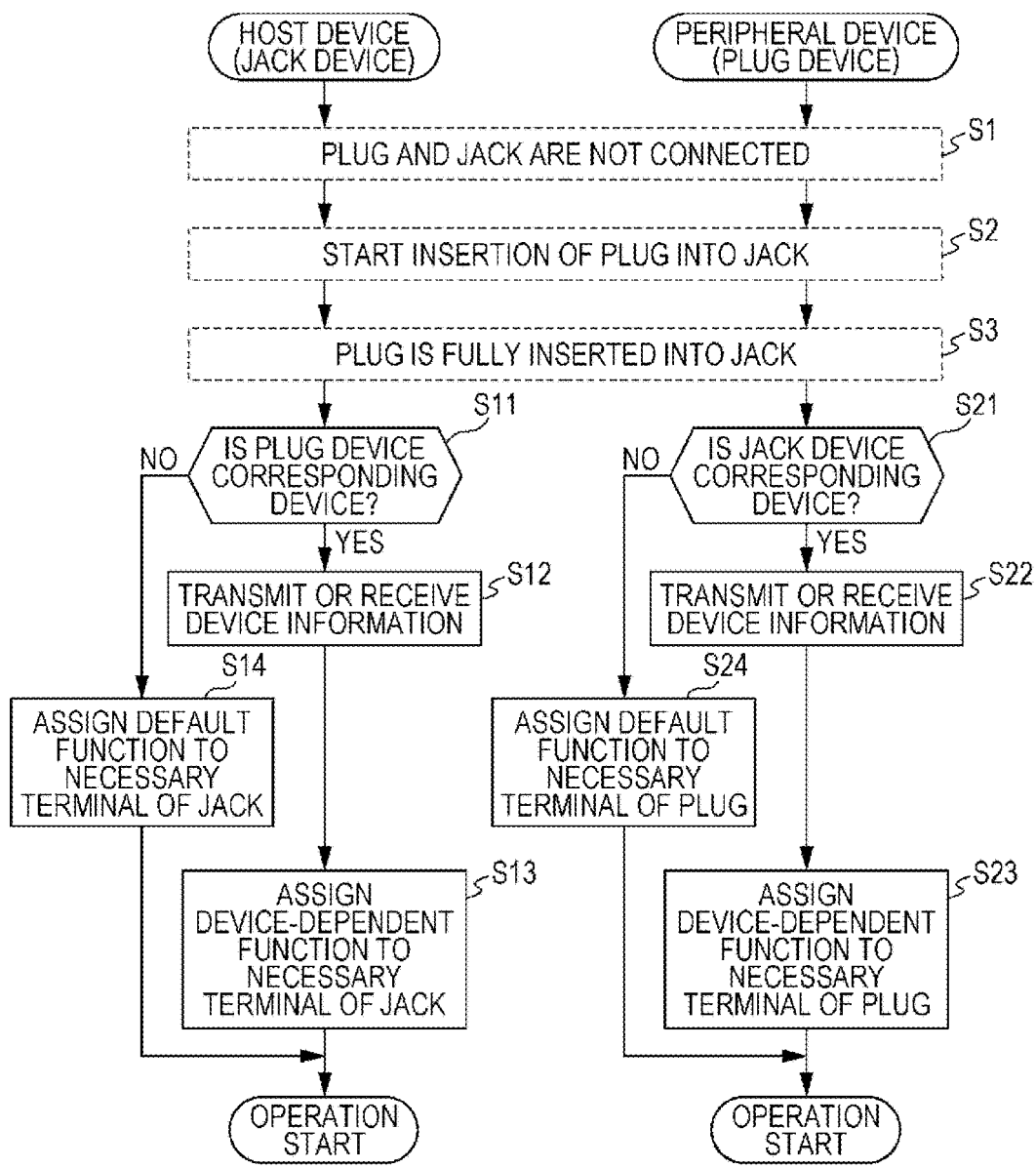
FIG. 2 is a block diagram illustrating a configuration example of an embodiment of a signal processing system to which the present technology is applied.

FIG. 2 is a flowchart illustrating an example of the operation of the signal processing system of FIG. 1.

In step S1, the jack 11 of the host device 10 and the plug 21 of the peripheral device 20 are not connected.

In step S2, a user starts the insertion of the plug 21 into the jack 11. When the user continues to insert the plug 21 into the jack 11, the state becomes a state in which the plug 21 is fully inserted into the jack 11 (a state in which the plug 21 can be no longer inserted into the jack 11, hereinafter referred to as a full insertion state) in step S3.

When the plug 21 enters the full insertion state, the terminal J#n of the jack 11 and the terminal P#n of the plug 21 are (electrically) connected.

Also, in step S11, the correspondence detection unit 12 of the host device 10 determines (detects) whether the plug device in which the plug has been inserted (hereinafter referred simply to as connected) into the jack 11 is a corresponding device.

That is, in the peripheral device 20, for example, when a predetermined change occurs in impedance (or a voltage of the terminal P1) when the terminal P1 of the plug 21 is viewed from the correspondence detection unit 22 and transmission and reception processing unit 23, the plug 21 is inserted into the jack, and the correspondence detection unit 22 or the transmission and reception processing unit 23 transmits multiplexed data of a predetermined authentication pattern PTNP via the multiplexing communication line PL and the terminal P1 of the plug 21.

This authentication pattern PTNP is received by the correspondence detection unit 12 via the terminal J1 of the jack 11 and the multiplexing communication line JL.

The correspondence detection unit 12 determines that the plug device is a corresponding device (detects that the plug device is a corresponding device) when the correspondence detection unit 12 receives the authentication pattern PTNP, and determines that the plug device is not a corresponding device when the correspondence detection unit 12 does not receive the authentication pattern PTNP.

When it is determined that the plug device is a corresponding device in step S11, the process proceeds to step S12 and the transmission and reception processing unit 13 transmits and receives the multiplexed data device information to and from the peripheral device 20 as the plug device that is a corresponding device.

That is, through the control unit 14, the transmission and reception processing unit 13 acquires device information of the host device 10 from the storage unit 17, includes the device information in the multiplexed data, and transmits the multiplexed data to the transmission and reception processing unit 23 of the peripheral device 20 via the multiplexing communication line JL, the terminal J1 of the jack 11, the terminal P1 of the plug 21, and the multiplexing communication line PL.

Further, the transmission and reception processing unit 13 receives the multiplexed data including the device information of the peripheral device 20 transmitted from the transmission and reception processing unit 23 of the peripheral device 20 via the multiplexing communication line PL, the terminal P1 of the plug 21, the terminal J1 of the jack 11, and the multiplexing communication line JL in step S22 to be described below.

Also, in step S13, in the host device 10, the function switching unit 15 connects the necessary terminal J#n of the jack 11 to the necessary functional block $16_k$ based on (for example, a type of the peripheral device 20 recognized from) the device information of the peripheral device 20 included in the multiplexed data received by the transmission and reception processing unit 13, to assign the function included in the functional block $16_k$ to the necessary terminal J#n of the jack 11 as a device dependent function provided for the peripheral device 20.

That is, the transmission and reception processing unit 13 separates the device information of the peripheral device 20 from the multiplexed data received from the transmission and reception processing unit 23 of the peripheral device 20, and supplies the device information to the control unit 14 and the signal processing unit 18.

The control unit 14 or the signal processing unit 18 controls the function switching unit 15 depending on the device information of the peripheral device 20 from the transmission and reception processing unit 13, and thus, the function switching unit 15 assigns the function dependent on the device information of the peripheral device 20 among the functions included in the functional blocks $16_1$ to $16_K$ to one or more terminals J#n of the jack 11.

Further, the signal processing unit 18 determines signal processing to be executed, depending on the device information of the peripheral device 20 from the transmission and reception processing unit 13, and starts the signal processing.

Thus, the functions and the signal processing dependent on the device information of the peripheral device 20 are provided from the host device 10 to the peripheral device 20.

On the other hand, when it is determined that the plug device is not a corresponding device in step S11, the process proceeds to step S14, and the correspondence detection unit 12 controls the function switching unit 15 to connect a predetermined number of (one or more) default terminals J#n of the jack 11 to the functional block $16_k$ having a default function to assign the default function to the default terminal J#n of the jack 11.

Further, the signal processing unit 18 determines default signal processing as signal processing to be executed, and starts the default signal processing.

Therefore, when the plug device which is not a corresponding device is connected to the host device 10 (the jack 11), the default function and the default signal processing are provided from the host device 10 to the peripheral device 20.

Further, when the plug 21 enters a full insertion state, the correspondence detection unit 22 of the peripheral device 20 determines (detects) whether the jack device in which the plug 21 has been inserted (hereinafter referred simply to as connected) into the jack is a corresponding device in step S21.

That is, in the host device 10, for example, when a predetermined change occurs in impedance (or a voltage of the terminal J1) when the terminal J1 of the jack 11 is viewed from the correspondence detection unit 12 and transmission and reception processing unit 13, the plug is inserted into the jack 11, and the correspondence detection unit 12 or the transmission and reception processing unit 13 transmits multiplexed data of a predetermined authentication pattern PTNJ via the multiplexing communication line JL and the terminal J1 of the jack 11.

This authentication pattern PTNJ is received by the correspondence detection unit 22 via the terminal P1 of the plug 21 and the multiplexing communication line PL.

When the correspondence detection unit 22 receives the authentication pattern PTNJ, the correspondence detection unit 22 determines that the jack device is a corresponding device (detects that the jack device is a corresponding device), and when the correspondence detection unit 22 does not receive the authentication pattern PTNJ, the correspondence detection unit 22 determines that the jack device is not a corresponding device.

When it is determined that the jack device is a corresponding device in step S21, the process proceeds to step S22 and the transmission and reception processing unit 23 includes the device information in the multiplexed data and transmits or receives the multiplexed data to or from the host device 10 as the jack device that is a corresponding device.

That is, through the control unit 24, the transmission and reception processing unit 23 acquires the device information of the peripheral device 20 from the storage unit 27, includes the device information in the multiplexed data, and transmits the multiplexed data to the transmission and reception processing unit 13 of the host device 10 via the multiplexing communication line PL, the terminal P1 of the plug 21, the terminal J1 of the jack 11, and the multiplexing communication line JL.

Further, the transmission and reception processing unit 23 receives the multiplexed data including the device information of the host device 10 transmitted from the transmission and reception processing unit 13 of the host device 10 via the multiplexing communication line JL, the terminal J1 of the jack 11, the terminal P1 of the plug 21, and the multiplexing communication line PL in step S12 described above.

Also, in step S23, in the peripheral device 20, the function switching unit 25 connects the necessary terminal P#n of the plug 21 to the necessary functional block $26_1$ based on (for example, a type of the host device 10 recognized from) the device information of the host device 10 included in the multiplexed data received by the transmission and reception processing unit 23 to assign the function of the functional block $26_1$ to the necessary terminal P#n of the plug 21 as a device dependent function to be provided for the host device 10.

That is, the transmission and reception processing unit 23 separates the device information of the host device 10 from the multiplexed data received from the transmission and reception processing unit 13 of the host device 10, and supplies the device information to the control unit 24.

The control unit 24 controls the function switching unit 25 depending on the device information of the host device 10 from the transmission and reception processing unit 23, and thus, the function switching unit 25 assigns the function dependent on the device information of the host device 10 among the functions of the functional blocks $26_1$ to $26_L$ to each of the one or more terminals P#n of the plug 21.

As a result, the function dependent on the device information of the host device 10 is provided from the peripheral device 20 to the host device 10.

On the other hand, when it is determined in step S21 that the jack device is not a corresponding device, the process proceeds to step S24, and the correspondence detection unit 22 controls the function switching unit 25 to connect a predetermined number of (one or more) default terminals P#n of the plug 21 to the functional block $26_1$ having a default function to assign the default function to the default terminal P#n of the plug 21.

Therefore, when the jack device which is not a corresponding device is connected to (the plug 21 of) the peripheral device 20, the default function is provided from the peripheral device 20 to the host device 10.

As described above, the host device 10 includes the correspondence detection unit 12 that detects whether the jack 11 and the plug device are corresponding devices, and when the plug device is a corresponding device, the host device 10 transmits or receives multiplexed data via the terminal J1 of the jack 11, and performs assignment of the electrical function of the terminals other than the terminals J1 and J#M of the jack 11.

Further, the peripheral device 20 includes the plug 21, the I/F $28_r$ including one or a plurality of conversion units that convert a physical amount into an electrical signal or convert an electrical signal into a physical amount, and the correspondence detection unit 22 that detects whether the jack device is a corresponding device. When the jack device is a corresponding device, the peripheral device 20 transmits or receives multiplexed data via the terminal P1 of the plug 21 and performs assignment of an electrical function of the terminals other than the terminals P1 and P#M of the plug 21.

Therefore, it is possible to switch the electrical function of the terminals of the jack 11 or plug 21 while performing transmission and reception of multiplexed data between the host device 10 that is a jack device and the peripheral device 20 that is a plug device. Further, it is possible to achieve effective utilization of the terminal J#n of the jack 11 and the terminal P#n of the plug 21.

Further, since the host device 10 assigns the function to the terminal J#n of the jack 11 depending on the device information of the peripheral device 20 connected to the host device 10, it is possible to flexibly (dynamically) switch the function assigned to the terminal J#n of the jack 11 depending on the peripheral device 20 connected to the host device 10.

Similarly, since the peripheral device 20 assigns the function to the terminal P#n of the plug 21 depending on the device information of the host device 10 connected to the peripheral device 20, it is possible to flexibly switch the function assigned to the terminal P#n of the plug 21 depending on the host device 10 connected to the peripheral device 20.

Further, the number N of terminals J#n of the jack 11 of the host device 10 and the number N of terminals P#n of the plug 21 of the peripheral device 20 do not have to necessarily match, but it is assumed that the number N of terminals J#n of the jack 11 and the number N of terminals P#n of the plug 21 match so as to simplify description.

Further, a relationship between the number N of terminals J#n of the jack 11, the number N of terminals P#n of the plug 21, the number K of functional blocks $16_k$, and the number L of functional blocks $26_1$ is not particularly limited. A relationship between the number K of functional blocks $16_k$ and the number L of functional blocks $26_1$ also is not particularly limited.

Here, for example, a portable device capable of signal processing, such as a portable telephone, a smartphone, a portable music player, a digital camera, or a laptop PC (Personal Computer), can be adopted as the host device 10. Further, for example, an arbitrary device capable of signal processing, such as a tablet terminal, a stationary PC, or a TV (television set), can be adopted as the host device 10.

For example, a headset having one driver that converts an audio signal into corresponding sound and outputs the sound, a headset including one or more drivers and one or more microphones that collect sound and convert the sound into a corresponding audio signal, or the like can be adopted as the peripheral device 20.

Further, for example, a device including one or a plurality of conversion units that convert a physical amount into an electrical signal or one or a plurality of conversion units that convert an electrical signal into a physical amount, such as the physical amount input device or the physical amount output device as described above, can be adopted as the peripheral device 20.

Further, for the conversion unit of the peripheral device 20, the conversion unit can be fixed to the peripheral device 20, and the conversion unit can be configured so that all or some components of the conversion unit are detachably mounted on the peripheral device 20.

Hereinafter, in order to facilitate the description, a smartphone having a function of a device that processes an audio signal, such as a music player or a telephone, is adopted as the host device 10, a headset connected to the host device 10 as the smartphone is adopted as the peripheral device 20, and specific examples of a signal processing system including the host device 10 and the peripheral device 20 will be described.

<First Specific Example of Signal Processing System>

Figure 3:
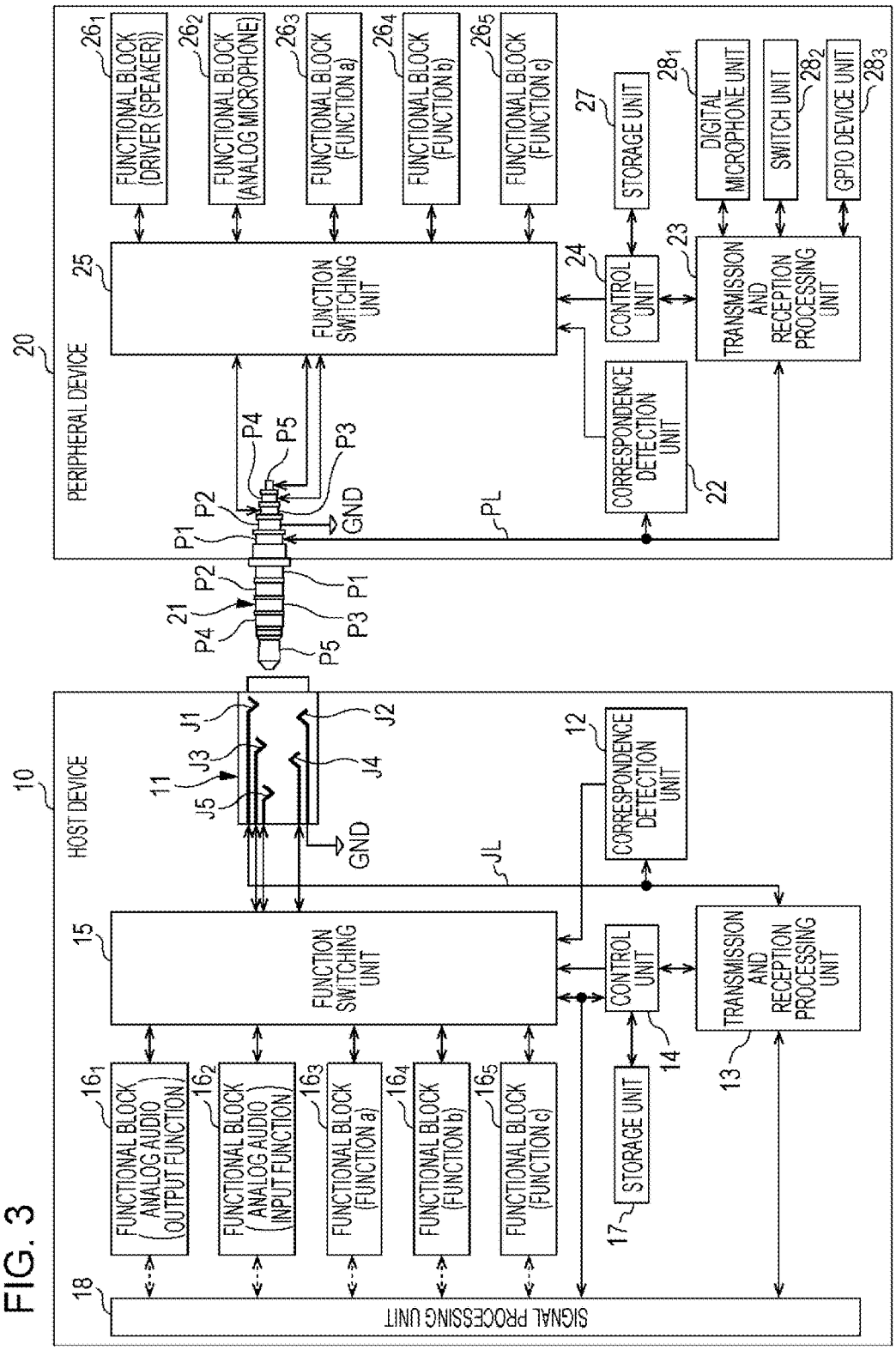
FIG. 3 is a block diagram illustrating a first specific example of the signal processing system.

FIG. 3 is a block diagram illustrating a first specific example of the signal processing system of FIG. 1.

Further, portions corresponding to those in FIG. 1 are denoted with the same reference signs and, hereinafter, description thereof will be appropriately omitted.

In FIG. 3, for example, a multi-pole 3.5 mm multi-pole single-headed plug with 5 poles is adopted as the plug 21, and a multi-pole single-headed jack corresponding to the multi-pole 3.5 mm multi-pole single-headed plug with 5 poles is adopted as the jack 11.

Therefore, the jack 11 includes five (pole) terminals J1 to J5, and the plug 21 includes five (pole) terminals P1 to P5. Also, when the plug 21 is fully inserted into the jack 11, the terminal J#n of the jack 11 and the terminal P#n of the plug 21 are (electrically) connected.

Further, in FIG. 3, the terminal J1 among the five terminals J1 to J5 of the jack 11 is connected to the multiplexing communication line JL, and the terminal J2 is connected to the ground. Also, the other terminals J3 to J5 are connected to the function switching unit 15.

Further, in FIG. 3, the terminal P1 among the five terminals P1 to P5 of the plug 21 is connected to the multiplexing communication line PL, and the terminal P2 is connected to the ground. Also, the other terminals P3 to P5 are connected to the function switching unit 25.

Hereinafter, the terminals J1 and P1 connected to the multiplexing communication lines JL and PL are respectively referred to as communication terminals J1 and P1, and the terminals J2 and P2 connected to the ground are respectively referred to as GND terminals J2 and P2.

Here, an existing headset includes a headset having a 3.5 mm multi-pole single-headed plug with 5 poles that includes terminals for (two) L (left) and R (right) channel drivers (speakers) that output sound of L and R channels, terminals for (two) L and R channel microphones that collect sound of L and R channels, and a GND terminal.

A plug having the same structure as the multi-pole single-headed plug with 5 poles included in the existing headset as described above can be adopted as the plug 21, and the multi-pole single-headed jack with 5 poles corresponding to the multi-pole single-headed plug with 5 poles included in the existing headset as described above can be adopted as the jack 11.

In this case, the plug 21 can be inserted into the jack (multi-pole single-headed jack with 5 poles) of jack devices such as an existing music player, which can use an existing headset with 5 poles (having a multi-pole single-headed plug). Further, the plug (multi-pole single-headed plug with 5 poles) of the existing headset with 5 poles can be inserted into the jack 11.

Further, the plug 21 is not limited to the same plug as the multi-pole single-headed plug with 5 poles included in the existing headset and is not limited to the plug with 5 poles. That is, for example, a plug with 3 or 4 poles or a plug with 6 or more poles can be adopted as the plug 21. The same applies to the jack 11.

Further, in FIG. 3 (and FIG. 1 described above and the drawings to be described below), the plug 21 is directly provided in a main body of the peripheral device 20 so as to simplify FIG. 3, but the plug 21 can be connected to the main body of the peripheral device 20 through a cable. Further, the host device 10 and the peripheral device 20 can be connected to each other through a cable in which the same plug as the plug 21 is provided in one end and the same jack as the jack 11 is provided in the other end.

Here, 5 pole terminals of a (multi-pole single-headed) plug with 5 poles included in an existing headset (the same applies to a jack with 5 poles corresponding to this plug) include, for example, terminals for audio signals supplied to L and R channel drivers (hereinafter referred to as an L driver terminal and an R driver terminal, respectively), terminals for audio signals output from L and R channel microphones (hereinafter referred to as an L microphone terminal and an R microphone terminal, respectively), and a GND terminal connected to the ground.

An example of an existing headset includes a headset having a (multi-pole single-headed) plug with 4 poles (for example, a plug with CTIA4 poles in which an L driver terminal, an R driver terminal, a GND terminal, and a monaural microphone terminal are provided from a head of the plug) in which a monaural microphone terminal for an audio signal output from a monaural microphone is provided in place of the L microphone terminal and the R microphone terminal among the L driver terminal, the R driver terminal, the L microphone terminal, the R microphone terminal, and the GND terminal of the plug with 5 poles.

Further, an example of an existing headset includes a headset having a (multi-pole single-headed) plug with 3 poles in which there are no L microphone terminal and R microphone terminal among the L driver terminal, the R driver terminal, the L microphone terminal, the R microphone terminal, and the GND terminal of the plug with 5 poles.

The plug 21 with 5 poles can be configured so that the GND terminal P2 is connected to a GND terminal of the jack with 4 poles, the L driver terminal, the R driver terminal, and the monaural microphone terminal of the jack with 4 poles are respectively connected to one non-overlap terminal among the terminals P1 and P3 to P5, and an arbitrary two terminals among the terminals P1 to P5 of the plug 21 with 5 poles or an arbitrary two terminals among the L driver terminal, the R driver terminal, and the monaural microphone terminal of the 4-pole jack are not short-circuited when the plug 21 is inserted into the jack with 4 poles corresponding to the plug with 4 poles.

Further, the plug 21 with 5 poles can be configured so that the GND terminal P2 is connected to a GND terminal of the jack with 3 poles, the L driver terminal and the R driver terminal of the jack with 3 poles are respectively connected to one non-overlap terminal among the terminals P1 and P3 to P5, and an arbitrary two terminals among the terminals P1 to P5 of the plug 21 with 5 poles or the L driver terminal and the R driver terminal of the 3-pole jack are not short-circuited when the plug 21 is inserted into the jack with 3 poles corresponding to the plug with 3 poles.

The same applies to the jack 11.

In FIG. 3, five functional blocks $16_1$ to $16_5$ are provided as the functional blocks $16_1$ to $16_K$ of the host device 10.

For example, the functional block $16_1$ of five functional blocks $16_1$ and $16_5$ has the analog audio output function described above. Therefore, the functional block $16_1$ performs DA conversion of the digital audio signal supplied from the signal processing unit 18, amplifies the audio signal as necessary, and outputs a resultant analog audio signal to the function switching unit 15.

Further, the functional block $16_2$ has, for example, the analog audio input function described above. Therefore, the functional block $16_2$ has, for example, a signal line pulled up by a resistor and having one end connected to the function switching unit 15 and the other end connected to the signal processing unit 18, and supplies (transfers) an analog audio signal supplied from the function switching unit 15 to the signal processing unit 18 via the signal line that is pulled up.

The functional blocks $16_3$ to $16_5$ have predetermined functions a, b, and c, respectively. For example, function c that is one of functions a to c can be the power supply function described above.

Further, in FIG. 3, five functional blocks $26_1$ to $26_5$ are provided as the functional blocks $26_1$ to $26_K$ of the peripheral device 20.

For example, the functional block $26_1$ of the five functional blocks $26_1$ to $26_5$ has the analog audio output function described above. Therefore, the functional block $26_1$ includes a driver, and outputs audio corresponding to an analog audio signal supplied from the function switching unit 25. Further, one driver that outputs monaural audio or two drivers that output L and R channel audios can be provided in the functional block $26_1$.

Further, the functional block $26_2$ has, for example, the analog audio input function described above. Therefore, the functional block $26_2$ has a microphone, and collects sound and outputs a corresponding analog audio signal to the function switching unit 25.

The functional blocks $26_3$ to $26_5$ have predetermined functions a, b, and c, respectively. For example, function c that is one of functions a to c can be the power supply function, as described above.

Further, for example, both of the functional block $16_3$ of the host device 10 and the functional block $26_3$ of the peripheral device 20 have function a, but the functional blocks $16_3$ and $26_3$ are assumed to provide function a, as a whole, in a state in which the functional block $16_3$ and the functional block $26_3$ are electrically connected. The same applies to the other functional blocks $16_i$ and $26_i$.

In FIG. 3, the functional block $16_1$ having an analog audio output function and the terminal J#n among the terminals J3 to J5 of the jack 11 are connected to each other in the function switching unit 15, and the functional block $26_1$ having an analog audio output function and the terminal P#n among the terminals P3 to P5 of the plug 21 are connected to each other in the function switching unit 25. Accordingly, the functional block $16_1$ and the functional block $26_1$ are electrically connected to each other and the analog audio output function is provided.

That is, the digital audio signal output by the functional block $16_1$ is supplied to the functional block $26_1$ via the function switching unit 15, the terminal J#n of the jack 11, the terminal P#n of the plug 21, and the function switching unit 25, and sound corresponding to the digital audio signal output by the functional block $16_1$ is output from the driver of the functional block $26_1$.

Further, the functional block $16_2$ having an analog audio input function and the terminal J#n among the terminals J3 to J5 of the jack 11 are connected to each other in the function switching unit 15, and the functional block $26_2$ having an analog audio input function and the terminal P#n among the terminals P3 to P5 of the plug 21 are connected to each other in the function switching unit 25. Accordingly, the functional block $16_2$ and the functional block $26_2$ are electrically connected to each other, and the analog audio input function is provided.

That is, in the functional block $26_2$, for example, an analog audio signal corresponding to sound such as a voice of the user collected by the microphone is supplied to the functional block $26_2$ via the function switching unit 25, the terminal P#n of the plug 21, the terminal J#n of the jack 11, and the function switching unit 15, and transmitted to the signal processing unit 18.

In the signal processing unit 18, the analog audio signal supplied (transmitted) as described above is, for example, DA-converted and recorded, or transmitted as an audio signal of a telephone of the host device 10 that is a smartphone.

Further, the functional block $16_3$ having function a and the terminal J#n among the terminals J3 to J5 of the jack 11 are connected to each other in the function switching unit 15, and the functional block $26_3$ having function a and the terminal P#n among the terminals P3 to P5 of the plug 21 are connected to each other in the function switching unit 25. Accordingly, the functional block $16_3$ and the functional block $26_3$ are electrically connected, and function a is provided.

Further, the functional block $16_4$ having function b and the terminal J#n among the terminals J3 to J5 of the jack 11 are connected to each other in the function switching unit 15, and the functional block $26_4$ having function b and the terminal P#n among the terminals P3 to P5 of the plug 21 are connected to each other in the function switching unit 25. Accordingly, the functional block $16_4$ and the functional block $26_4$ are electrically connected and function b is provided.

Similarly, the functional block $16_5$ having function c and the terminal J#n among the terminals J3 to J5 of the jack 11 are connected to each other in the function switching unit 15, and the functional block $26_5$ having function c and the terminal P#n among the terminals P3 to P5 of the plug 21 are connected to each other in the function switching unit 25. Accordingly, the functional block $16_5$ and the functional block $26_5$ are electrically connected, and function c is provided.

In FIG. 3, a digital microphone unit $28_1$, a switch unit $28_2$, and a GPIO device unit $28_3$ are provided as I/Fs $28_1$ to $28_R$ of the peripheral device 20.

The microphone unit $28_1$ includes a microphone that converts sound into an analog audio signal, an amplifier that amplifies the analog audio signal, and an ADC that AD-converts the analog audio signal after amplification into a digital audio signal, and collects sound, converts the sound into a corresponding digital audio signal, and supplies (outputs) the digital audio signal to the transmission and reception processing unit 23.

Further, in the digital microphone unit $28_1$, a plurality of sets (hereinafter referred to as digital microphone sets) of the microphone, the amplifier and the ADC, as the conversion unit that converts the sound into the digital audio signal, can be provided, and an audio signal of a plurality of channels obtained by the plurality of digital microphone sets can be supplied to the transmission and reception processing unit 23 as a signal included in the multiplexed data.

The switch unit $28_2$ includes a switch pressed by a user, and converts a pressing operation (pressure) of the switch by the user as a physical amount into a 1-bit digital signal (impedance) indicating ON or OFF of the switch as an electrical signal, and supplies (outputs) the digital signal to the transmission and reception processing unit 23.

Further, for the switch unit $28_2$, a plurality of switches can be provided, and a digital signal of a plurality of bits indicating ON or OFF of the plurality of switches can be supplied to the transmission and reception processing unit 23, similarly to the digital microphone unit $28_1$.

The GPIO device unit $28_3$ includes a device capable of exchanging the digital signal via a GPIO, and performs exchange of the digital signal according to the GPIO with the transmission and reception processing unit 23.

Here, the host device 10 as a smartphone is assumed to include a battery (not illustrated) built thereinto and to operate with power from the battery. Further, in the host device 10, for example, it is assumed that the multiplexing communication line JL is pulled up with the power of the battery.

In the signal processing system of FIG. 3 configured as above, when the user inserts the plug 21 into the jack 11 and the plug 21 enters a full insertion state, that is, when the terminals J1 to J5 of the jack 11 and the terminals P1 to P5 of the plug 21 are connected to each other, power necessary for multiplexing communication (communication of the multiplexed data between the transmission and reception processing units 13 and 23) is supplied from a power supply (not illustrated) that pulls up the multiplexing communication line JL in the host device 10 as a smartphone to the multiplexing communication line PL of the peripheral device 20 as a headset via the terminal J1 of the jack 11 and the terminal P1 of the plug 21. The peripheral device 20 enters a state in which the peripheral device 20 can perform the multiplexing communication using such power as a power supply.

Here, the power supplied from the host device 10 to the multiplexing communication line PL of the peripheral device 20 is, for example, minimum power necessary to perform a process regarding the multiplexing communication or low power obtained by adding some margin to the necessary minimum power, and thus, the low power is assumed to be unable to be used as a power supply for (a block that performs) a process separate from the process regarding the multiplexing communication. That is, in order for the peripheral device 20 to perform a process asking for a power supply separate from the process regarding the multiplexing communication, it is necessary for power to be supplied to the peripheral device 20 separately from the power supplied from the host device 10 to the multiplexing communication line PL of the peripheral device 20.

Further, for example, a power supply such as a battery (not illustrated) can be built into the peripheral device 20, and necessary power can be supplied from the power supply. In this case, the peripheral device 20 does not have to receive supply of the power that is supplied power from the host device 10.

When the plug 21 enters a full insertion state, the transmission and reception processing unit 13 transmits multiplexed data of a predetermined authentication pattern PTNJ via the multiplexing communication line JL and the terminal J1 of the jack 11.

This authentication pattern PTNJ is received by the correspondence detection unit 22 via the terminal P1 of the plug 21 and the multiplexing communication line PL.

The correspondence detection unit 22 detects that the jack device into which the plug 21 is inserted is a corresponding device by receiving the authentication pattern PTNJ, and supplies detection information indicating a detection result to the transmission and reception processing unit 23.

When the plug 21 enters a full insertion state and detection information indicating that the jack device into which the plug 21 is inserted is a corresponding device is supplied from the correspondence detection unit 22, the transmission and reception processing unit 23 transmits multiplexed data of a predetermined authentication pattern PTNP via the multiplexing communication line PL and the terminal P1 of the plug 21.

This authentication pattern PTNP is received by the correspondence detection unit 12 via the terminal J1 of the jack 11 and the multiplexing communication line JL.

The correspondence detection unit 12 detects that the plug device of which the plug is inserted into the jack 11 is a corresponding device by receiving the authentication pattern PTNP, and supplies detection information indicating a detection result to the transmission and reception processing unit 13.

When the detection information indicating that the plug device of which the plug is inserted into the jack 11 is a corresponding device is supplied from the correspondence detection unit 12, the transmission and reception processing unit 13 acquires the device information of the host device 10 from the storage unit 17 through the control unit 14, includes the device information in the multiplexed data, and transmits the multiplexed data to the transmission and reception processing unit 23 of the peripheral device 20 via the multiplexing communication line JL, the terminal J1 of the jack 11, the terminal P1 of the plug 21, and the multiplexing communication line PL.

The transmission and reception processing unit 23 receives the multiplexed data including the device information of the host device 10 transmitted from the transmission and reception processing unit 13 of the host device 10, separates the device information of the host device 10 from the multiplexed data, and supplies the device information to the control unit 24.

The control unit 24 controls the function switching unit 25 depending on the device information of the host device 10 from the transmission and reception processing unit 23, and thus, the function switching unit 25 assigns the functions dependent on the device information of the host device 10 among the functions of the functional blocks $26_1$ to $26_5$ to one or more terminals P#n among the terminals P3 to P5 of the plug 21.

Further, the transmission and reception processing unit 23 acquires the device information of the peripheral device 20 from the storage unit 27 through the control unit 24, includes the device information in the multiplexed data, and transmits the multiplexed data to the transmission and reception processing unit 13 of the host device 10 via the multiplexing communication line PL, the terminal P1 of the plug 21, the terminal J1 of the jack 11, and the multiplexing communication line JL.

The transmission and reception processing unit 13 receives the multiplexed data including the device information of the peripheral device 20 transmitted from the transmission and reception processing unit 23 of the peripheral device 20, separates the device information of the peripheral device 20 from the multiplexed data, and supplies the device information to the control unit 14 and the signal processing unit 18.

The control unit 14 or the signal processing unit 18 controls the function switching unit 15 depending on the device information of the peripheral device 20 from the transmission and reception processing unit 13, and thus, the function switching unit 15 assigns the functions dependent on the device information of the peripheral device 20 among the functions of the functional blocks $16_1$ and $16_5$ to the one or more terminals J#n among the terminals J3 to J5 of the jack 11.

Further, the signal processing unit 18 determines signal processing to be executed depending on the device information of the peripheral device 20 from the transmission and reception processing unit 13, and starts the signal processing.

Further, necessary multiplexed data is transmitted and received between the transmission and reception processing unit 13 of the host device 10 and the transmission and reception processing unit 23 of the peripheral device 20 via the multiplexing communication line JL, the terminal J1 of the jack 11, the terminal P1 of the plug 21, and the multiplexing communication line PL.

The multiplexed data transmitted from the transmission and reception processing unit 13 of the host device 10 to the transmission and reception processing unit 23 of the peripheral device 20 can include, for example, a command for the peripheral device 20, data supplied (input) to the GPIO device unit $28_3$, or the like.

Here, according to the command for the peripheral device 20, the host device 10 can control the peripheral device 20 and recognize a status of the peripheral device 20.

The multiplexed data transmitted from the transmission and reception processing unit 23 of the peripheral device 20 to the transmission and reception processing unit 13 of the host device 10 can include a digital audio signal corresponding to sound collected by the digital microphone unit $28_1$, a digital signal corresponding to an operation of the switch unit $28_2$, data output by the GPIO device unit $28_3$, a response to the command from the transmission and reception processing unit 13 of the host device 10, and the like.

Here, in FIG. 3, in the host device 10, the control unit 14 or the signal processing unit 18 recognizes, for example, that the peripheral device 20 has the analog audio output function, the analog audio input function, and functions a to c based on the device information of the peripheral device 20.

Since the host device 10 has the analog audio output function, the analog audio input function, and functions a to c, similar to the peripheral device 20, the control unit 14 or the signal processing unit 18 recognizes the analog audio output function, the analog audio input function, and functions a to c as common functions between the host device 10 and the peripheral device 20.

Further, the control unit 14 or the signal processing unit 18 selects functions assigned to one or more of the terminals J3 to J5 of the jack 11 as assignment functions from among the common functions, and selects the terminal J#n to which the assignment functions are to be assigned, as an assignment terminal J#n.

Also, the control unit 14 or the signal processing unit 18 controls the function switching unit 15 to connect the functional block $16_k$ having the assignment function to the assignment terminal J#n of the jack 11 selected as the terminal to which the assignment function is to be assigned.

The function switching unit 15 connects the functional block $16_k$ having the assignment function to the assignment terminal J#n of the jack 11 to assign the assignment function to the assignment terminal J#n of the jack 11 under control of the control unit 14 or the signal processing unit 18.

Also, in the peripheral device 20, the control unit 24 recognizes the analog audio output function, the analog audio input function, and functions a to c as common functions based on the device information of the host device 10, similarly to the host device 10.

Further, the control unit 24 selects functions to be assigned to one or more of the terminals P3 to P5 of the plug 21 as assignment functions from among the common functions, and selects the terminal P#n to which the assignment functions are to be assigned, as assignment terminal P#n.

Also, the control unit 24 controls the function switching unit 25 to connect the functional block $26_1$ having the assignment function to the assignment terminal P#n of the plug 21 selected as the terminal to which the assignment function is to be assigned.

The function switching unit 25 connects the functional block $26_1$ having the assignment function to the assignment terminal P#n of the plug 21 to assign the assignment function to the assignment terminal P#n of the plug 21 under control of the control unit 24.

Here, arguments n of the terminal J#n of the jack 11 and the terminal P#n of the plug 21 is referred to as a terminal number, and if it is assumed that the terminals J#n and P#n having the same terminal number n are connected when the plug 21 is fully inserted into the jack 11, the terminals J#n and P#n having the same terminal number are selected as assignment terminals J#n and P#n for a certain function x in the host device 10 and the peripheral device 20.

Accordingly, the functional blocks $16_k$ and $26_1$ having the same function x are connected via the function switching unit 15, the assignment terminal J#n of the jack 11, the assignment terminal P#n of the plug 21, and the function switching unit 25, and the function x is provided.

Further, in the host device 10 and the peripheral device 20, the terminals J#n and P#n having the same terminal number can be selected as the assignment terminals J#n and P#n for the certain function x, for example, by determining the terminal number n of the terminals J#n and P#n to be selected as assignment terminals J#n and P#n in advance for the certain function x.

Further, for example, in the host device 10, the terminal number n of the assignment terminal J#n assigned for the certain function x is included in the multiplexed data, and transmitted to the peripheral device 20, and in the peripheral device 20, the terminal P#n having the same terminal number n as the terminal number n included in the multiplexed data from the host device 10 is selected as the assignment terminal P#n for function x. Accordingly, the terminals J#n and P#n having the same terminal number can be selected as the assignment terminals J#n and P#n for a certain function x in the host device 10 and the peripheral device 20.

In FIG. 3, since the terminal J1 of the jack 11 and the terminal P1 of the plug 21 are assigned to the multiplexing communication function in a fixed manner, and the terminal J2 of the jack 11 and the terminal P2 of the plug 21 are connected to GND in a fixed manner, a total of three functions can be respectively assigned to three terminal sets, including a terminal set of the terminal J3 of the jack 11 and the terminal P3 of the plug 21 (hereinafter referred to as a terminal set (J3, P3)), a terminal set (J4, P4), and a terminal set (J5, P5).

However, after the transmission and reception of the device information is completed between the host device 10 and the peripheral device 20, a function rather than the multiplexing communication function can be assigned to the terminal set (J1, P1) to which the multiplexing communication function has been assigned.

Further, in the function switching units 15 and 25, when the assignment of the functions to the three terminal sets (J3, P3), (J4, P4) and (J5, P5) is performed, the maximum number of functions that can be assigned to the three terminal sets (J3, P3) to (J5, P5) is 3.

Meanwhile, the host device 10 and the peripheral device 20 of FIG. 3 have a total of five functions, including the analog audio output function, the analog audio input function, and functions a to c. Therefore, in the host device 10 and the peripheral device 20, a maximum of three functions are selected as assignment functions from among the five functions, terminal sets corresponding to the number of assignment functions are selected as assignment terminal sets from among the three terminal sets (J3, P3) to (J5, P5), and the assignment functions are assigned to the assignment terminal sets.

For example, in the host device 10, two functions of the analog audio output function and the analog audio input function may be selected as the assignment functions from among the analog audio output function, the analog audio input function, and functions a to c, and the terminals J3 and J4 corresponding to the number of the assignment functions are selected as the assignment terminals from among the terminals J3 to J5 of the jack 11. Also, for example, the analog audio output function is assigned to the assignment terminal J3, and the analog audio input function is assigned to the assignment terminal J4.

In this case, in the peripheral device 20, two functions including the analog audio output function and the analog audio input function are selected as assignment functions from among the analog audio output function, the analog audio input function, and functions a to c, the terminals P3 and P4 of the plug 21 are selected as assignment terminals, the analog audio output function is assigned to the assignment terminal P3, and the analog audio input function is assigned to the assignment terminal P4, similarly to the host device 10.

Further, in this case, one of functions a to c can be assigned to the terminal set (J5, P5) or none of functions a to c can be assigned to the terminal set (J5, P5).

Further, for example, in the host device 10, three functions including functions a to c are selected as assignment functions from among the analog audio output function, the analog audio input function, and functions a to c, the three terminals J3 to J5 corresponding to the number of the assignment functions are selected as assignment terminals from among the terminals J3 to J5 of the jack 11, and the assignment functions a to c can be assigned to the assignment terminals J3 to J5, respectively.

In this case, in the peripheral device 20, three functions including functions a to c are selected as assignment functions from among the analog audio output function, the analog audio input function, and functions a to c, the terminals P3 to P5 of the plug 21 are selected as assignment terminals, and assignment functions a to c are assigned to the assignment terminals P3 to P5, respectively, as in the host device 10.

As described above, when the host device 10 and the peripheral device 20 have a plurality of functions as functions (common functions) that can be selected as the assignment functions, for example, the user can be notified of that fact by an image or sound to designate functions to be selected as the assignment functions.

Alternatively, for example, for each function, a priority for selection as the assignment function can be included in the device information, and the functions corresponding to the number of the terminals to which the function can be assigned can be selected according to the priority as assignment functions.

Further, when there is no function that is a common function between the host device 10 and the peripheral device 20, the user is notified of the fact by an image or sound.

Further, for example, when function c is the above-described power supply function, the power supply function is selected as an assignment function, and supplied power is supplied from the peripheral device 20 to the host device 10, the peripheral device 20 can set an amount of supply of current that is a supplied current depending on a type or a model of the host device 10, which is recognized based on the device information of the host device 10.

Here, in the peripheral device 20 of FIG. 3, environmental sound can be collected by the digital microphone unit 28$_1$, and a digital audio signal corresponding to the environmental sound can be included in the multiplexed data and transmitted from the transmission and reception processing unit 23 of the peripheral device 20 to the transmission and reception processing unit 13 of the host device 10. In this case, in the host device 10, the digital audio signal corresponding to the environmental sound included in the multiplexed data is supplied from the transmission and reception processing unit 13 to the signal processing unit 18.

On the other hand, in the host device 10 and the peripheral device 20, when at least the analog audio output function is now selected as an assignment function, the functional block 16$_1$ having an analog audio output function supplies an audio signal supplied from the signal processing unit 18 to the functional block 26$_1$ having an analog audio output function of the peripheral device 20 via the function switching unit 15, the jack 11, the plug 21, and the function switching unit 25, and the driver of the functional block 26$_1$ outputs a corresponding analog audio.

In this case, the signal processing unit 18 can perform, as signal processing, a NC (Noise Reduction) process on the audio signal to be supplied to the functional block 16$_1$ having an analog audio output function using the audio signal corresponding to the environmental sound included in the multiplexed data, and supply the resultant audio signal to the functional block 16$_1$.

For the NC process as the signal processing in this signal processing unit 18, information regarding characteristics of the driver of the functional block 26$_1$ or the microphone of the digital microphone unit 28$_1$ is included in the device information of the peripheral device 20, and a filter coefficient of filtering performed in the NC process can be determined based on the characteristic information included in the device information.

In this case, it is possible to perform an effective NC process depending on the characteristics of the driver of the functional block 26$_1$ or the microphone of the digital microphone unit 28$_1$.

As described above, according to the host device 10 and the peripheral device 20 which are corresponding devices, it is possible to provide the functions and signal processing dependent on the device information of the host device 10 and the peripheral device 20.

Further, in the host device 10, when the correspondence detection unit 12 detects that the plug device is not a corresponding device, the function switching unit 15 selects the one or more default functions as assignment functions from among the functions of the host device 10, selects one or more default terminals (corresponding to the number of assignment functions) as assignment terminals from among the terminal J#n of the jack 11, and assigns the default functions as the assignment functions to the default terminals as the assignment terminals of the jack 11.

For example, in the host device 10 as a smartphone, the analog audio output function among the analog audio output function, the analog audio input function, and functions a to c is set as a default function in advance and assigned to the default terminal that is the assignment terminal of the jack 11.

The default terminal of the jack 11 is adapted to be connected to the terminal connected to the driver (speaker) of the plug of an existing headset, for example, when the plug of the headset or the like as an existing plug device having a plug with 3 or 4 poles that is not a corresponding device is inserted into the jack 11.

Therefore, when the plug of the existing headset which is not a corresponding device is inserted into the jack 11, the audio signal that is output by the functional block $16_1$ having the analog audio output function that is the default function in the host device 10 as a smartphone is supplied to the driver of the existing headset via the function switching unit 15 and the jack 11, and corresponding sound is output.

As described above, the host device 10 has so-called backward compatibility in which the host device 10 can be used with the existing headset even when the existing headset is connected to the host device 10 which is not a corresponding device.

Similarly, the peripheral device 20 has backward compatibility.

That is, in the peripheral device 20, when it is detected by correspondence detection unit 22 that the jack device is not a corresponding device, the function switching unit 25 selects the one or more default functions as assignment functions from among the functions included in the peripheral device 20, selects one or more default terminals (corresponding to the number of the assignment functions) as assignment terminals from among the terminal P#n of the plug 21, and assigns the default functions as the assignment functions to the default terminals as the assignment terminals of the plug 21.

For example, in the peripheral device 20 as a headset, the analog audio output function among the analog audio output function, the analog audio input function, and functions a to c is set as a default function in advance, and assigned to the default terminal as the assignment terminal of the plug 21.

For example, the default terminal of the plug 21 is connected to a terminal from which the audio signal is output, of the jack of an existing smartphone when the plug 21 is inserted into the jack of the smartphone as an existing jack device having a jack with 3 or 4 poles that is not a corresponding device.

Therefore, when the plug 21 is inserted into the jack of the existing smartphone which is not a corresponding device, the audio signal output from the terminal of the jack of the existing smartphone is supplied to the functional block $26_1$ having the analog audio output function that is a default function via the plug 21 and the function switching unit 25 in the peripheral device 20 as a headset, and corresponding sound is output.

As described above, even when the peripheral device 20 is connected to an existing smartphone which is not a corresponding device, the peripheral device 20 has backward compatibility in which the peripheral device 20 can be used with the existing smartphone.

Further, in the host device 10 as a smartphone, the analog audio input function in addition to the analog audio output function among the analog audio output function, the analog audio input function, and functions a to c can also be set as default functions.

In this case, in the host device 10, a terminal connected to the terminal connected to the microphone of an existing headset, of the plug of the headset when the plug of the headset as an existing plug device having a plug with 4 poles that is not a corresponding device is inserted into the jack 11 is adopted as a default terminal to which the analog audio input function is assigned.

Therefore, when the plug with 4 poles of the existing headset which is not a corresponding device is inserted into the jack 11, the audio signal corresponding to sound collected by the microphone of the existing headset in the host device 10 as a smartphone is supplied to the functional block $16_2$ having the analog audio input function that is the default function via the jack 11 and the function switching unit 15, and supplied to and processed by the signal processing unit 18.

Thus, when the plug with 4 poles of the existing headset which is not a corresponding device is inserted into the jack 11, the microphone of the existing headset having the plug with 4 poles can be used.

Similarly, in the peripheral device 20 as a headset, the analog audio input function in addition to the analog audio output function among the analog audio output function, the analog audio input function and functions a to c can be set as the default function.

In this case, in the peripheral device 20, a terminal connected to an audio input terminal of a jack of a smartphone as an existing jack device having a jack with 4 poles that is not a corresponding device when the plug 21 is inserted into the jack of the smartphone is adopted as a default terminal to which the analog audio input function is assigned.

Therefore, when the plug 21 is inserted into the jack with 4 poles of the existing smartphone which is not a corresponding device, an audio signal corresponding to sound collected by the functional block $26_2$ having the analog audio input function that is a default function in the peripheral device 20 as a headset is input into the existing smartphone via the function switching unit 25 and the plug 21.

Accordingly, when the plug 21 is inserted into the jack with 4 poles of the existing smartphone which is not a corresponding device, the audio signal corresponding to the sound collected by the functional block $26_2$ can be input (supplied) to the existing smartphone having a jack with 4 poles and can be processed.

<Second Specific Example of Signal Processing System>

Figure 4:
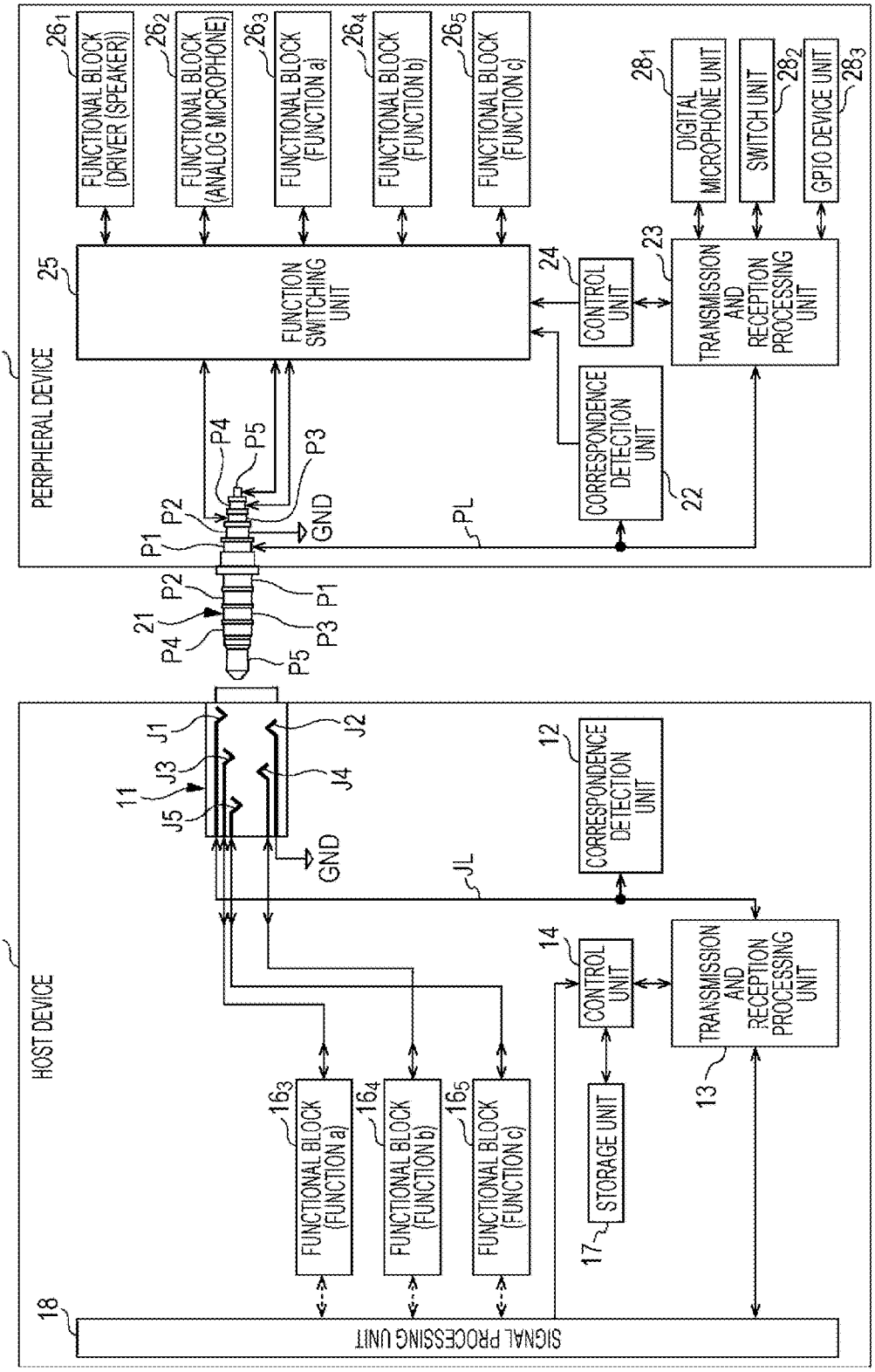
FIG. 4 is a block diagram illustrating a second specific example of the signal processing system.

FIG. 4 is a block diagram illustrating a second specific example of the signal processing system of FIG. 1.

Further, portions corresponding to those in FIG. 3 are denoted with the same reference signs and, hereinafter, description thereof will be appropriately omitted.

In FIG. 4, the host device 10 is the same as that of FIG. 3 in that the host device 10 includes a jack 11, a correspondence detection unit 12, a transmission and reception processing unit 13, a control unit 14, functional blocks $16_3$ to $16_5$, and a signal processing unit 18.

However, the host device 10 of FIG. 4 differs from that of FIG. 3 in that the host device 10 does not include the function switching unit 15 and the functional blocks $16_1$ and $16_2$.

Further, the host device 10 of FIG. 4 differs from that of FIG. 3 in which the terminal J#n of the jack 11 to which the respective functional blocks $16_3$ to $16_5$ are connected can be switched, in that the functional blocks $16_3$ to $16_5$ are connected to the terminals J3 to J5 of the jack 11 in a fixed manner, respectively.

Further, in FIG. 4, the peripheral device 20 is the same as that of FIG. 3 in that a plug 21, a correspondence detection unit 22, a transmission and reception processing unit 23, a control unit 24, a function switching unit 25, functional blocks $26_1$ to $26_5$, a digital microphone unit $28_1$, a switch unit $28_2$, and a GPIO device unit $28_3$ are included.

However, the peripheral device 20 of FIG. 4 differs from that of FIG. 3 in that the peripheral device 20 does not include the storage unit 27.

As described above, in FIG. 4, since the host device 10 does not include the function switching unit 15, and the functional blocks $16_3$ to $16_5$ are connected to the terminals J3 to J5 of the jack 11 in a fixed manner, it is difficult for the function assigned to the terminal J#n of the jack 11 to be switched.

Therefore, since it is difficult for the host device 10 to switch the function assigned to the terminal J#n of the jack 11 depending on the device information of the peripheral device 20, the peripheral device 20 does not include the storage unit 27 that stores the device information.

Therefore, the device information of the host device 10 is transmitted from the host device 10 to the peripheral device 20, but the device information of the peripheral device 20 is not transmitted from the peripheral device 20 to the host device 10.

Further, since the host device 10 does not include the functional blocks $16_1$ and $16_2$, the host device 10 does not have the analog audio output function included in the functional block $16_1$ and the analog audio input function included in the functional block $16_2$.

However, since the host device 10 includes the functional blocks $16_3$ to $16_5$, the functional blocks $16_3$ to $16_5$ have respective functions a to c.

Therefore, device information of the host device 10 including the information indicating that functions a to c are included is stored in the storage unit 17 of the host device 10. Further, the information (for example, the terminal number) of the terminal J#n of the jack 11 to which functions a to c are assigned is included in the device information of the host device 10.

In the signal processing system configured as above, when the plug 21 is inserted into the jack 11, the correspondence detection unit 12 detects that the peripheral device 20 as the plug device of which the plug is inserted into the jack 11 is a corresponding device, the correspondence detection unit 22 detects that the host device 10 as a jack device in which the plug 21 has been inserted into the jack is a corresponding device, and multiplexing communication is started to transmit and receive multiplexed data between the host device 10 and the peripheral device 20, similarly to the case of FIG. 3.

In the multiplexing communication, multiplexed data including the device information of the host device 10 is transmitted from the host device 10 to the peripheral device 20.

In the peripheral device 20, the control unit 24 recognizes the host device 10 has functions a to c, and the terminal number of the terminal J#n of the jack 11 to which functions a to c are assigned, based on the device information of the host device 10.

Also, the control unit 24 assigns the same functions a to c as those of the host device 10 among the analog audio output function, the analog audio input function, and functions a to c that the peripheral device 20 has, to the terminal P#n of the plug 21 having the same terminal number as the terminal J#n of the jack 11 to which functions a to c are assigned, based on the information recognized from the device information of the host device 10.

As a result, the functional block $16_3$ having function a of the host device 10 and the functional block $26_3$ having function a of the peripheral device 20, the functional block $16_4$ having function b of the host device 10 and the functional block $26_4$ having function b of the peripheral device 20, and the functional block $16_5$ having function c of the host device 10 and the functional block $26_5$ having function c of the peripheral device 20 are connected via the jack 11, the plug 21, and the function switching unit 25, and thus, functions a to c are provided.

Further, in the signal processing system of FIG. 4, the host device 10 that does not include the function switching unit 15 does not have backward compatibility, but the peripheral device 20 including the function switching unit 25 has backward compatibility.

<Third Specific Example of Signal Processing System>

Figure 5:
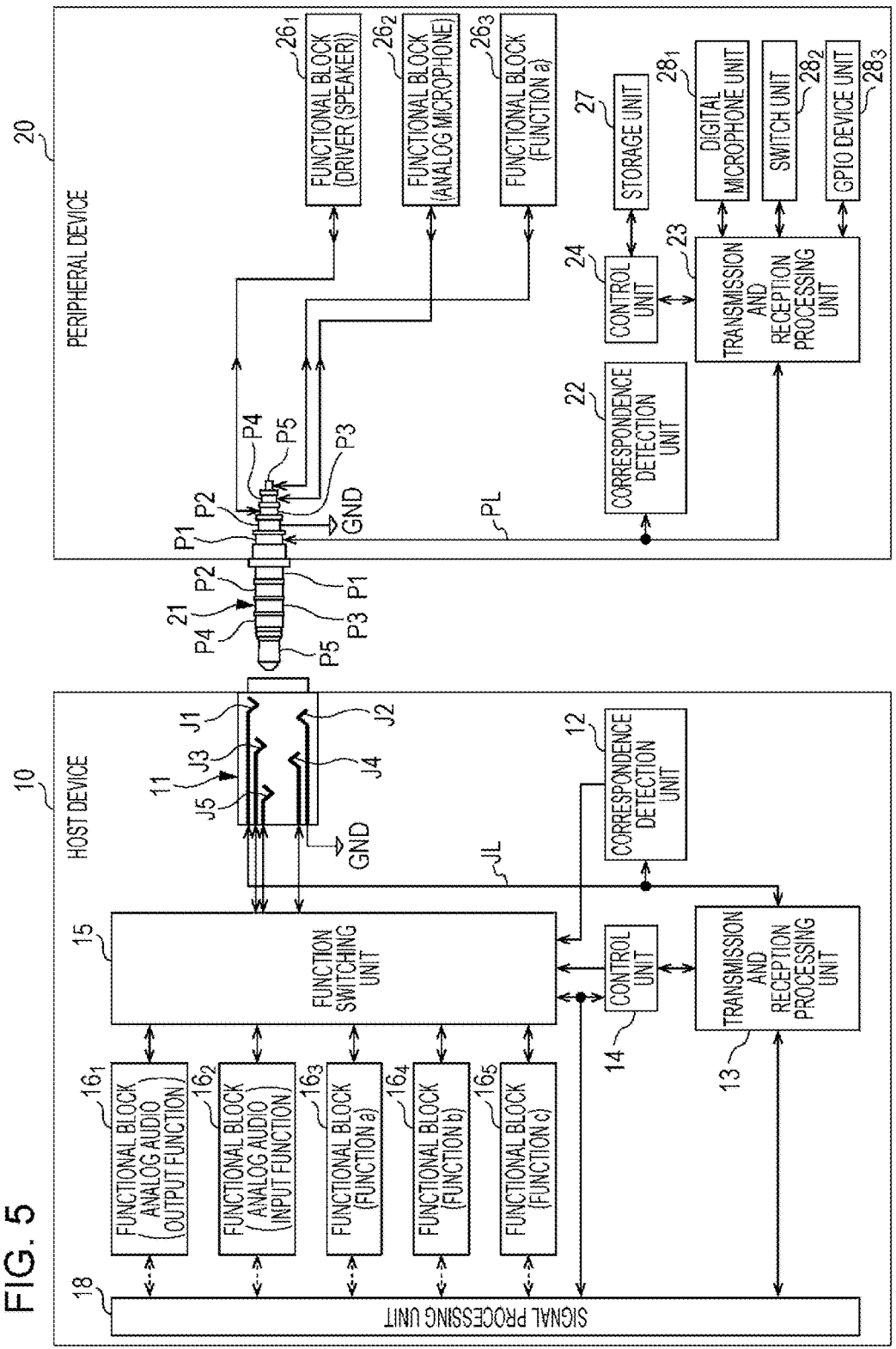
FIG. 5 is a block diagram illustrating a third specific example of the signal processing system.

FIG. 5 is a block diagram illustrating a third specific example of the signal processing system of FIG. 1.

Further, portions corresponding to those in FIG. 3 are denoted with the same reference signs and, hereinafter, description thereof will be appropriately omitted.

In FIG. 5, the peripheral device 20 is the same as in the case of FIG. 3 in that the peripheral device 20 includes a plug 21, a correspondence detection unit 22, a transmission and reception processing unit 23, a control unit 24, functional blocks $26_1$ to $26_3$, a storage unit 27, a digital microphone unit $28_1$, a switch unit $28_2$, and a GPIO device unit $28_3$.

However, the peripheral device 20 of FIG. 5 differs from that of FIG. 3 in that the peripheral device 20 does not include the function switching unit 25 and the functional blocks $26_4$ and $26_5$.

Further, the peripheral device 20 of FIG. 5 differs from that of FIG. 3 in which the terminal P#n of the plug 21 to which the respective functional blocks $26_1$ to $26_3$ are connected can be switched, in that the functional blocks $26_1$ to $26_3$ are connected to the terminals P3 to P5 of the plug 21 in a fixed manner, respectively.

Further, in FIG. 5, the host device 10 is the same as that of FIG. 3 in that the host device 10 includes a jack 11, a correspondence detection unit 12, a transmission and reception processing unit 13, a control unit 14, a function switching unit 15, functional blocks $16_1$ to $16_5$, and a signal processing unit 18.

However, the host device 10 of FIG. 5 differs from that in FIG. 3 in that the host device 10 does not include the storage unit 17.

As described, in FIG. 5, since the peripheral device 20 does not include the function switching unit 25 and the functional blocks $26_1$ to $26_3$ are connected to the terminals P3 to P5 of the plug 21 in a fixed manner, respectively, it is difficult for the function assigned to the terminal P#n of the plug 21 to be switched.

Therefore, since in the peripheral device 20, it is difficult for the function assigned to the terminal P#n of the plug 21 to be switched depending on the device information of the host device 10, the host device 10 does not include the storage unit 17 that stores the device information.

Therefore, the device information of the peripheral device 20 is transmitted from the peripheral device 20 to the host device 10, but the device information of the host device 10 is not transmitted from the host device 10 to the peripheral device 20.

Further, since the peripheral device 20 does not include the functional blocks $26_4$ and $26_5$, the peripheral device 20 does not have function b included in the functional block $26_4$ and function c included in the functional block $26_5$.

However, since the peripheral device 20 includes the functional blocks $26_1$ to $26_3$, the peripheral device 20 has the analog audio output function, the analog audio input function and function a that the functional blocks $26_1$ to $26_3$ have.

Therefore, the device information of the peripheral device 20, including information indicating that the peripheral device 20 has the analog audio output function, the analog audio input function and function a, is stored in the storage unit 27 of the peripheral device 20. Further, information (for example, the terminal number) of the terminal P#n of the plug 21 to which the analog audio output function, the analog audio input function, and function a are assigned is included in the device information of the peripheral device 20.

In the signal processing system configured as above, when the plug 21 is inserted into the jack 11, it is detected by the correspondence detection unit 22 that the host device 10 as a jack device in which the plug 21 is inserted into the jack is a corresponding device, it is detected by the correspondence detection unit 12 that the peripheral device 20 as the plug device of which the plug is inserted into the jack 11 is a corresponding device, and multiplexing communication in which multiplexed data is transmitted or received between the peripheral device 20 and the host device 10 is started, similarly to the case of FIG. 3.

In the multiplexing communication, multiplexed data including the device information of the peripheral device 20 is transmitted from the peripheral device 20 to the host device 10.

In the host device 10, the control unit 14 recognizes that the peripheral device 20 has the analog audio output function, the analog audio input function, and function a, and the terminal numbers of the terminal P#n of the plug 21 to which the analog audio output function, the analog audio input function, and function a are assigned, based on the device information of the peripheral device 20.

Also, the control unit 14 assigns the analog audio output function, the analog audio input function and function a, which are functions shared by the peripheral device 20, among the analog audio output function, the analog audio input function, and functions a to c of the host device 10 to the terminal J#n of the jack 11 having the same terminal number as the terminal P#n of the plug 21 to which the analog audio output function, the analog audio input function, and function a are assigned, based on the information recognized from the device information of the peripheral device 20.

As a result, the functional block $26_1$ having an analog audio output function of the peripheral device 20 and the functional block $16_1$ having an analog audio output function of the host device 10, the functional block $26_2$ having an analog audio input function of the peripheral device 20 and the functional block $16_2$ having an analog audio input function of the host device 10, and the functional block $26_3$ having function a of the peripheral device 20 and the functional block $16_3$ having function a of the host device 10 are connected to each other via the function switching unit 15, the jack 11, and the plug 21, and thus, the analog audio output function, the analog audio input function, and function a are provided.

Further, in the signal processing system of FIG. 5, the peripheral device 20 that does not include the function switching unit 25 does not have backward compatibility, but the host device 10 including the function switching unit 15 has backward compatibility.

<Insertion and Removal of the Plug 21 into and from the Jack 11>

Figure 6C:
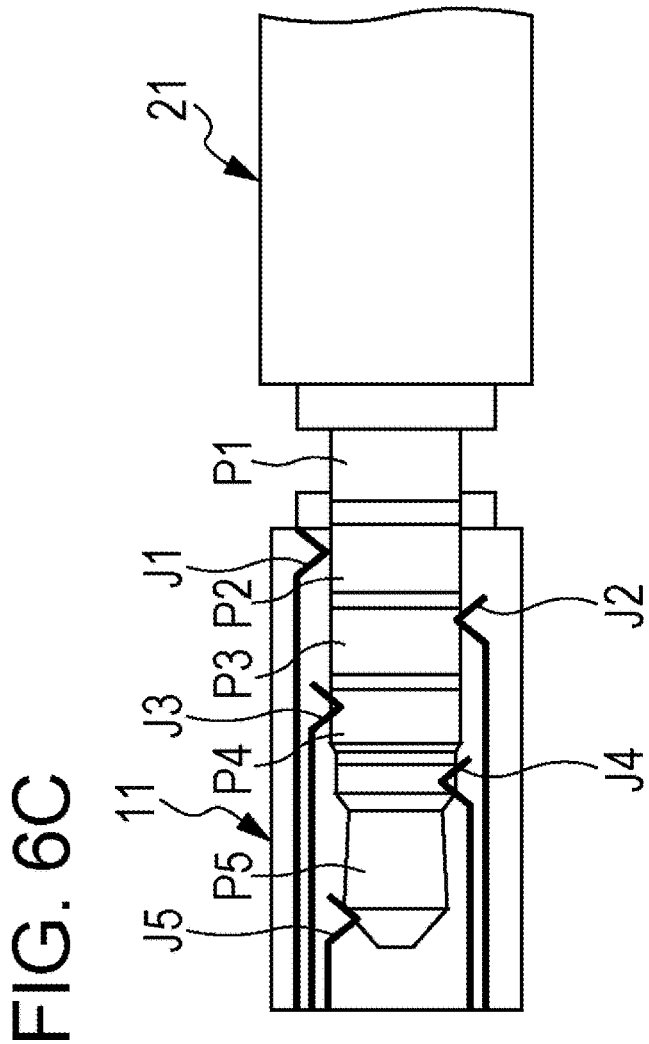
FIG. 6C is a diagram illustrating insertion and removal of a plug into and from a jack.

FIGS. 6A to 6C are diagrams illustrating insertion and removal of the plug 21 into and from the jack 11.

Further, it is assumed hereinafter that a configuration of the host device 10 and the peripheral device 20 is the same as, for example, the configuration in the first specific example of FIG. 3.

FIG. 6A illustrates a removal state in which the plug 21 is fully removed from the jack 11.

In the removal state, none of the terminal J#n of the jack 11 are connected to the terminal P#n of the plug 21.

FIG. 6B illustrates a full insertion state in which the plug 21 is fully inserted into the jack 11.

In the full insertion state, the terminals J#n and P#n having the same terminal number in the jack 11 and the plug 21 are connected. That is, the terminals J1 to J5 of the jack 11 and the terminals P1 to P5 of the plug 21 are connected to each other.

FIG. 6C illustrates a half insertion state during insertion of the plug 21 into the jack 11 from a removal state or a half insertion state during removal of the plug 21 from the jack 11 from a full insertion state.

In the half insertion state of FIG. 6C, both the terminals J4 and J5 of the jack 11 come in contact with the terminal P5 of the plug 21, and thus, the terminal J4 of the jack 11 and the terminal P5 of the plug 21 are unintentionally short-circuited although the terminal J4 of the jack 11 and the terminal P5 of the plug 21 should not be connected, and the terminals J4 and J5 of the jack 11 are unintentionally short-circuited via the terminal P5.

As described above, when the plug 21 which is a multipole single-headed plug is inserted or removed into or from the jack 11, for example, the terminal J#n of the jack 11 and the terminal P#n' of the plug 21 of which terminal numbers are different may be short-circuited (n is not equal to n'), or two terminals J#n and J#n+1 of the jack 11 may be unintentionally short-circuited in a half insertion state during insertion or removal.

When the two terminals J#n and J#n+1 of the jack 11 are short-circuited, excessive current or voltage is supplied to the host device 10 via the two terminals J#n and J#n+1, and the host device 10 may not operate normally, for example, when a power supply function is assigned to one terminal of the two terminals J#n and J#n+1 and the power that is supplied power is supplied from the terminal to which the power supply function is assigned.

Further, even when the terminal J#n of the jack 11 and the terminal P#n' of the plug 21 of which the terminal numbers are different are short-circuited, similarly, excessive current or voltage is supplied to the peripheral device 20 or the host device 10 via the terminal P#n' or J#n, and the host device 10 or the peripheral device 20 may not operate normally, for example, when the power supply function is assigned to one of the terminals J#n and P#n' and a power that is supplied power is supplied from the terminal to which the power supply function is assigned.

Therefore, a technology for preventing an unintended short-circuit in which, for example, unintended supply of power, such as supply of excessive current or voltage to the host device 10 or the peripheral device 20, due to an unintended short-circuit as described above is prevented will be described.

<Technology for Preventing Unintended Short-Circuit>

FIGS. 7A to 7E are diagrams illustrating a state in which the plug 21 is inserted into the jack 11 from a removal state.

FIG. 7A illustrates a removal state in which the plug 21 is removed from the jack 11.

Further, as illustrated in FIG. 7A, the multiplexing communication function is assigned to the terminals J1 and P1, and the terminals J2 and P2 are connected to the ground, unless otherwise stated. Further, it is assumed that function c is a power supply function, and the power supply function that is function c is assigned to the terminals J3 and P3. Further, it is assumed that function a is assigned to the terminals J4 and P4, and function b is assigned to the terminals J5 and P5.

Further, for the power supply function, for example, a power that is supplied power is assumed to be supplied from the host device 10 to the peripheral device 20 via the terminal J3 of the jack 11 and the terminal P3 of the plug 21 to which the power supply function is assigned.

As described above, when the power that is supplied power is supplied from the host device 10 to the peripheral device 20, the power that is supplied power is supplied from the terminal J3 of the jack 11 to the terminal P3 of the plug 21. Hereinafter, a terminal for supplying the power that is supplied power like the terminal J3 is referred to as a power supply terminal, and a terminal for receiving power that is supplied power like the terminal P3 is referred to as a power reception terminal.

Further, hereinafter, terminals such as terminals J2 and P2 connected to the ground are called GND terminals.

FIG. 7B illustrates a half insertion state 1 during insertion of the plug 21 into the jack 11 from the removal state of FIG. 7A.

In FIG. 7B, the GND terminal J2 of the jack 11 and the power supply terminal J3 of the jack 11, and the terminal P5 of the plug 21 to which function b has been assigned are short-circuited (connected). As a result, the terminals J2 and J3 are short-circuited via the terminal P5.

FIG. 7C illustrates a half insertion state 2 in which the plug 21 is further inserted into the jack 11 from the half insertion state 1 of FIG. 7B.

In FIG. 7C, the power supply terminal J3 of the jack 11 and the terminal J4 of the jack 11 to which function a has been assigned are short-circuited to the terminal P5 of the plug 21 to which function b has been assigned. That is, the terminal J3 is short-circuited to the terminal J4 via the terminal P5.

Further, in FIG. 7C, the terminal J1 of the jack 11 and the power reception terminal P3 of the plug 21 to which the multiplexing communication function has been assigned are short-circuited, and the GND terminal J2 of the jack 11 and the terminal P4 of the plug 21 to which function a has been assigned are short-circuited.

FIG. 7D illustrates a half insertion state 3 in which the plug 21 is further inserted into the jack 11 from the half insertion state 2 of FIG. 7C.

In FIG. 7D, the terminal J4 of the jack 11 to which function a has been assigned and the terminal P5 of the plug 21 to which function b has been assigned are short-circuited, and the power supply terminal J3 of the jack 11 and the terminal P4 of the plug 21 to which function a has been assigned are short-circuited.

Further, in FIG. 7C, the GND terminal J2 of the jack 11 and the power reception terminal P3 of the plug 21 are short-circuited, and the terminal J1 of the jack 11 to which the multiplexing communication function has been assigned and the GND terminal P2 of the plug 21 are short-circuited.

FIG. 7E illustrates a full insertion state in which the plug 21 is further inserted into the jack 11 from the half insertion state 3 of FIG. 7D and fully inserted into the jack 11.

In FIG. 7E, the terminals J1 to J5 of the jack 11 and the terminals P1 to P5 of the plug 21 intended to be originally connected are short-circuited (connected).

Figure 8:
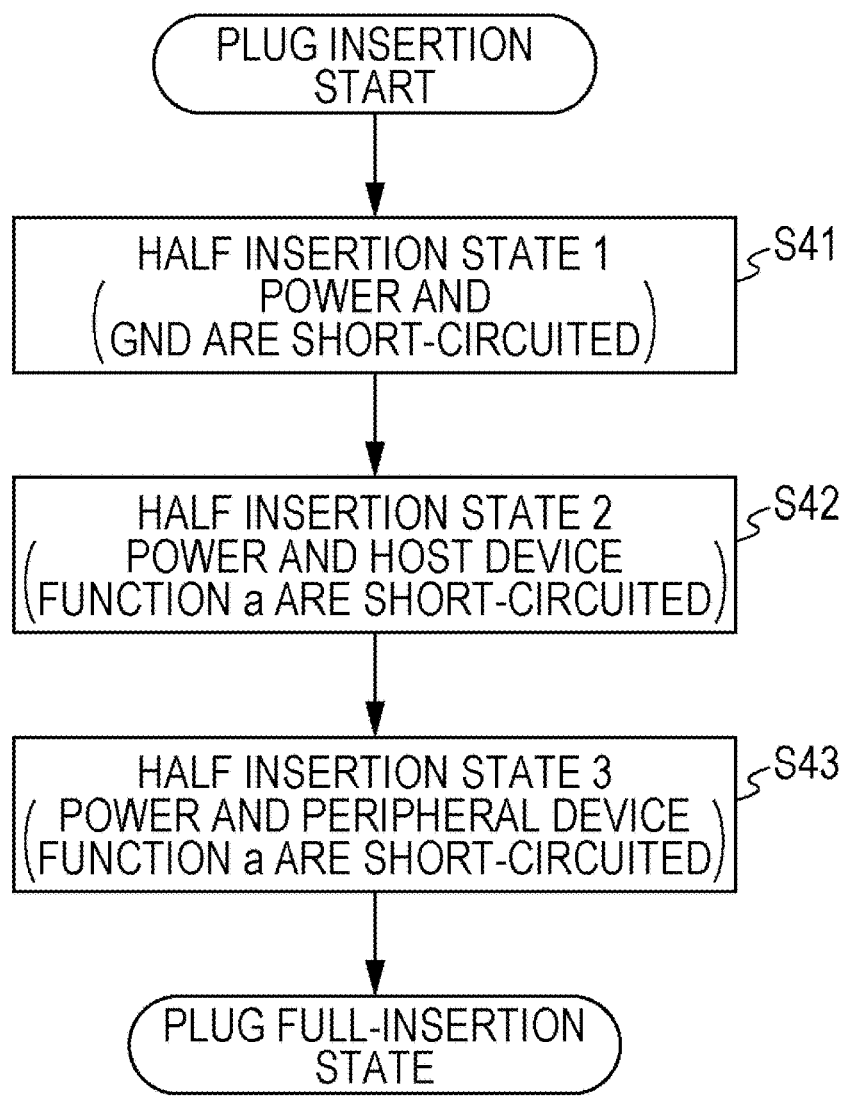
FIG. 8 is a flowchart illustrating a change of a state of insertion when the plug is inserted into the jack.

FIG. 8 is a flowchart illustrating a change in a state of insertion when the plug 21 is inserted into the jack 11.

When the insertion of the plug 21 into the jack 11 is started from the removal state described in FIG. 7A, the plug 21 (and the jack 11) enters the half insertion state 1 described in FIG. 7B in step S41. Further, when the insertion of the plug 21 is continued, the plug 21 enters the half insertion state 2 described in FIG. 7C in step S42.

Further, when the insertion of the plug 21 is continued, the plug 21 enters a half insertion state 3 described in FIG. 7D in step S43. Also, the plug 21 then enters a full insertion state described in FIG. 7E.

FIGS. 9A to 9E are diagrams illustrating a technology for preventing an unintended short-circuit when the plug 21 is inserted into the jack 11 in a case in which power that is supplied power is supplied from the host device 10 to the peripheral device 20.

When the plug 21 is inserted into the jack 11 in a case in which power that is supplied power is supplied from the host device 10 to the peripheral device 20, the terminals J3 to J5 of the jack 11 are disconnected from the power supply function and (the functional block $16_k$ having) functions a and b until the host device 10 and the peripheral device 20 transmit and receive multiplexed data including the device information. Also, after the host device 10 and the peripheral device 20 transmit and receive the multiplexed data including the device information, the function switching unit 15 connects the terminals J3 to J5 of the jack 11 and the power supply function and (the functional block $16_k$ having) functions a and b to realize the technology for preventing an unintended short-circuit.

FIG. 9A illustrates a removal state in which the plug 21 is removed from the jack 11.

In FIG. 9A, the terminals J3 to J5 of the jack 11 are (electrically) disconnected from the power supply function and (the functional block $16_k$ having) functions a and b in the function switching unit 15.

Figure 9B:
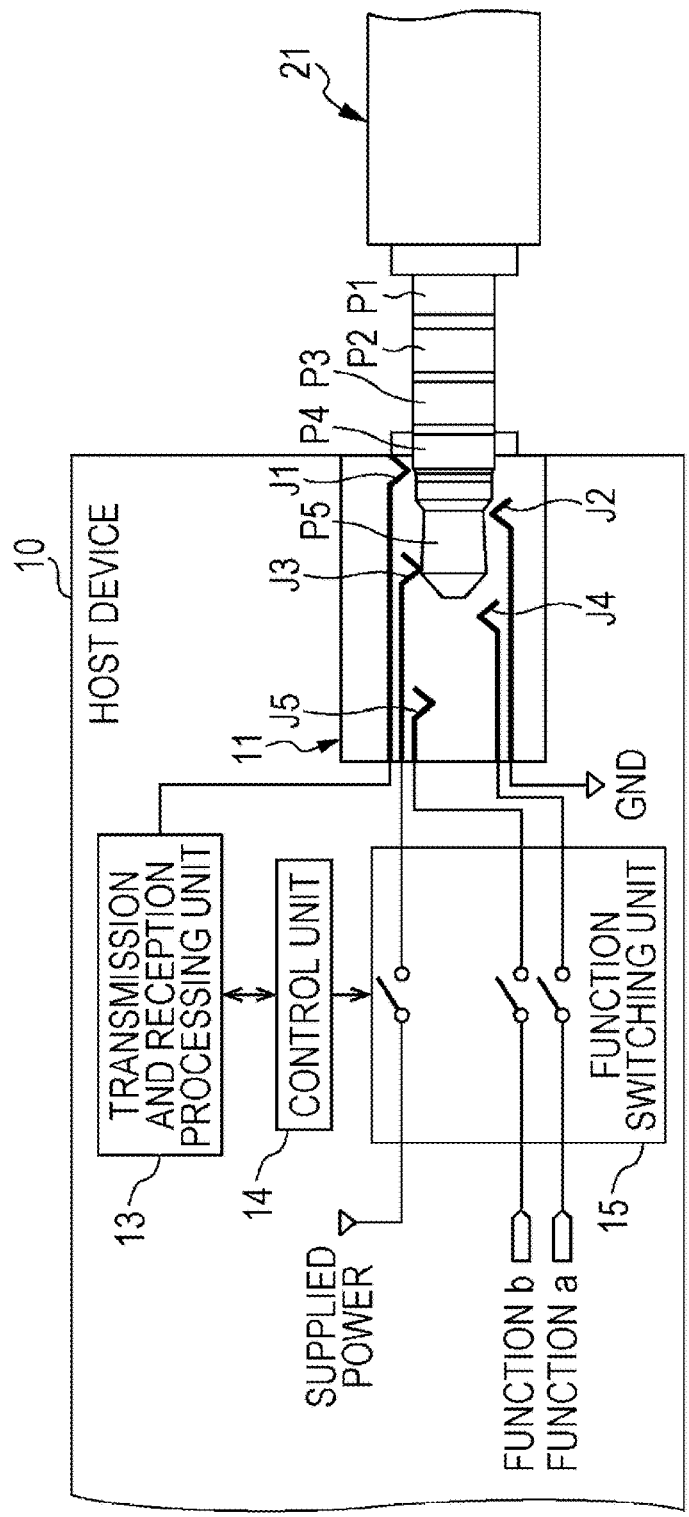
FIG. 9B is a diagram illustrating a technology for preventing an unintended short-circuit when the plug is inserted into the jack in a case in which power that is supplied power is supplied from the host device to the peripheral device.

FIG. 9B illustrates a half insertion state 1 during insertion of the plug 21 into the jack 11 from the removal state of FIG. 9A.

In FIG. 9B, the GND terminal J2 of the jack 11 and the power supply terminal J3 of the jack 11, and the terminal P5 of the plug 21 are short-circuited (connected).

Therefore, the power supply terminal J3 is directly or indirectly short-circuited to the terminals J2 and P5 that are not power reception terminals.

However, in FIG. 9B, since the terminals J3 to J5 of the jack 11 are disconnected from the power supply function and functions a and b in the function switching unit 15, no power is supplied from the power supply terminal J3 to the terminals J2 and P5 short-circuited to the power supply terminal J3.

FIG. 9C illustrates a half insertion state 2 in which the plug 21 is further inserted into the jack 11 from the half insertion state 1 of FIG. 9B.

In FIG. 9C, the terminal J4 of the jack 11 and the terminal P5 of the plug 21 are short-circuited, and the power supply terminal J3 of the jack 11 and the terminal P4 of the plug 21 are short-circuited.

Further, in FIG. 9C, the GND terminal J2 of the jack 11 and the power reception terminal P3 of the plug 21 are short-circuited, and the terminal J1 of the jack 11 and the GND terminal P2 of the plug 21 are short-circuited.

Therefore, the power supply terminal J3 is short-circuited to the terminal P4 that is not a power reception terminal.

However, in FIG. 9C, since the terminals J3 to J5 of the jack 11 are disconnected from the power supply function and functions a and b in the function switching unit 15, no power is supplied from the power supply terminal J3 to the terminal P4 short-circuited to the power supply terminal J3.

FIG. 9D illustrates a full insertion state 1 directly after the plug 21 is further inserted into the jack 11 from the half insertion state 2 of FIG. 9C and fully inserted into the jack 11.

In FIG. 9D, the terminals J1 to J5 of the jack 11 and the terminals P1 to P5 of the plug 21 intended to be originally connected are short-circuited (connected) to each other.

Therefore, in the host device 10 and the peripheral device 20, authentication patterns PTNJ and PTNP are exchanged via the terminal J1 of the jack 11 and the terminal P1 of the plug 21 to which the multiplexing communication function has been assigned, and it is detected that the devices are corresponding devices.

Further, in the host device 10 and the peripheral device 20, the multiplexed data including the device information is exchanged.

In the host device 10, when the multiplexed data including the device information of the peripheral device 20 is received in the transmission and reception processing unit 13, the control unit 14 controls the function switching unit 15 to connect the terminals J3 to J5 of the jack 11 to the power supply function and (the functional block $16_k$ having) functions a and b.

Accordingly, the terminals J3 to J5 of the jack 11, and the power supply function and (the functional block $16_k$ having) functions a and b are connected in the function switching unit 15.

FIG. 9E illustrates a full insertion state 2 directly after the multiplexed data including the device information is exchanged in the host device 10 and the peripheral device 20 after the full insertion state 1 of FIG. 9D.

In FIG. 9E, the terminals J3 to J5 of the jack 11, and the power supply function and functions a and b are connected in the function switching unit 15, as described above.

Therefore, in the host device 10, supply of the power that is supplied power from the power supply terminal J3 is performed, but the power is supplied to the peripheral device 20 via the power reception terminal P3 short-circuited to the power supply terminal J3.

As described above, when the plug 21 is inserted into the jack 11 in a case in which the power that is supplied power is supplied from the host device 10 to the peripheral device 20, the function switching unit 15 disconnects the terminals J3 to J5 of the jack 11 from the power supply function and functions a and b until communication of the multiplexed data such as exchange of the multiplexed data including the device information can be performed. When the multiplexed data communication can be performed and the plug 21 is fully inserted into the jack 11, the function switching unit 15 connects the terminals J3 to J5 of the jack 11 to the power supply function and functions a and b. Accordingly, even when the power supply terminal J3 is short-circuited to the terminal J#n or P#n that is not a power reception terminal in a half insertion state during insertion of the plug 21 into the jack 11, it is possible to prevent the power that is supplied power from being supplied to the terminal that is not a power reception terminal.

Figure 10:
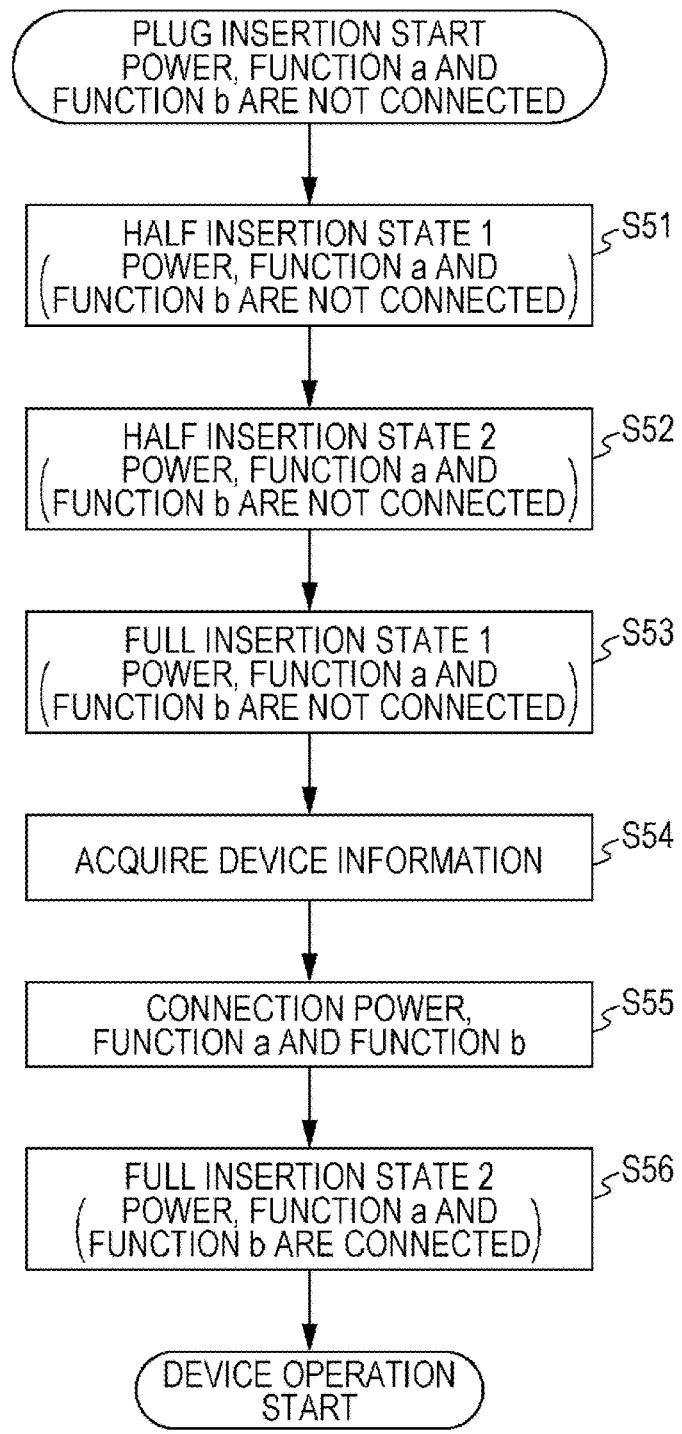
FIG. 10 is a flowchart illustrating the technology for preventing an unintended short-circuit.

FIG. 10 is a flowchart illustrating a technology for preventing an unintended short-circuit illustrated in FIGS. 9A to 9E.

When the insertion of the plug 21 into the jack 11 is started from the removal state described in FIG. 9A, the plug 21 enters the half insertion state 1 described in FIG. 9B in step S51, and when the insertion of the plug 21 is continued, the plug 21 enters the half insertion state 2 described in FIG. 9C in step S52.

Further, when the insertion of the plug 21 is continued, the plug 21 enters the full insertion state 1 described in FIG. 9D in step S53.

Here, in a half insertion state 1 of step S51, a half insertion state 2 of step S52, and a full insertion state 1 of step S53, the terminals J3 to J5 of the jack 11 are disconnected from (not connected to) the power supply function and functions a and b in the function switching unit 15.

When the plug 21 enters the full insertion state 1 described in FIG. 9D, the terminals J1 to J5 of the jack 11 and the terminals P1 to P5 of the plug 21 intended to be originally connected are connected.

As a result, in the host device 10 and the peripheral device 20, authentication patterns PTNJ and PTNP are exchanged via the terminal J1 of the jack 11 and the terminal P1 of the plug 21 to which the multiplexing communication function has been assigned, and it is detected that the devices are corresponding devices in step S54.

Further, in step S54, device information (multiplexed data) is exchanged in the host device 10 and the peripheral device 20.

In step S54, when the host device 10 receives (acquires) device information of the peripheral device 20, the function switching unit 15 connects the terminals J3 to J5 of the jack 11 to the power supply function and functions a and b in step S55.

As a result, power that is supplied power is supplied from the host device 10 to the peripheral device 20, and functions a and b are provided in the host device 10 and the peripheral device 20.

FIGS. 11A to 11E are diagrams illustrating a state in which the plug 21 is removed from the jack 11 from a full insertion state.

Figure 11A:
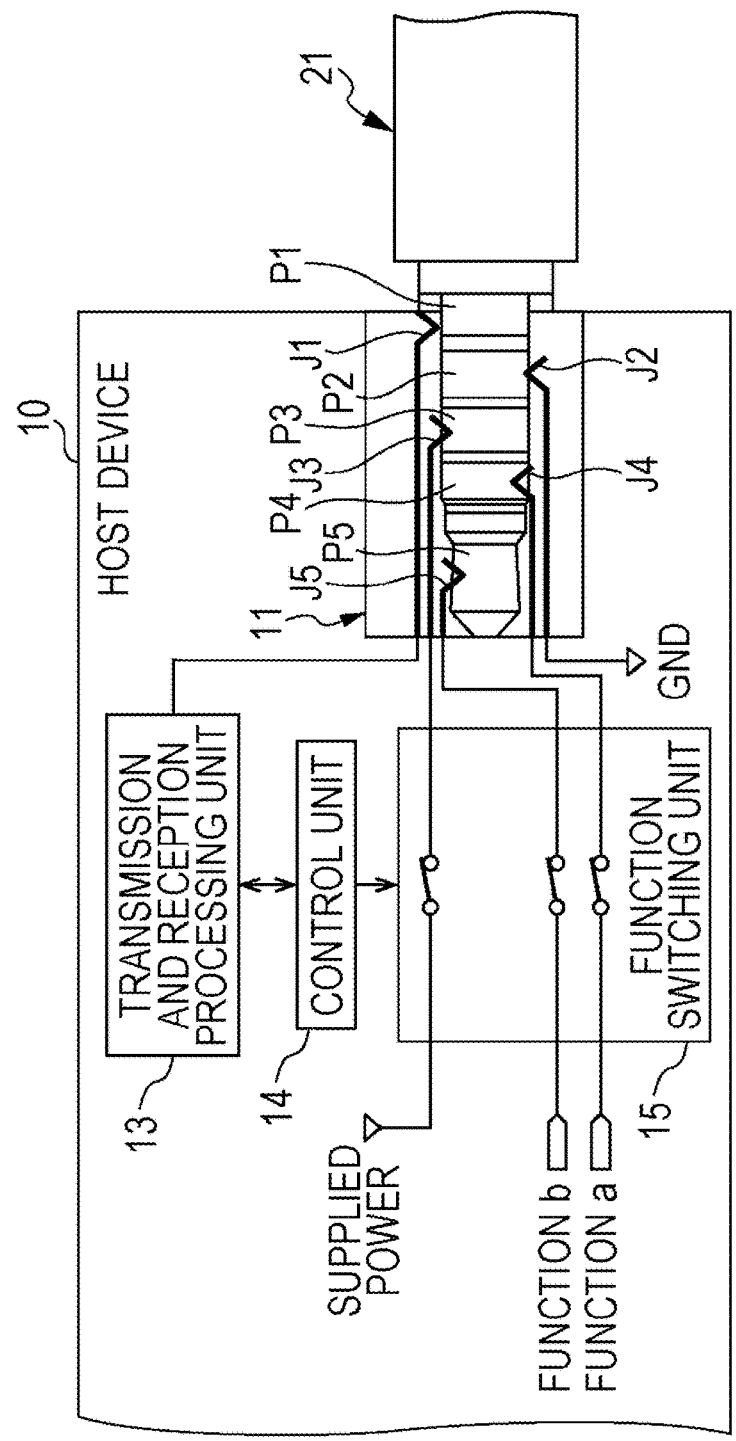
FIG. 11A is a diagram illustrating a state in which the plug is removed from the jack from a full insertion state.

FIG. 11A illustrates a full insertion state, similarly to FIG. 9E.

In FIG. 11A, the terminals J1 to J5 of the jack 11 and the terminals P1 to P5 of the plug 21 intended to be originally connected are short-circuited (connected).

Further, in FIG. 11A, since the plug 21 enters a full insertion state and the exchange of the device information between the host device 10 and the peripheral device 20 is completed, the terminals J3 to J5 of the jack 11, and the power supply function and functions a and b are connected in the function switching unit 15.

Figure 11B:
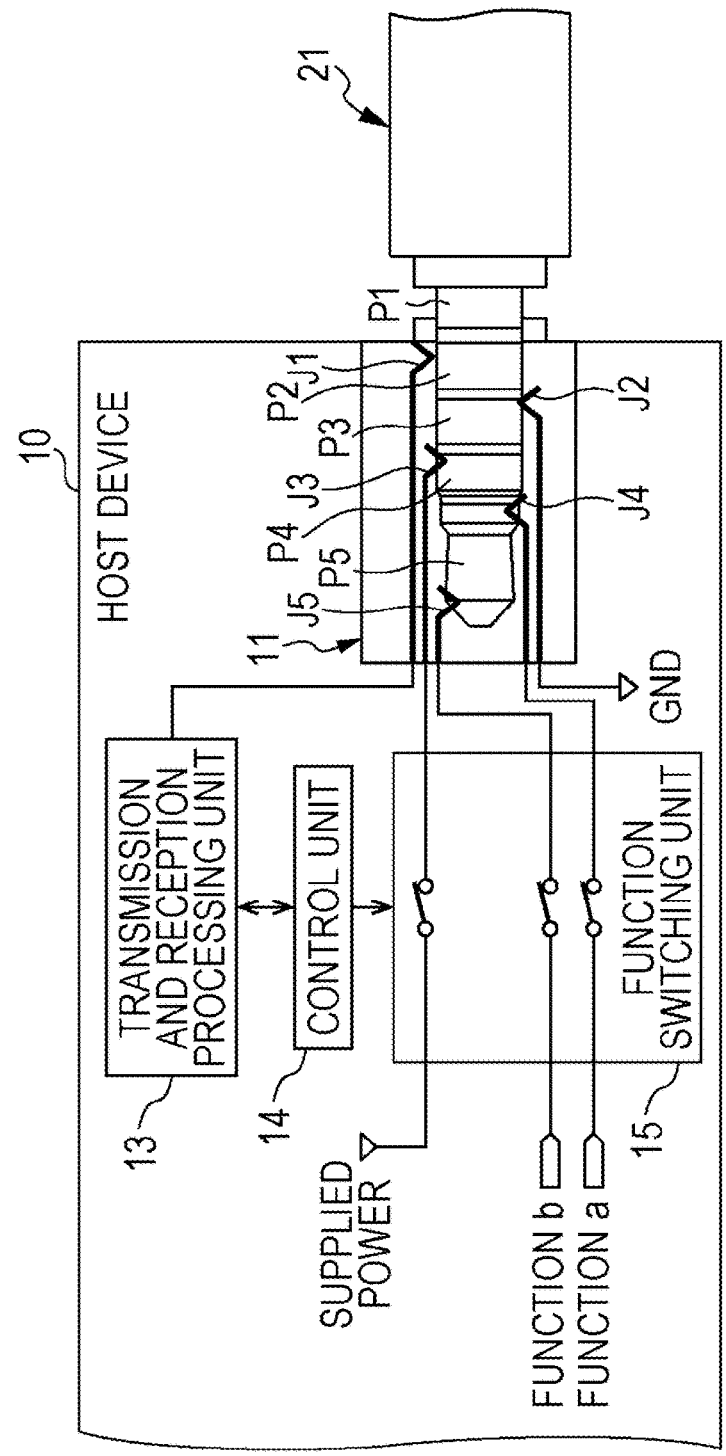
FIG. 11B is a diagram illustrating a state in which the plug is removed from the jack from a full insertion state.

FIG. 11B illustrates a half insertion state 1 during removal of the plug 21 from the jack 11 from the full insertion state of FIG. 11A.

In FIG. 11B, the terminal J4 of the jack 11 to which function a has been assigned, the terminal J5 of the jack 11 to which function b has been assigned, and the terminal P5 of the plug 21 to which function b has been assigned are short-circuited, and the power supply terminal J3 of the jack 11 and the terminal P4 of the plug 21 to which function a has been assigned are short-circuited.

Further, in FIG. 11B, the GND terminal J2 of the jack 11 and the power reception terminal P3 of the plug 21 are short-circuited, and the terminal J1 of the jack 11 to which the multiplexing communication function has been assigned and the GND terminal P2 of the plug 21 are short-circuited.

Further, in FIG. 11B, the terminals J3 to J5 of the jack 11, and the power supply function and functions a and b are connected in the function switching unit 15.

Therefore, in FIG. 11B, power as a power supply is supplied from the power supply terminal J3 to the terminal P4 that is not a power reception terminal, which is unintentionally short-circuited to the power supply terminal J3.

Figure 11C:
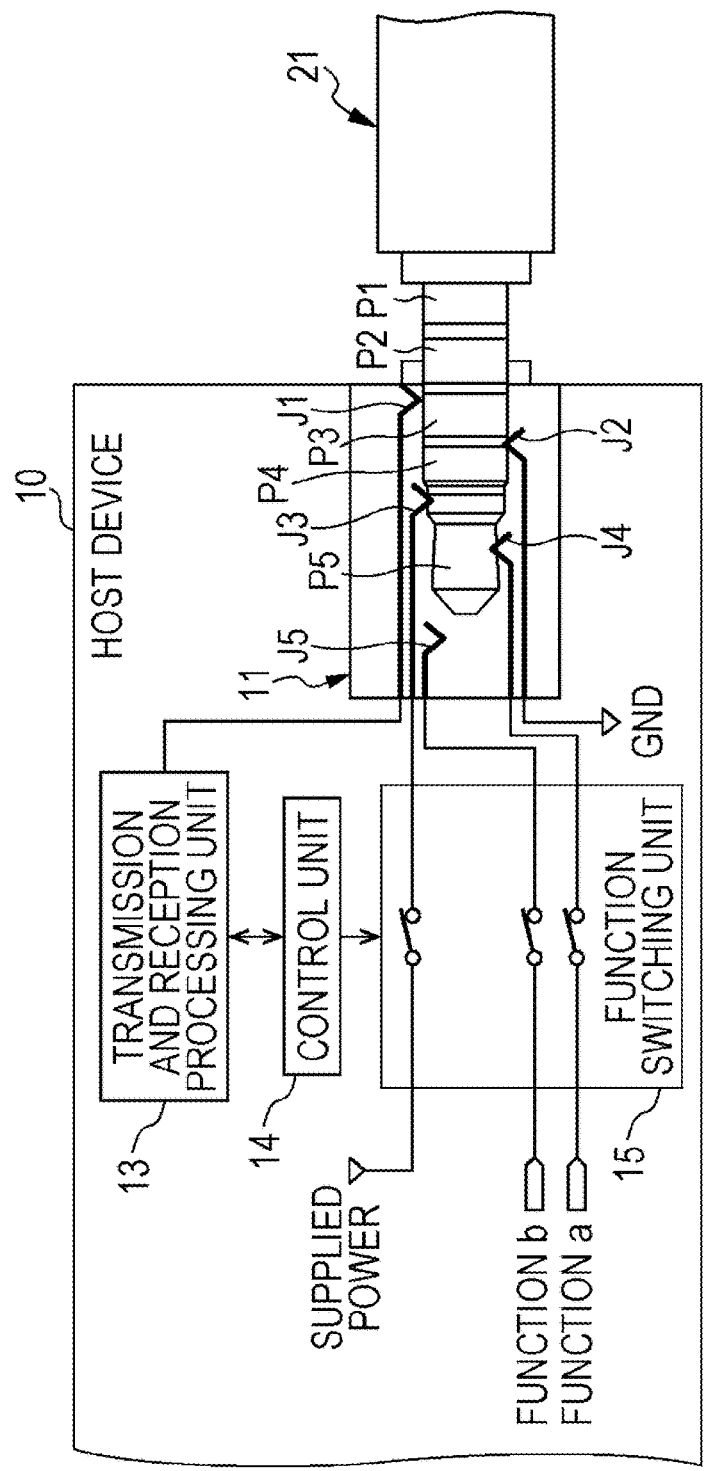
FIG. 11C is a diagram illustrating a state in which the plug is removed from the jack from a full insertion state.

FIG. 11C illustrates a half insertion state 2 in which the plug 21 is further removed from the jack 11 from a half insertion state 1 of FIG. 11B.

In FIG. 11C, the power supply terminal J3 of the jack 11 and the terminal J4 of the jack 11 to which function a has been assigned are short-circuited to the terminal P5 of the plug 21 to which function b has been assigned. That is, the power supply terminal J3 is short-circuited to the terminals J4 and P5.

Further, in FIG. 11C, the terminal J1 of the jack 11 to which the multiplexing communication function has been assigned and the power reception terminal P3 of the plug 21 are short-circuited, and the GND terminal J2 of the jack 11 and the terminal P4 of the plug 21 to which function a has been assigned are short-circuited.

Further, in FIG. 11C, the terminals J3 to J5 of the jack 11, and the power supply function and functions a and b are connected in the function switching unit 15.

Therefore, in FIG. 11C, the power as a power supply is supplied from the power supply terminal J3 to the terminals J4 and P5 that are not power reception terminals, which are unintentionally short-circuited to the power supply terminal J3.

Figure 11D:
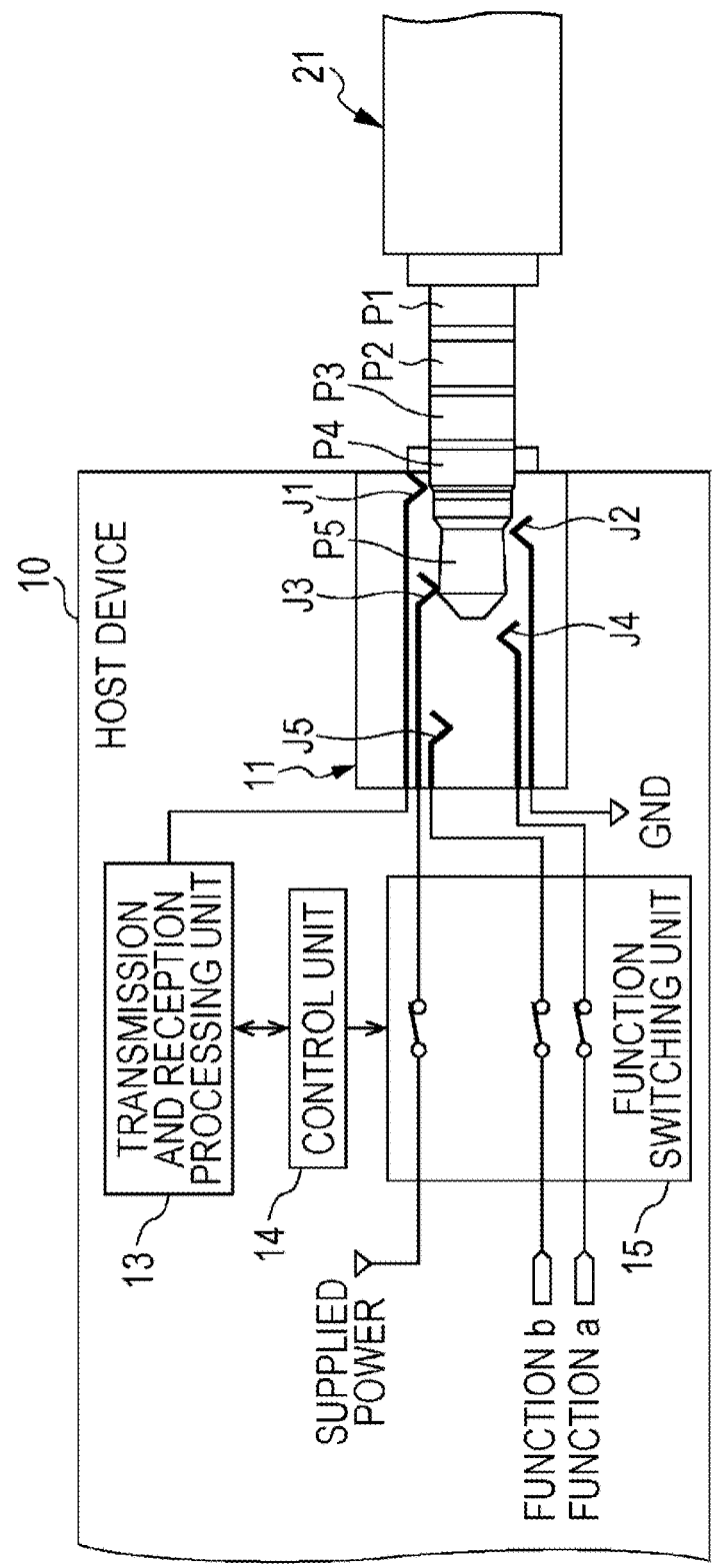
FIG. 11D is a diagram illustrating a state in which the plug is removed from the jack from a full insertion state.

FIG. 11D illustrates a half insertion state 3 in which the plug 21 is further removed from the jack 11 from the half insertion state 2 of FIG. 11C.

In FIG. 11D, the GND terminal J2 of the jack 11 and the power supply terminal J3 of the jack 11 are short-circuited to the terminal P5 of the plug 21 to which function b has been assigned. That is, the power supply terminal J3 is short-circuited to the terminals J2 and P5.

Further, in FIG. 11D, the terminal J1 of the jack 11 to which the multiplexing communication function has been assigned and the terminal P4 of the plug 21 to which function a has been assigned are short-circuited.

Further, in FIG. 11D, the terminals J3 to J5 of the jack 11, and the power supply function and functions a and b are connected in the function switching unit 15.

Therefore, in FIG. 11D, the power as a power supply is supplied from the power supply terminal J3 to the terminals J2 and P5 that are not power reception terminals, which are unintentionally short-circuited to the power supply terminal J3.

FIG. 11E illustrates a removal state in which the plug 21 is further removed from the jack 11 from the a half insertion state 3 of FIG. 11D and fully removed from the jack 11.

In FIG. 11E, the terminals J3 to J5 of the jack 11, and the power supply function and functions a and b are connected in the function switching unit 15.

However, since in the removal state, none of the terminals J1 to J5 of the jack 11 are connected (short-circuited) to the terminals P1 to P5 of the plug 21, the power as a power supply is not supplied from the power supply terminal J3 to the terminal that is not a power reception terminal.

FIGS. 12A to 12E are diagrams illustrating a technology for preventing an unintended short-circuit when the plug 21 is removed from the jack 11 in a case in which power that is supplied power is supplied from the host device 10 to the peripheral device 20.

When the plug 21 is removed from the jack 11 in a case in which the power that is supplied power is supplied from the host device 10 to the peripheral device 20, the start of the removal is detected, and the terminals J3 to J5 of the jack 11 are disconnected from the power supply function and (the functional block 16$_k$ having) functions a and b using the start of the removal as a trigger. Thus, it is possible to realize the technology for preventing an unintended short-circuit.

Figure 12A:
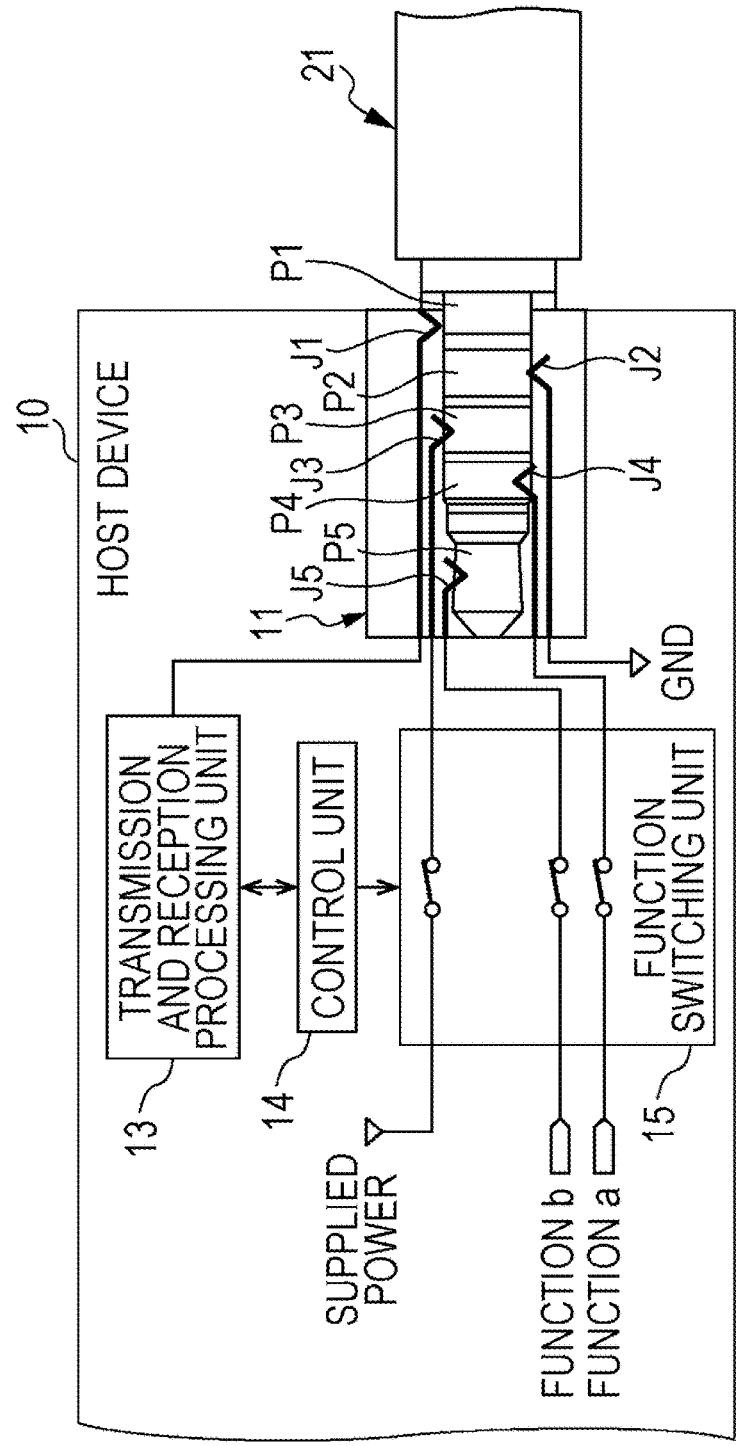
FIG. 12A is a diagram illustrating a technology for preventing an unintended short-circuit when the plug is removed from the jack in a case in which power that is supplied power is supplied from the host device to the peripheral device.

FIG. 12A illustrates a full insertion state, similarly to FIG. 11A.

That is, in FIG. 12A, J1 to J5 of the jack 11 and P1 to P5 of the plug 21 to be connected originally are short-circuited. Further, the terminals J3 to J5 of the jack 11, and the power supply function and functions a and b are connected to each other in the function switching unit 15.

FIG. 12B illustrates a half insertion state 1 during removal of the plug 21 from the jack 11 from the full insertion state of FIG. 12A.

In the half insertion state 1 of FIG. 12B, removal of the plug 21 from the jack 11 is started from the full insertion state, and the terminal J1 of the jack 11 and the terminal P1 of the plug 21 short-circuited in the full insertion state are disconnected. That is, the terminal J1 of the jack 11 comes in contact with an insulator between the terminals P1 and P2 of the plug 21.

Here, the jack 11 and the plug 21 are configured so that, in a process of removing the plug 21 from the full insertion state, the connection (short-circuit) of the terminal J1 on the insertion port side of the jack 11 and the terminal P1 on the root side of the plug 21 among the terminals J#n and P#n short-circuited in the full insertion state is disconnected first.

In FIG. 12B, only the connection of the terminals J1 and P1 is disconnected, and the respective connections of the other terminals J2 to J5 and the terminals P2 to P5 are still maintained. Therefore, the power supply terminal J3 of the jack 11 and the power reception terminal P3 of the plug 21 are connected, and the power as a power supply is supplied from the power supply terminal J3 to the power reception terminal P3 to which power is to be supplied.

Since the multiplexing communication function is assigned to the terminals J1 and P1, when the connection of the terminals J1 and P1 is disconnected, it is difficult for multiplexing communication to be performed between the host device 10 and the peripheral device 20.

Figure 12C:
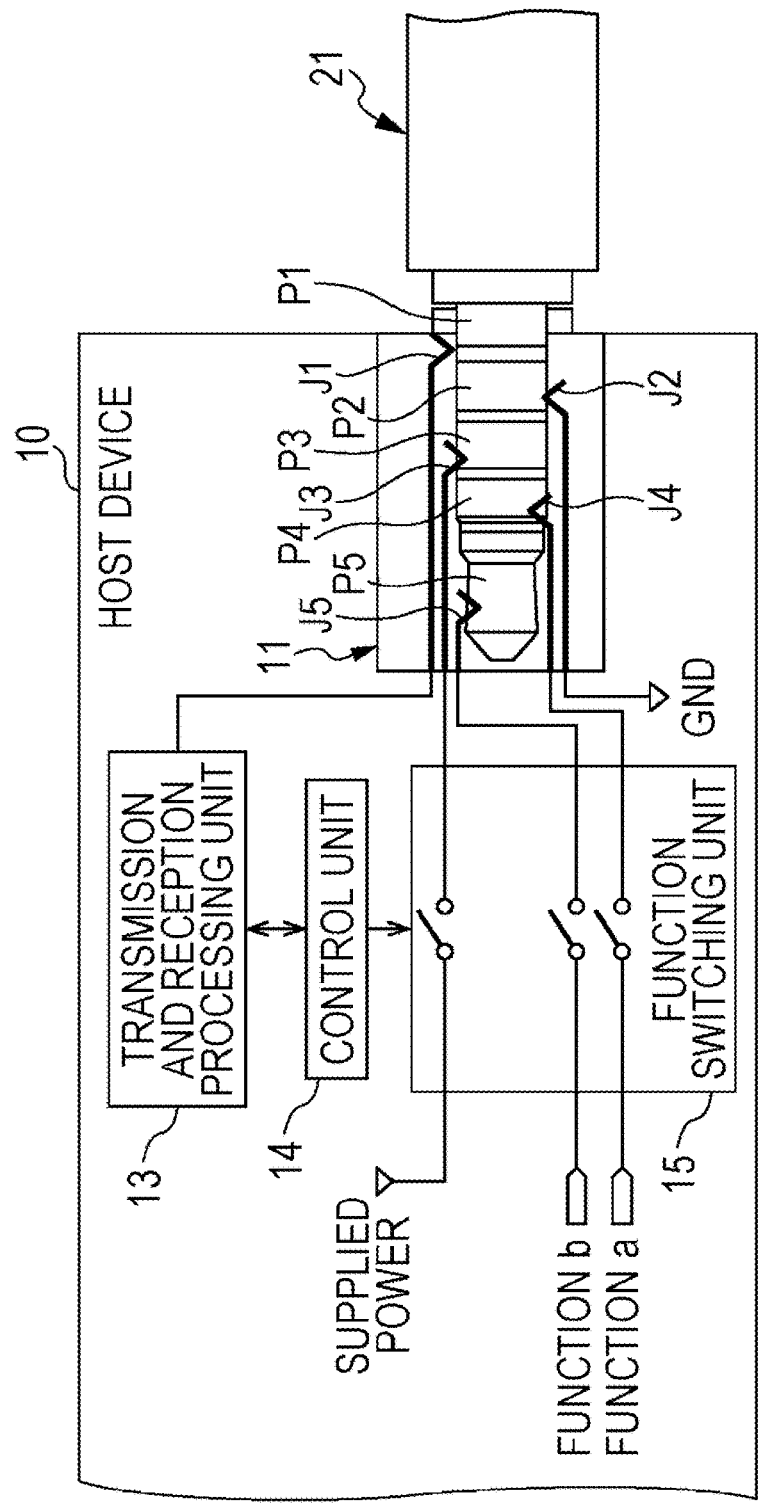
FIG. 12C is a diagram illustrating a technology for preventing an unintended short-circuit when the plug is removed from the jack in a case in which power that is supplied power is supplied from the host device to the peripheral device.

FIG. 12C illustrates a half insertion state 2 directly after the connection of the terminals J1 and P1 is disconnected and it is difficult for the multiplexing communication to be performed between the host device 10 and the peripheral device 20, as described above.

When it is difficult for the multiplexing communication to be performed between the host device 10 and the peripheral device 20, the transmission and reception processing unit 13 of the host device 10 detects (recognizes) a state in which it is difficult for multiplexed data to be transmitted and received (hereinafter referred to as a communication-unavailable state) as a communication state of the multiplexed data.

When the transmission and reception processing unit 13 detects the communication-unavailable state as the communication state of multiplexed data, the transmission and reception processing unit 13 supplies the fact to the control unit 14. When the fact that the communication state of multiplexed data is a communication-unavailable state is supplied from the transmission and reception processing unit 13, the control unit 14 controls the function switching unit 15 based on the communication-unavailable state to thereby disconnect the terminals J3 to J5 of the jack 11 from the power supply function and functions a and b.

In FIG. 12C, the terminals J3 to J5 of the jack 11 are disconnected from the power supply function and functions a and b in the function switching unit 15.

In FIG. 12C, the respective connections of the terminals J2 to J5 and the terminals P2 to P5 are still maintained. Therefore, the power supply terminal J3 of the jack 11 and the power reception terminal P3 of the plug 21 are connected, similarly to FIG. 12B.

However, in FIG. 12C, since the terminals J3 to J5 of the jack 11 are disconnected from the power supply function and functions a and b in the function switching unit 15, no power is supplied from the power supply terminal J3 to the power reception terminal P3 connected (short-circuited) to the power supply terminal J3.

Figure 12D:
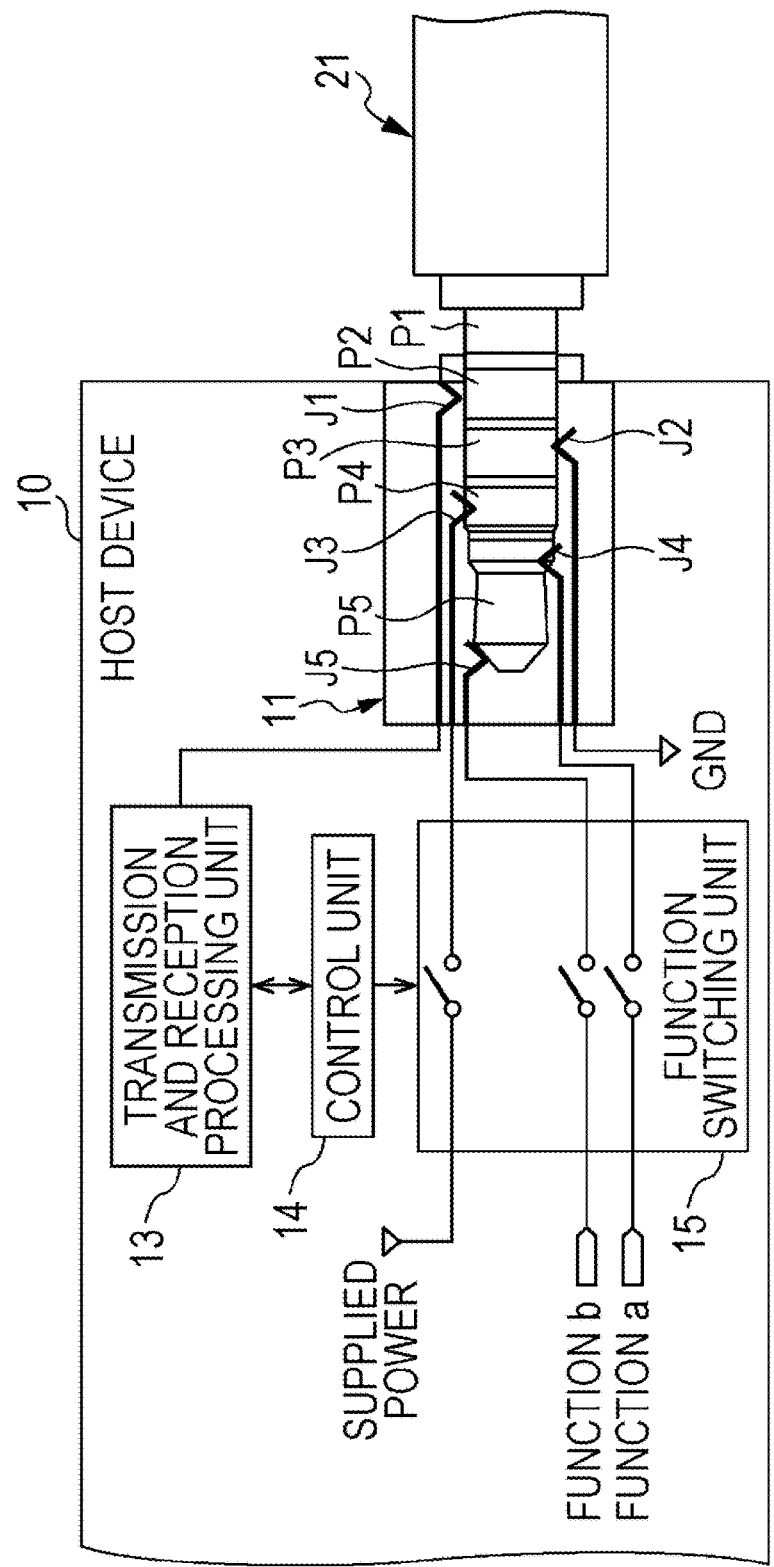
FIG. 12D is a diagram illustrating a technology for preventing an unintended short-circuit when the plug is removed from the jack in a case in which power that is supplied power is supplied from the host device to the peripheral device.

FIG. 12D illustrates a half insertion state 3 in which the plug 21 is further removed from the jack 11 from the half insertion state 2 of FIG. 12C.

In FIG. 12D, the terminal J4 of the jack 11 to which function a has been assigned, the terminal J5 of the jack 11 to which function b has been assigned, and the terminal P5 of the plug 21 to which function b has been assigned are short-circuited, and the power supply terminal J3 of the jack 11 and the terminal P4 of the plug 21 to which function a has been assigned are short-circuited.

Further, in FIG. 12D, the GND terminal J2 of the jack 11 and the power reception terminal P3 of the plug 21 are short-circuited, and the terminal J1 of the jack 11 to which the multiplexing communication function has been assigned and the GND terminal P2 of the plug 21 are short-circuited.

Therefore, the power supply terminal J3 is short-circuited to the terminal P4 that is not a power reception terminal.

However, in FIG. 12D, since the terminals J3 to J5 of the jack 11 are disconnected from the power supply function and functions a and b in the function switching unit 15, no power is supplied from the power supply terminal J3 to the terminal P4 short-circuited to the power supply terminal J3.

FIG. 12E illustrates a removal state in which the plug 21 is further removed from the jack 11 from the half insertion state 3 of FIG. 12D and fully removed from the jack 11.

In FIG. 12E, the terminals J3 to J5 of the jack 11 are disconnected from the power supply function and functions a and b in the function switching unit 15.

Further, in the removal state, none of the terminals J1 to J5 of the jack 11 are connected to the terminals P1 to P5 of the plug 21.

Therefore, the power as a power supply is not supplied from the power supply terminal J3 to the terminal that is not a power reception terminal.

As described above, when the plug 21 is removed from the jack 11 in a case in which the power that is supplied power is supplied from the host device 10 to the peripheral device 20, the function switching unit 15 maintains the respective connections of the terminals J3 to J5 of the jack 11 to the power supply function and functions a and b until it is difficult for multiplexed data communication to be performed. When it is difficult for multiplexed data communication to be performed and the removal of the plug 21 starts, the function switching unit 15 disconnects the terminals J3 to J5 of the jack 11 from the power supply function and functions a and b. Accordingly, even when the power supply terminal J3 is short-circuited to the terminal J#n or P#n that is not a power reception terminal in a half insertion state during removal of the plug 21 from the jack 11, it is possible to prevent the power that is supplied power from being supplied to the terminal that is not a power reception terminal.

Further, an example of the method of detecting insertion and removal, including start of the removal of the plug 21, includes a method of detecting the voltage of the first disconnected terminal J1 (or P1) at the time of removal, in addition to the method of recognizing whether it is difficult for the multiplexed data communication to be performed (the state of the multiplexing communication).

That is, for example, the host device 10 and the peripheral device 20 are configured so that the voltage of the terminal J1 of the jack 11 is pulled up or down when the plug 21 is not inserted into the jack 11, and the voltage of the terminal J1 is changed and pulled down or up when the plug 21 is inserted into the jack 11 and the terminal J1 of the jack 11 and the terminal P1 of the plug 21 are connected, and pull-up or pull-down of the voltage of the terminal J1 is detected. Thus, it is possible to detect the insertion and removal of the plug 21.

The method of detecting insertion and removal of the plug 21 includes a method of using a mechanical detection mechanism that detects insertion and removal of the plug 21, in addition to an electrical method of monitoring the state of the multiplexing communication or the voltage of the terminal J1 as described above.

Figure 13:
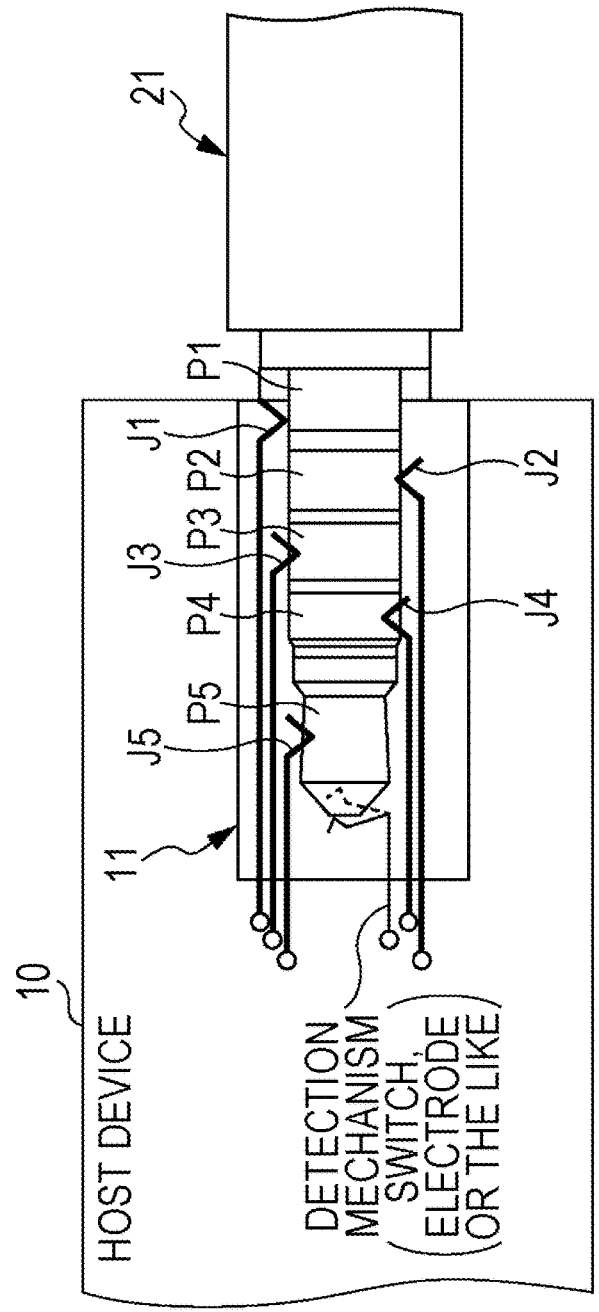
FIG. 13 is a diagram illustrating a mechanical detection mechanism that detects insertion and removal of the plug.

FIG. 13 is a diagram illustrating a mechanical detection mechanism that detects insertion and removal of the plug 21.

That is, FIG. 13 illustrates a cross-sectional view of the jack 11 and the plug 21.

In FIG. 13, an independent detection mechanism that comes in contact with the plug 21 to detect (insertion and removal of) the plug when the plug 21 enters a full insertion state (including a state close to the full insertion state) is provided in the jack 11, separately from the terminals J1 to J5.

For example, a switch or an electrode (terminal) is adopted as a detection mechanism.

FIGS. 14A to 14E are diagrams illustrating a technology for preventing an unintended short-circuit when the plug 21 is inserted into the jack 11 in a case in which power that is supplied power is supplied from the peripheral device 20 to the host device 10.

FIGS. 15A to 15E are diagrams illustrating a technology for preventing an unintended short-circuit when the plug 21 is removed from the jack 11 in a case in which power that is supplied power is supplied from the peripheral device 20 to the host device 10.

When the power that is supplied power is supplied from the peripheral device 20 to the host device 10, the insertion and removal of the plug 21 is detected, for example, based on the communication states of multiplexed data or the like, and the terminals P3 to P5 of the plug 21 are disconnected from the power supply function and (the functional block $26_1$ having) functions a and b in the function switching unit 25 when the plug 21 is not in a full insertion state, similar to the case in which the power that is supplied power is supplied from the host device 10 to the peripheral device 20. Also, when the plug 21 is in the full insertion state, the function switching unit 25 connects the terminals P3 to P5 of the plug 21, and the power supply function and (the functional block 26₁ having) functions a and b to each other. Thus, it is possible to realize the technology for preventing an unintended short-circuit.

Further, since the power supply function that is function c is assigned to the terminals J3 and P3 as illustrated in FIGS. 7A to 7E, but the power that is supplied power is supplied from the peripheral device 20 to the host device 10 in FIGS. 14A to 15E, the terminal P3 of the plug 21 is a power supply terminal and the terminal J3 of the jack 11 is a power reception terminal.

Further, in FIGS. 14A to 15E, the functional block $16_k$ having a power supply function assigned to the terminal J3 of the jack 11 of the host device 10 includes a battery built thereinto, and the power that is supplied power supplied to the power reception terminal J3 is assumed to be used for charging of the battery. The battery built into the functional block $16_k$ having a power supply function can be used as a power supply supplying power, as indicated by a dotted line in FIGS. 14A to 15E.

It can be selected whether the battery is to be charged or the power that is supplied power is supplied from the battery in the functional block $16_k$ having a power supply function based on an operation of the user, the device information of the peripheral device 20, or the like. In FIGS. 14A to 15E, the charging of the battery is selected. In this case, it may be said that the peripheral device 20 functions as a charger that charges the battery.

Figure 14A:
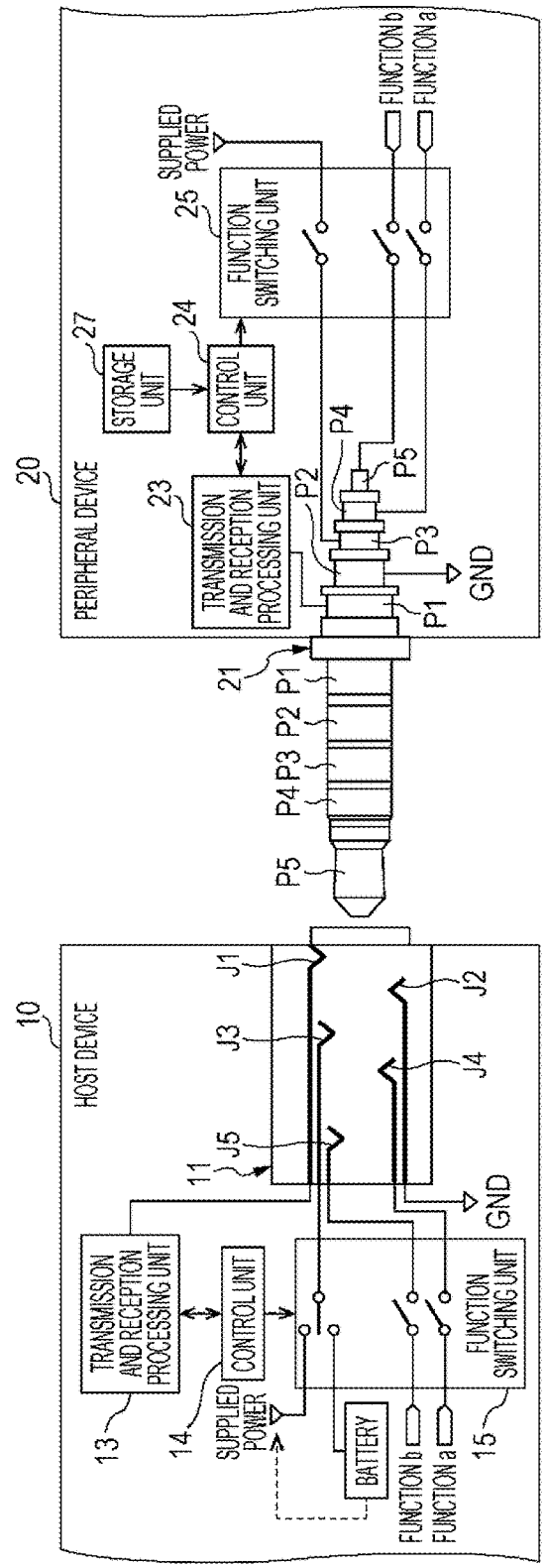
FIG. 14A is a diagram illustrating a technology for preventing an unintended short-circuit when the plug is inserted into the jack in a case in which power that is supplied power is supplied from the peripheral device to the host device.

FIG. 14A illustrates a removal state in which the plug 21 is removed from the jack 11.

In the removal state, that is, a state in which it is difficult for multiplexing communication to be performed, the terminals J3 to J5 of the jack 11, and the battery as a power supply function and (the functional block $16_k$ having) functions a and b are disconnected from each other (remain in a disconnected state) in the function switching unit 15 of the host device 10.

Similarly, even in the peripheral device 20, the terminals P3 to P5 of the plug 21 and the power supply function and (the functional block 26₁ having) functions a and b are disconnected from each other (remain in a disconnected state) in the function switching unit 25.

Figure 14B:
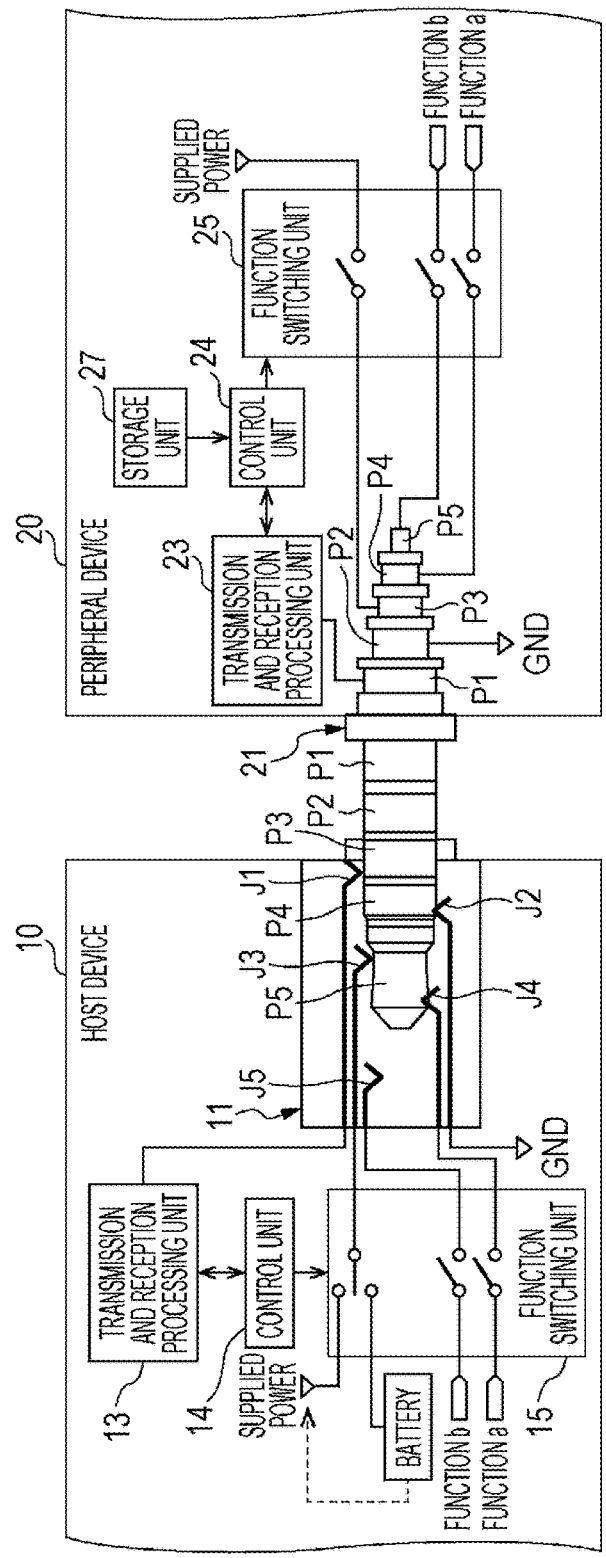
FIG. 14B is a diagram illustrating a technology for preventing an unintended short-circuit when the plug is inserted into the jack in a case in which power that is supplied power is supplied from the peripheral device to the host device.

FIG. 14B illustrates a half insertion state 1 during insertion of the plug 21 into the jack 11 from the removal state of FIG. 14A.

In FIG. 14B, the terminal J1 of the jack 11 and the power supply terminal P3 of the plug 21 are short-circuited, and the GND terminal J2 of the jack 11 and the terminal P4 of the plug 21 are short-circuited (connected).

Further, in FIG. 14B, the power reception terminal J3 and the terminal J4 of the jack 11 and the terminal P5 of the plug 21 are short-circuited to each other.

Therefore, the power supply terminal P3 is short-circuited to the terminal J1 that is not a power reception terminal.

However, in FIG. 14B, since the terminals J3 to J5 of the jack 11 are disconnected from the battery as a power supply function and functions a and b in the function switching unit 15, and the terminals P3 to P5 of the plug 21 are disconnected from the power supply function and functions a and b in the function switching unit 25, power is not supplied from the power supply terminal P3 to the terminal J1 short-circuited to the power supply terminal P3.

Figure 14C:
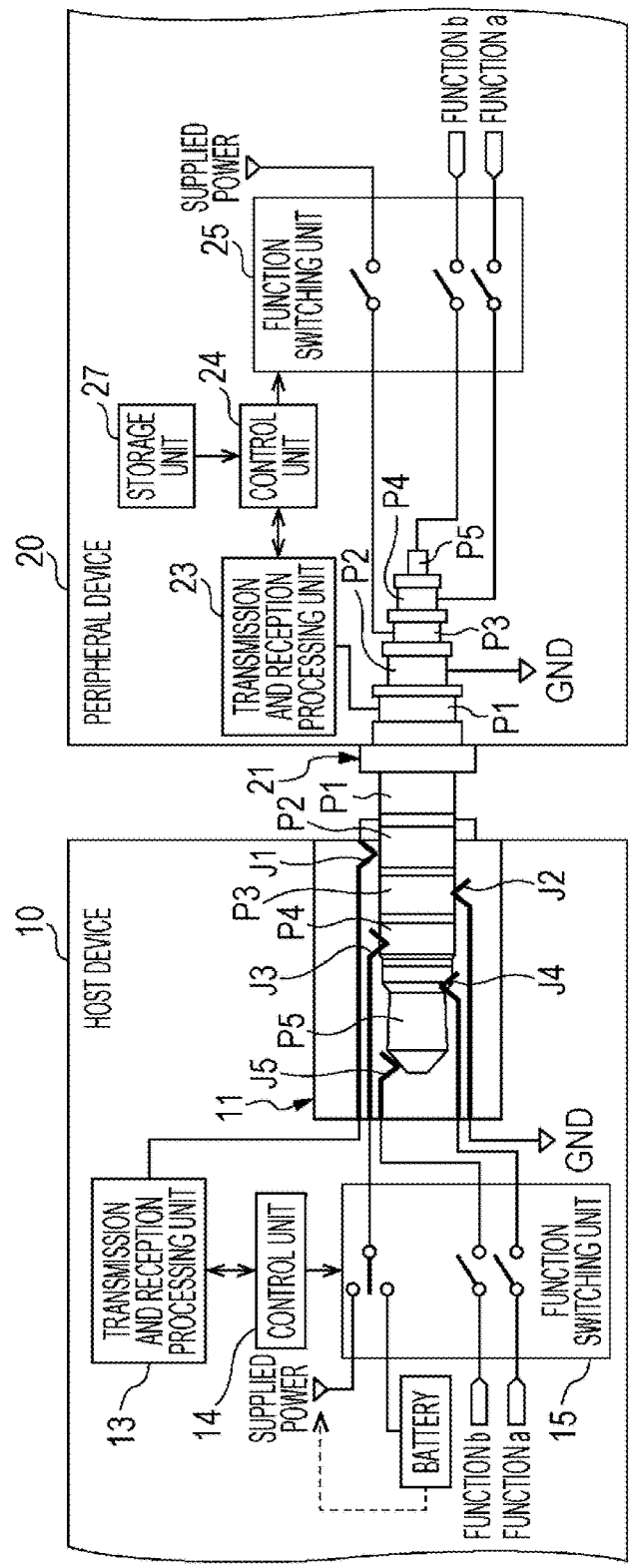
FIG. 14C is a diagram illustrating a technology for preventing an unintended short-circuit when the plug is inserted into the jack in a case in which power that is supplied power is supplied from the peripheral device to the host device.

FIG. 14C illustrates a half insertion state 2 in which the plug 21 is further inserted into the jack 11 from the half insertion state 1 of FIG. 14B.

In FIG. 14C, the terminal J1 of the jack 11 and the GND terminal P2 of the plug 21 are short-circuited to each other, and the GND terminal J2 of the jack 11 and the power supply terminal P3 of the plug 21 are short-circuited to each other.

Further, in FIG. 14C, the power reception terminal J3 of the jack 11 and the terminal P4 of the plug 21 are short-circuited to each other, and the terminal J4 of the jack 11 and the terminal P5 of the plug 21 are short-circuited to each other.

Therefore, the power supply terminal P3 is short-circuited to the GND terminal J2 that is not a power reception terminal.

However, in FIG. 14C, since the terminals J3 to J5 of the jack 11 are disconnected from the battery as a power supply function and functions a and b in the function switching unit 15, and the terminals P3 to P5 of the plug 21 are disconnected from and the power supply function and functions a and b in the function switching unit 25, power is not supplied from the power supply terminal P3 to the GND terminal J2 short-circuited to the power supply terminal P3.

Figure 14D:
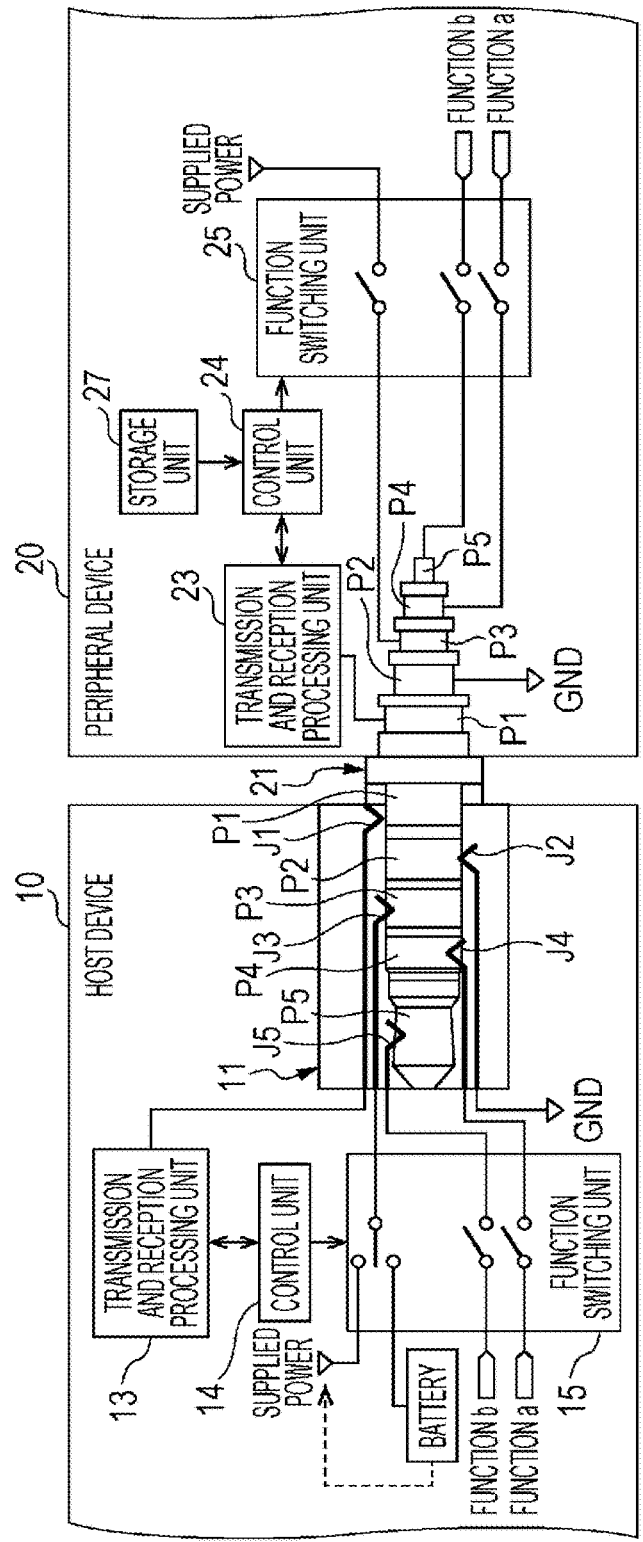
FIG. 14D is a diagram illustrating a technology for preventing an unintended short-circuit when the plug is inserted into the jack in a case in which power that is supplied power is supplied from the peripheral device to the host device.

FIG. 14D illustrates a full insertion state directly after the plug 21 is further inserted into the jack 11 from the half insertion state 2 of FIG. 14C and fully inserted into the jack 11.

In FIG. 14D, the terminals J1 to J5 of the jack 11 and the terminals P1 to P5 of the plug 21 intended to be originally connected are short-circuited (connected).

Therefore, in the host device 10 and the peripheral device 20, the communication of the multiplexed data is performed between the transmission and reception processing units 13 and 23 via the terminal J1 of the jack 11 and the terminal P1 of the plug 21 to which the multiplexing communication function has been assigned.

In the host device 10, when the transmission and reception processing unit 13 can perform multiplexed data communication, the control unit 14 recognizes that the plug 21 (and the jack 11) is in the full insertion state, and controls the function switching unit 15 to connect the terminals J3 to J5 of the jack 11 to the battery as a power supply function and (the functional block $16_k$ having) functions a and b.

Similarly, even in the peripheral device 20, when the transmission and reception processing unit 23 can perform multiplexed data communication, the control unit 24 recognizes that the plug 21 (and the jack 11) is in a full insertion state and controls the function switching unit 25 to connect the terminals P3 to P5 of the plug 21 to the power supply function and (the functional block 26₁ having) functions a and b.

FIG. 14E illustrates a full insertion state directly after multiplexed data is exchanged in the host device 10 and the peripheral device 20 after the full insertion state of FIG. 14D.

In FIG. 14E, the terminals J3 to J5 of the jack 11, and the battery as a power supply function and functions a and b are connected in the function switching unit 15, and the terminals P3 to P5 of the plug 21 and the power supply function and functions a and b are connected in the function switching unit 25, as described above.

Therefore, in the peripheral device 20, supply of the power that is supplied power from the power supply terminal P3 is performed, but the power is supplied to the host device 10 via the power reception terminal J3 short-circuited to the power supply terminal P3 and is used for charging of the battery as a power supply function connected to the power reception terminal J3.

As described above, when the plug 21 is inserted into the jack 11 in a case in which power that is supplied power is supplied from the peripheral device 20 to host device 10, the function switching unit 15 disconnects the terminals J3 to J5 of the jack 11 from the battery as the power supply function and functions a and b, and the function switching unit 25 disconnects the terminals P3 to P5 of the plug 21 from the power supply function and functions a and b until multiplexed data communication can be performed. When multiplexed data communication can be performed and the plug 21 is fully inserted into the jack 11, the function switching unit 15 connects the terminals J3 to J5 of the jack 11 to the battery as the power supply function and functions a and b, and the function switching unit 25 connects the terminals P3 to P5 of the plug 21 to the power supply function and functions a and b. Accordingly, even when the power supply terminal P3 is short-circuited to the terminal J#n or P#n that is not a power reception terminal in a half insertion state during insertion of the plug 21 into the jack 11, it is possible to prevent the power that is supplied power from being supplied to the terminal that is not a power reception terminal.

Hereinafter, a case in which the plug 21 is removed after the plug 21 enters a full insertion state as described above will be described.

Figure 15A:
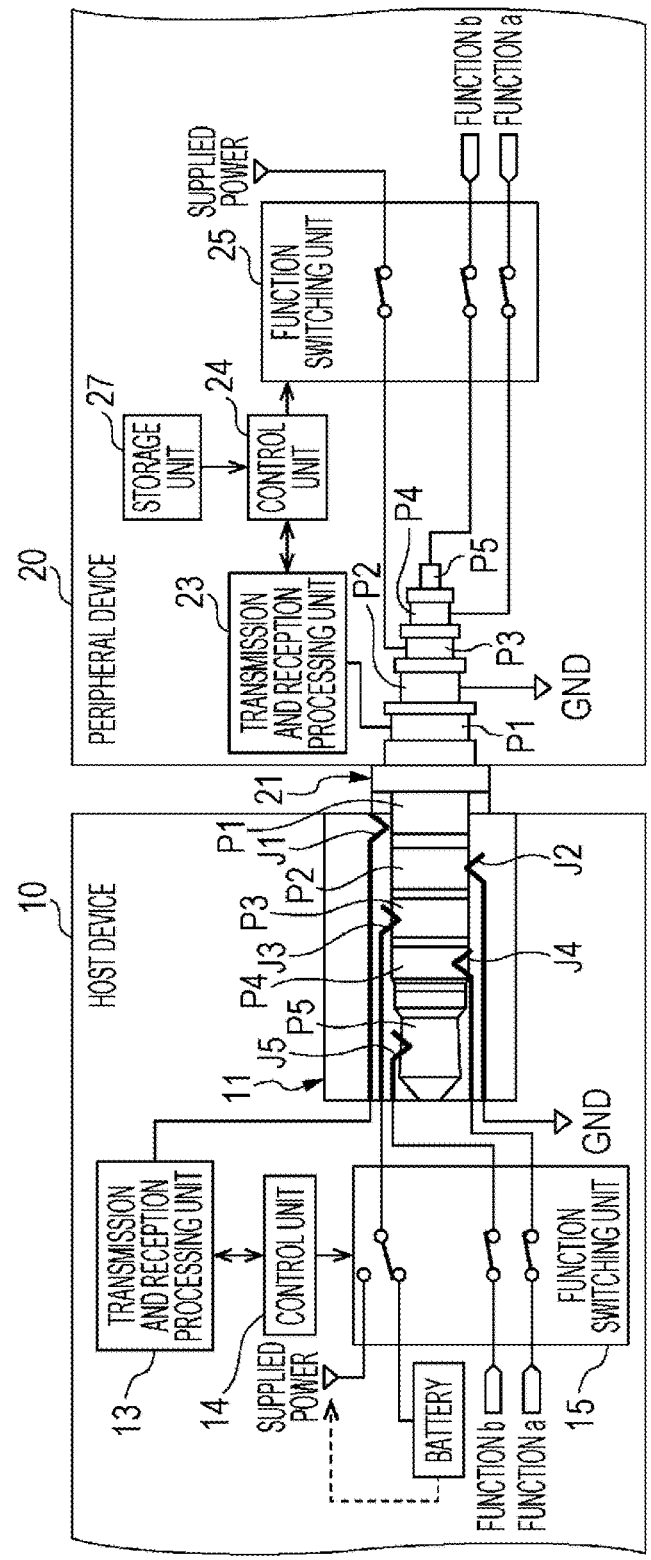
FIG. 15A is a diagram illustrating a technology for preventing an unintended short-circuit when the plug is removed from the jack in a case in which power that is supplied power is supplied from the peripheral device to the host device.

FIG. 15A illustrates a full insertion state, similarly to FIG. 14E.

That is, in FIG. 15A, the terminals J1 to J5 of the jack 11 and the terminals P1 to P5 of the plug 21 intended to be originally connected are short-circuited. Further, the terminals J3 to J5 of the jack 11, and the battery as a power supply function and functions a and b are connected in the function switching unit 15, and the terminals P3 to P5 of the plug 21, and the power supply function and functions a and b are connected in the function switching unit 25.

Figure 15B:
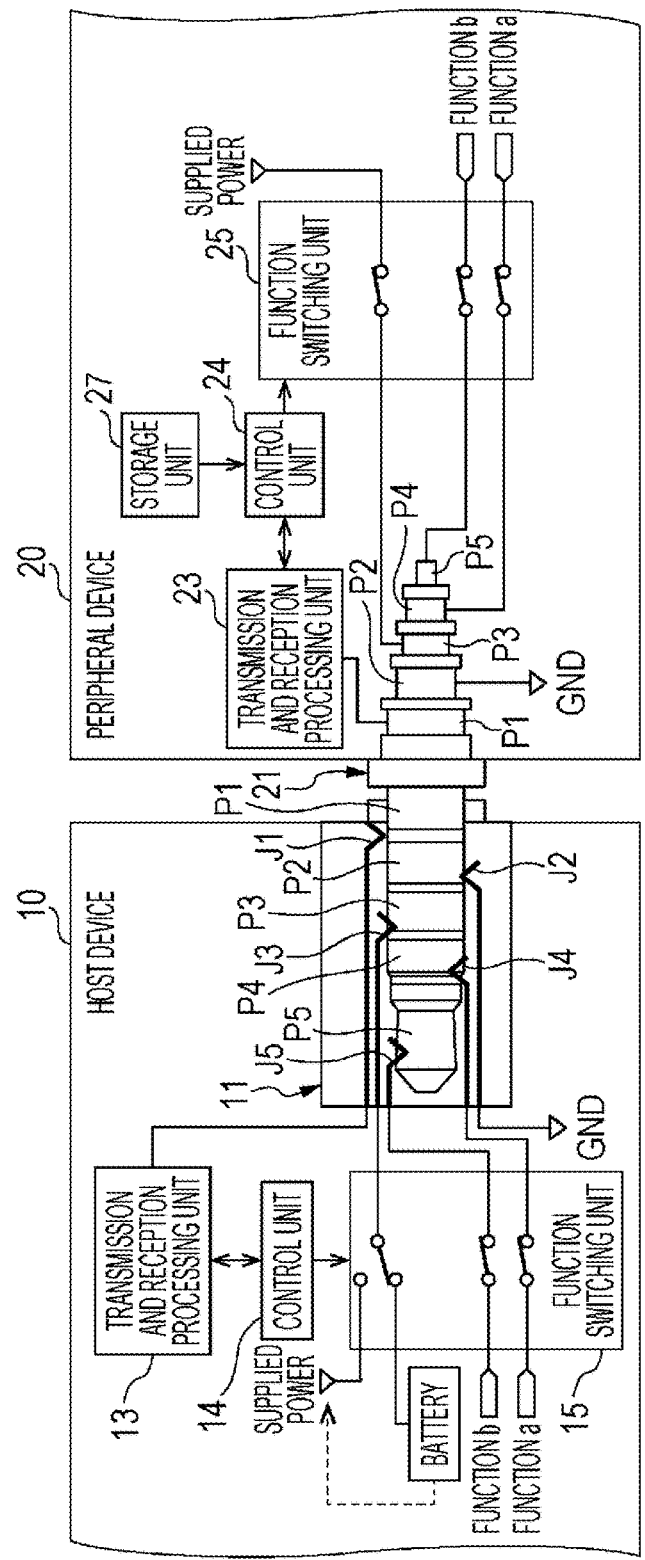
FIG. 15B is a diagram illustrating a technology for preventing an unintended short-circuit when the plug is removed from the jack in a case in which power that is supplied power is supplied from the peripheral device to the host device.

FIG. 15B illustrates a half insertion state during removal of the plug 21 from the jack 11 from the full insertion state of FIG. 15A.

In the half insertion state of FIG. 15B, removal of the plug 21 from the jack 11 is started from the full insertion state, and the terminal J1 of the jack 11 and the terminal P1 of the plug 21 short-circuited in the full insertion state are disconnected.

Here, the jack 11 and the plug 21 are configured so that, in a process of removing the plug 21 from the full insertion state, the connection of the terminal J1 on the insertion port side of the jack 11 and the terminal P1 on the root side of the plug 21 among the terminals J#n and P#n short-circuited in the full insertion state is disconnected first, as described in FIGS. 12A to 12E.

In FIG. 15B, only the connection of the terminals J1 and P1 is disconnected, and the respective connections of the other terminals J2 to J5 and the terminals P2 to P5 are still maintained. Therefore, the power reception terminal J3 of the jack 11 and the power supply terminal P3 of the plug 21 are connected, and the power as a power supply is supplied from the power supply terminal P3 to the power reception terminal J3 to which power is to be supplied.

Since the multiplexing communication function is assigned to the terminals J1 and P1, when the connection of the terminals J1 and P1 is disconnected, it is difficult for multiplexing communication to be performed between the host device 10 and the peripheral device 20.

Figure 15C:
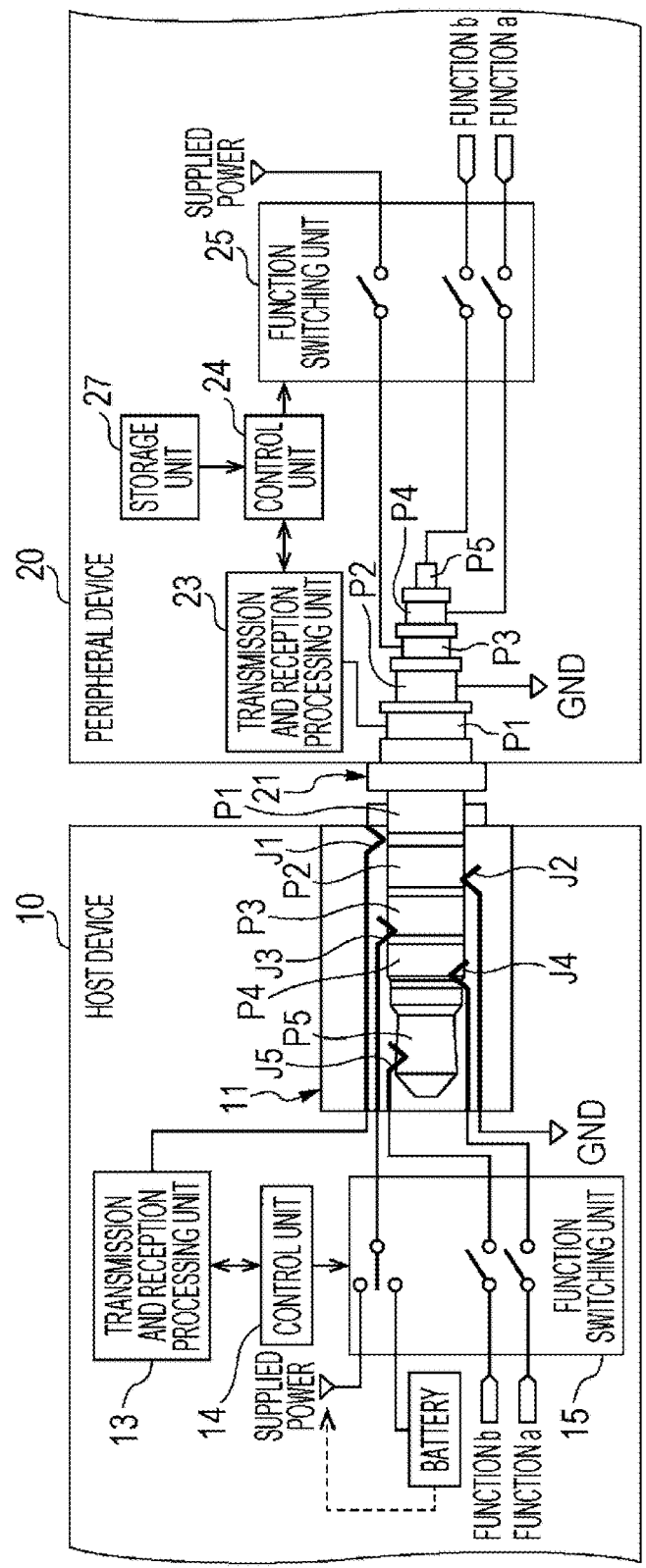
FIG. 15C is a diagram illustrating a technology for preventing an unintended short-circuit when the plug is removed from the jack in a case in which power that is supplied power is supplied from the peripheral device to the host device.

FIG. 15C illustrates a half insertion state directly after the connection of the terminals J1 and P1 is disconnected and it is difficult for the multiplexing communication to be performed between the host device 10 and the peripheral device 20, as described above.

When it is difficult for the multiplexing communication to be performed between the host device 10 and the peripheral device 20, the transmission and reception processing unit 13 of the host device 10 detects a state in which it is difficult for multiplexed data to be transmitted and received (communication-unavailable state) as a communication state of the multiplexed data.

When the transmission and reception processing unit 13 detects the communication-unavailable state as the communication state of multiplexed data, the transmission and reception processing unit 13 supplies the fact to the control unit 14. When the fact that the communication state of multiplexed data is a communication-unavailable state is supplied from the transmission and reception processing unit 13, the control unit 14 controls the function switching unit 15 based on the communication-unavailable state to thereby disconnect the terminals J3 to J5 of the jack 11 from the battery as a power supply function and functions a and b.

Similarly, the transmission and reception processing unit 23 of the peripheral device 20 detects a communication-unavailable state as a communication state of multiplexed data.

When the communication-unavailable state is detected as the communication state of multiplexed data, the transmission and reception processing unit 23 supplies the fact to the control unit 24. When the fact that the communication state of the multiplexed data is a communication-unavailable state is supplied from the transmission and reception processing unit 23, the control unit 24 controls the function switching unit 25 based on the communication-unavailable state to thereby disconnect the terminals P3 to P5 of the plug 21 from the power supply function and functions a and b.

In FIG. 15C, the terminals J3 to J5 of the jack 11 are disconnected from the power supply function and functions a and b in the function switching unit 15, and the terminals P3 to P5 of the plug 21 are disconnected from the power supply function and functions a and b in the function switching unit 25.

Further, in FIG. 15C, the respective connections of the terminals J2 to J5 and the terminals P2 to P5 are maintained, similarly to FIG. 15B. Therefore, the power reception terminal J3 of the jack 11 and the power supply terminal P3 of the plug 21 are connected.

However, in FIG. 15C, since the terminals J3 to J5 of the jack 11 are disconnected from the battery as a power supply function and functions a and b in the function switching unit 15, and the terminals P3 to P5 of the plug 21 are disconnected from the power supply function and functions a and b in the function switching unit 25, the power is not supplied from the power supply terminal P3 to the power reception terminal J3 connected (short-circuited) to the power supply terminal P3.

Figure 15D:
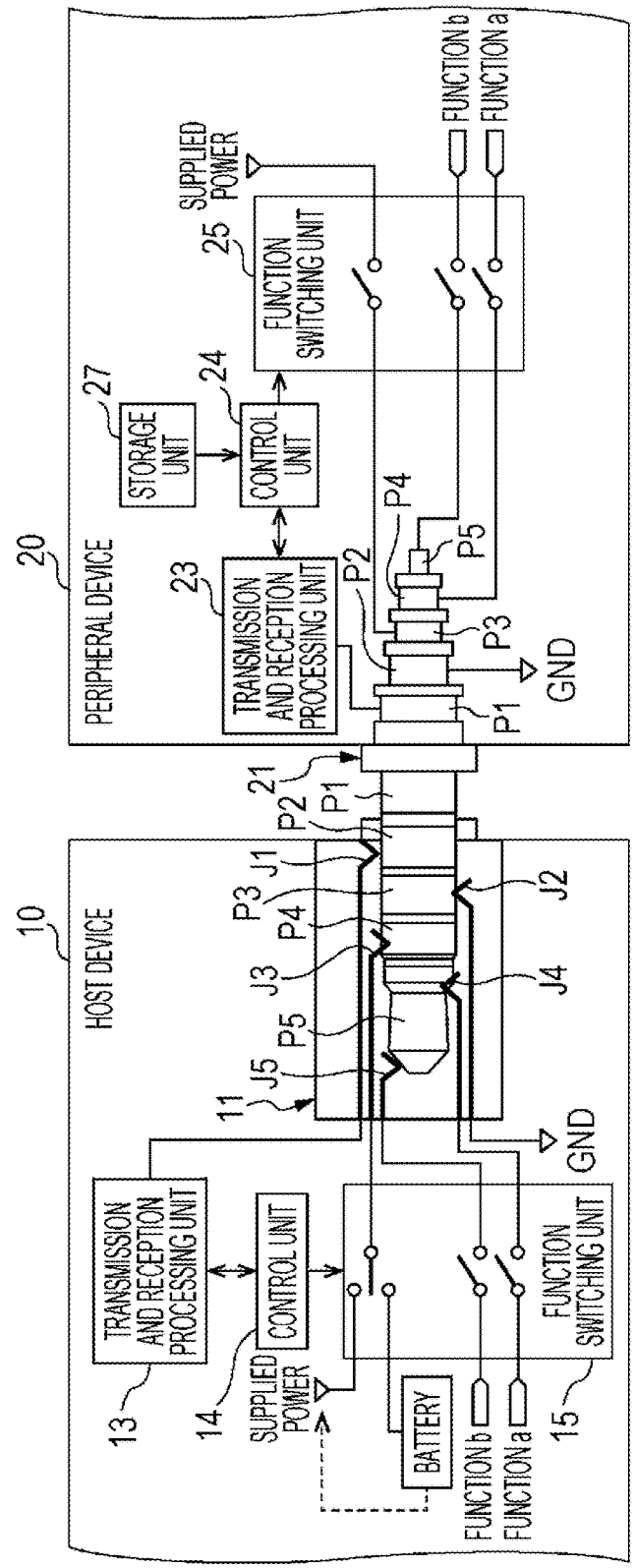
FIG. 15D is a diagram illustrating a technology for preventing an unintended short-circuit when the plug is removed from the jack in a case in which power that is supplied power is supplied from the peripheral device to the host device.

FIG. 15D illustrates a half insertion state in which the plug 21 is further removed from the jack 11 from the half insertion state of FIG. 15C.

In FIG. 15D, the terminal J4 of the jack 11 and the terminal P5 of the plug 21 are short-circuited, and the power reception terminal J3 of the jack 11 and the terminal P4 of the plug 21 to which function a has been assigned are short-circuited.

Further, in FIG. 15D, the GND terminal J2 of the jack 11 and the power supply terminal P3 of the plug 21 are short-circuited, and the terminal J1 of the jack 11 and the GND terminal P2 of the plug 21 to which the multiplexing communication function has been assigned are short-circuited.

Therefore, the power supply terminal P3 is short-circuited to the GND terminal J2 that is not a power reception terminal.

However, in FIG. 15D, since the terminals J3 to J5 of the jack 11 are disconnected from the battery as a power supply function and functions a and b in the function switching unit 15, and the terminals P3 to P5 of the plug 21 are disconnected from the power supply function and functions a and b in the function switching unit 25, the power is not supplied from the power supply terminal P3 to the GND terminal J2 short-circuited to the power supply terminal J3.

Figure 15E:
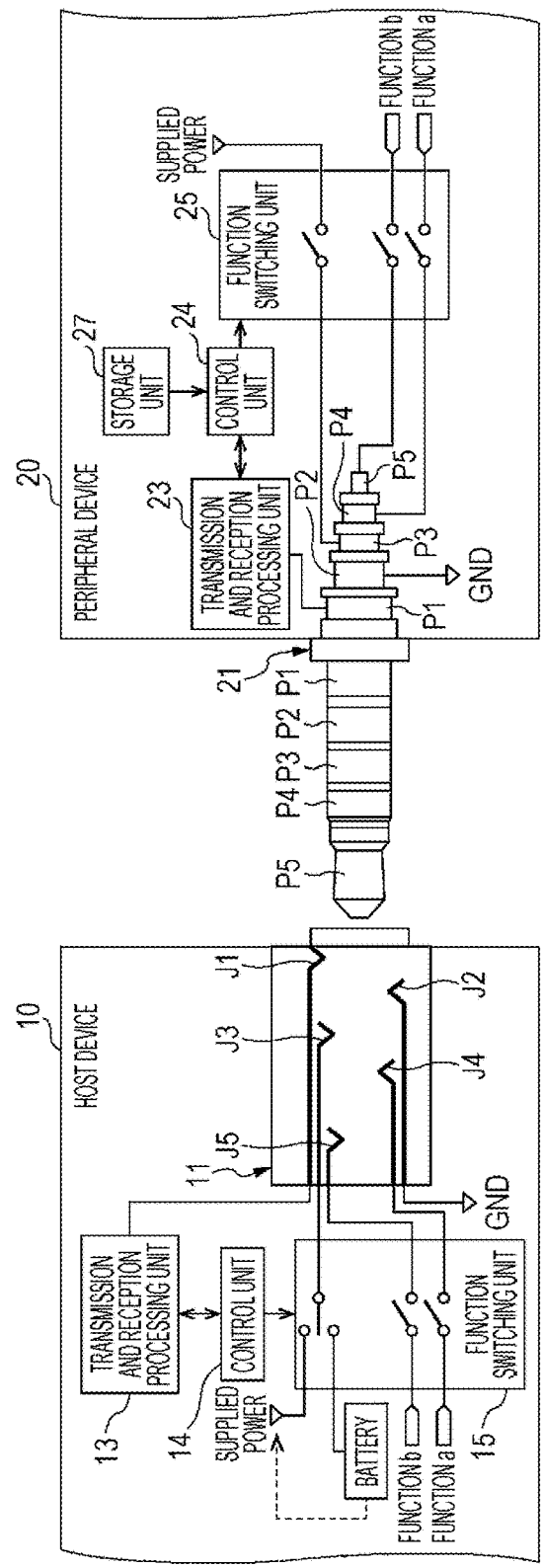
FIG. 15E is a diagram illustrating a technology for preventing an unintended short-circuit when the plug is removed from the jack in a case in which power that is supplied power is supplied from the peripheral device to the host device.

FIG. 15E illustrates a removal state in which the plug 21 is further removed from the jack 11 from the half insertion state of FIG. 15D and fully removed from the jack 11.

In FIG. 15E, the terminals J3 to J5 of the jack 11 are disconnected from the power supply function and functions a and b in the function switching unit 15, and the terminals P3 to P5 of the plug 21 are disconnected from the power supply function and functions a and b in the function switching unit 25.

Further, in the removal state, the terminals J1 to J5 of the jack 11 and the terminals P1 to P5 of the plug 21 are not connected.

Therefore, the power as a power supply is not supplied from the power supply terminal J3 to the terminal that is not a power reception terminal.

As described above, when the plug 21 is removed from the jack 11 in a case in which the power that is supplied power is supplied from the host device 10 to the peripheral device 20, the function switching unit 15 connects the terminals J3 to J5 of the jack 11 to the power supply function and functions a and b and the function switching unit 25 connects the terminals P3 to P5 of the plug 21 to the power supply function and functions a and b until it is difficult for multiplexed data communication to be performed. When it is difficult for multiplexed data communication to be performed and the removal of the plug 21 starts, the function switching unit 15 disconnects the terminals J3 to J5 of the jack 11 from the power supply function and functions a and b, and the function switching unit 25 disconnects the terminals P3 to P5 of the plug 21 from the power supply function and functions a and b. Accordingly, even when the power supply terminal P3 is short-circuited to the terminal J#n or P#n that is not a power reception terminal in a half insertion state during removal of the plug 21 from the jack 11, it is possible to prevent the power that is supplied power from being supplied to the terminal that is not a power reception terminal.

In the above-described technology for preventing an unintended short-circuit, a power supply short-circuit in which the power supply terminal is short-circuited to a terminal that is not a power reception terminal upon insertion and removal of the plug 21 is prevented by performing connection or disconnection to or from the terminals J3 to J5 of the jack 11 in the function switching unit 15. However, the power supply short-circuit can be prevented, for example, using a scheme of assigning a power supply function to the terminal J#n of the jack 11 and the terminal P#n of the plug 21.

FIGS. 16A to 16E are diagrams illustrating a method of preventing a power supply from being short-circuited upon insertion and removal of the plug 21 when power that is supplied power is supplied from the host device 10 to the peripheral device 20.

In FIGS. 16A to 16E, in the host device 10, the functional block $16_k$ having a power supply function includes a battery built thereinto, and power that is supplied power is supplied from the battery.

Further, in FIGS. 16A to 16E, in the function switching unit 15 of the host device 10, a power supply function, that is, a battery that supplies power that is supplied power is connected to the terminal J5 on the innermost side of the jack 11 (viewed from an insertion port through which the plug 21 is inserted), and thus, the terminal J5 becomes a power supply terminal.

Further, in FIGS. 16A to 16E, in the function switching unit 15 of the host device 10, the terminal J3 of the jack 11 is connected to function b, and the terminal J4 is connected to function a. Also, the terminal J1 becomes a communication terminal for performing multiplexing communication, and the terminal J2 becomes the GND terminal.

Further, in FIGS. 16A to 16E, illustration of the function switching unit 25 of the peripheral device 20 is omitted.

In the peripheral device 20, the terminal P1 of the plug 21 becomes the communication terminal, the terminal P3 is connected to function b, and the terminal P4 is connected to function a. Further, the terminal P2 becomes the GND terminal. Also, the terminal P5 on the head side of the plug 21 to be short-circuited (brought into contact) with the power supply terminal J5 on the innermost side of the jack 11 is connected as a power reception terminal to functions a and b so that power supplied to the power reception terminal P5 is supplied as a power supply to (the functional block $26_1$ having) functions a and b.

Figure 16A:
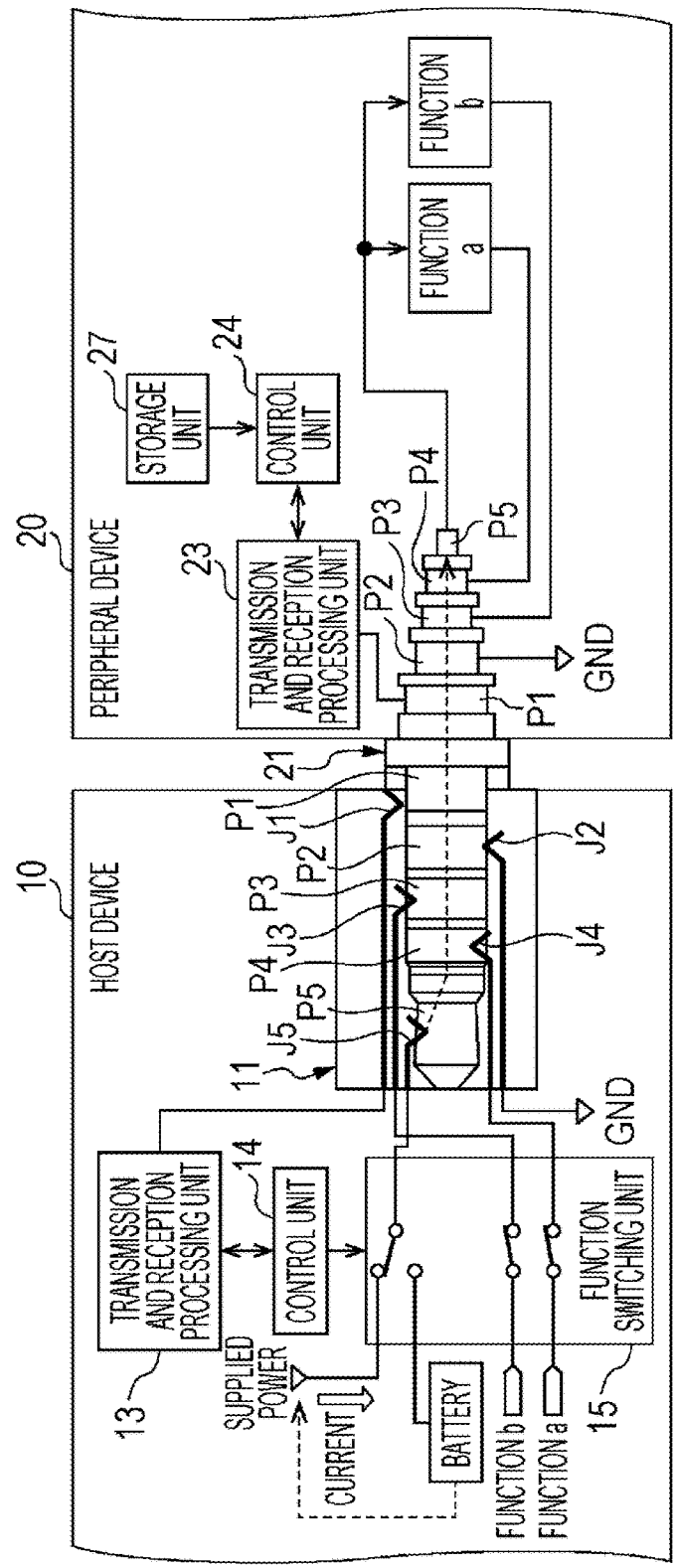
FIG. 16A is a diagram illustrating a method of preventing a power supply from being short-circuited upon insertion and removal of the plug when power that is supplied power is supplied from the host device to the peripheral device.

FIG. 16A illustrates a full insertion state in which the plug 21 is fully inserted into the jack 11.

In FIG. 16A, the terminals J1 to J5 of the jack 11 and the terminals P1 to P5 of the plug 21 intended to be originally connected are short-circuited.

In the full insertion state, the power supplied by the battery of the host device 10 is provided as supplied power to (the functional block $26_1$ having) functions a and b of the peripheral device 20 via the function switching unit 15, the power supply terminal J5 of the jack 11, and the power reception terminal P5 of the plug 21.

Figure 16B:
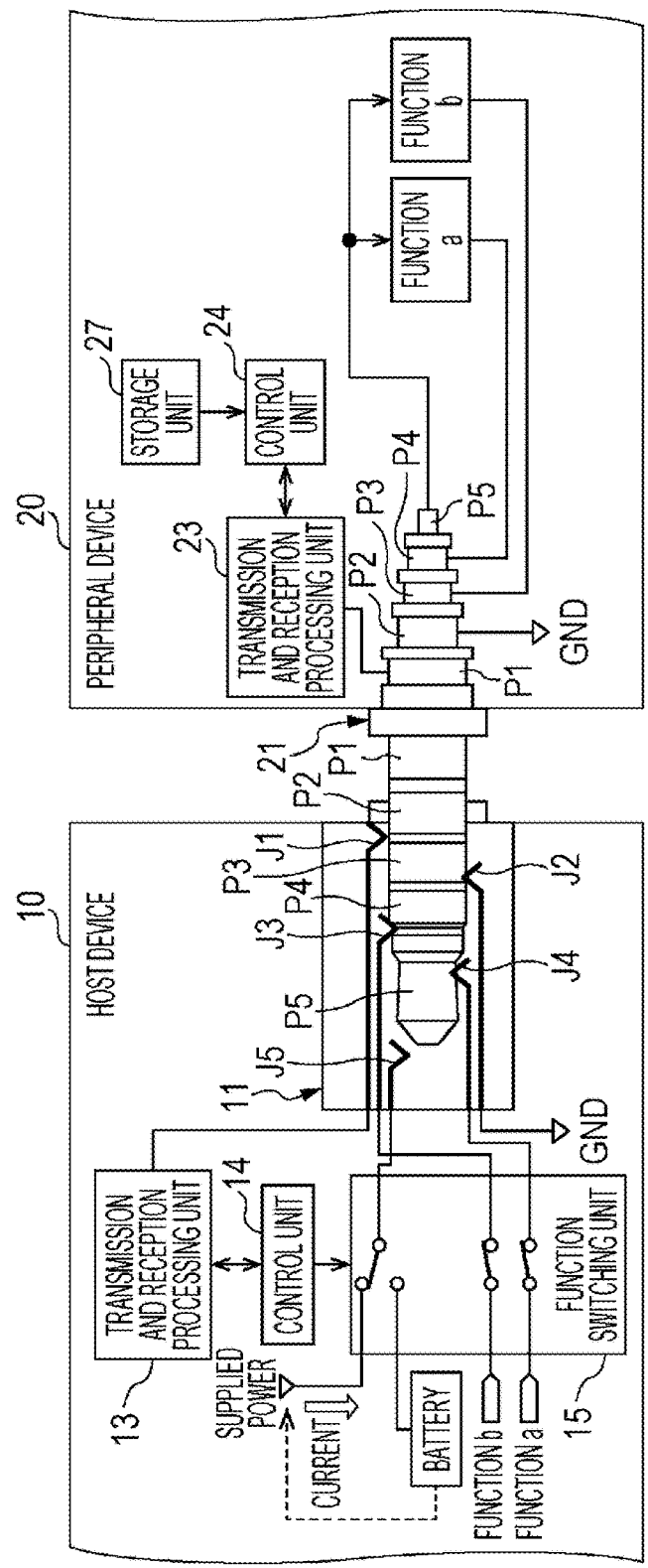
FIG. 16B is a diagram illustrating a method of preventing a power supply from being short-circuited upon insertion and removal of the plug when power that is supplied power is supplied from the host device to the peripheral device.

FIG. 16B illustrates a half insertion state during removal of the plug 21 from the jack 11 from the full insertion state of FIG. 16A.

In the half insertion state of FIG. 16B, the terminal J1 of the jack 11 comes in contact with an insulator between the terminals P2 and P3 of the plug 21, and the terminal J2 of the jack 11 is short-circuited to the terminal P3 of the plug 21.

Further, the terminal J3 of the jack 11 comes in contact with an insulator between the terminals P4 and P5 of the plug 21, and the terminal J4 of the jack 11 is short-circuited to the power reception terminal P5 of the plug 21.

Further, the power supply terminal J5 of the jack 11 is not short-circuited to any terminal P#n of the plug 21.

As described above, since the power supply terminal J5 of the jack 11 is not short-circuited to any terminal P#n of the plug 21, power that is supplied power is not supplied from the power supply terminal J5 to the terminal P#n of the plug 21 that is not a power reception terminal.

Figure 16C:
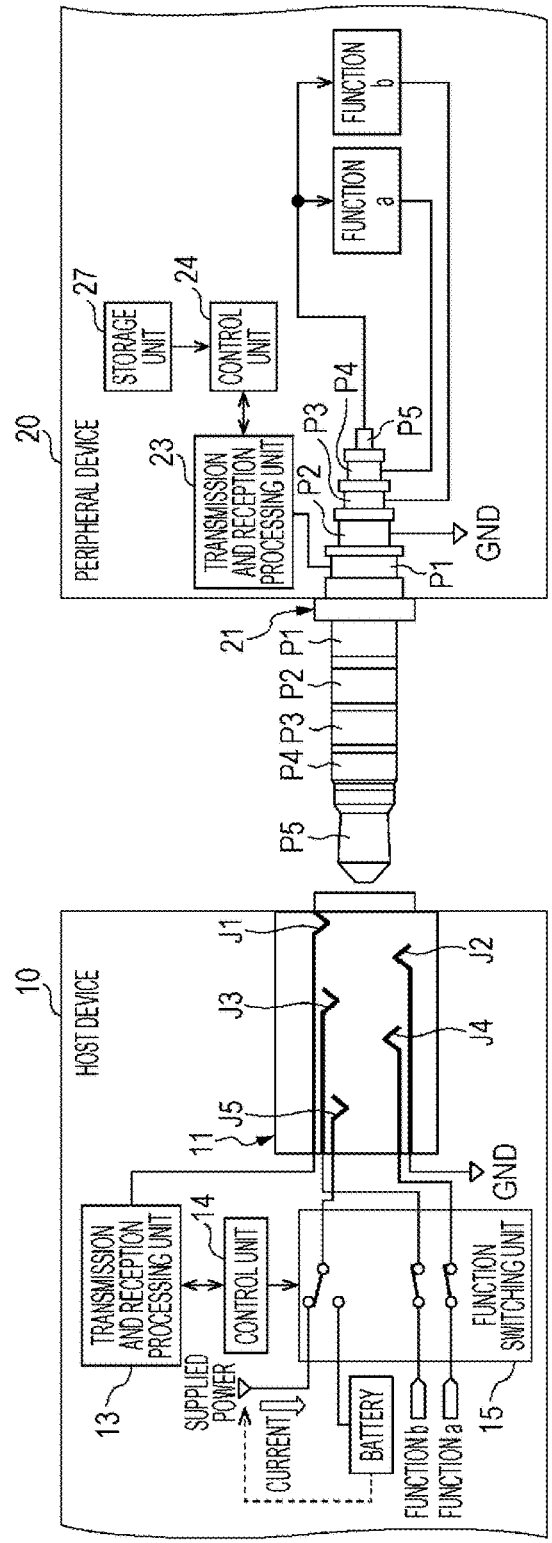
FIG. 16C is a diagram illustrating a method of preventing a power supply from being short-circuited upon insertion and removal of the plug when power that is supplied power is supplied from the host device to the peripheral device.

FIG. 16C illustrates a removal state in which the plug 21 is further removed from the jack 11 from the half insertion state of FIG. 16B and fully removed from the jack 11.

In the removal state, none of the terminals J1 to J5 of the jack 11 are connected to the terminals P1 to P5 of the plug 21.

Therefore, power that is supplied power is not supplied from the power supply terminal J5 to the terminal P#n of the plug 21 that is not a power reception terminal.

Figure 16D:
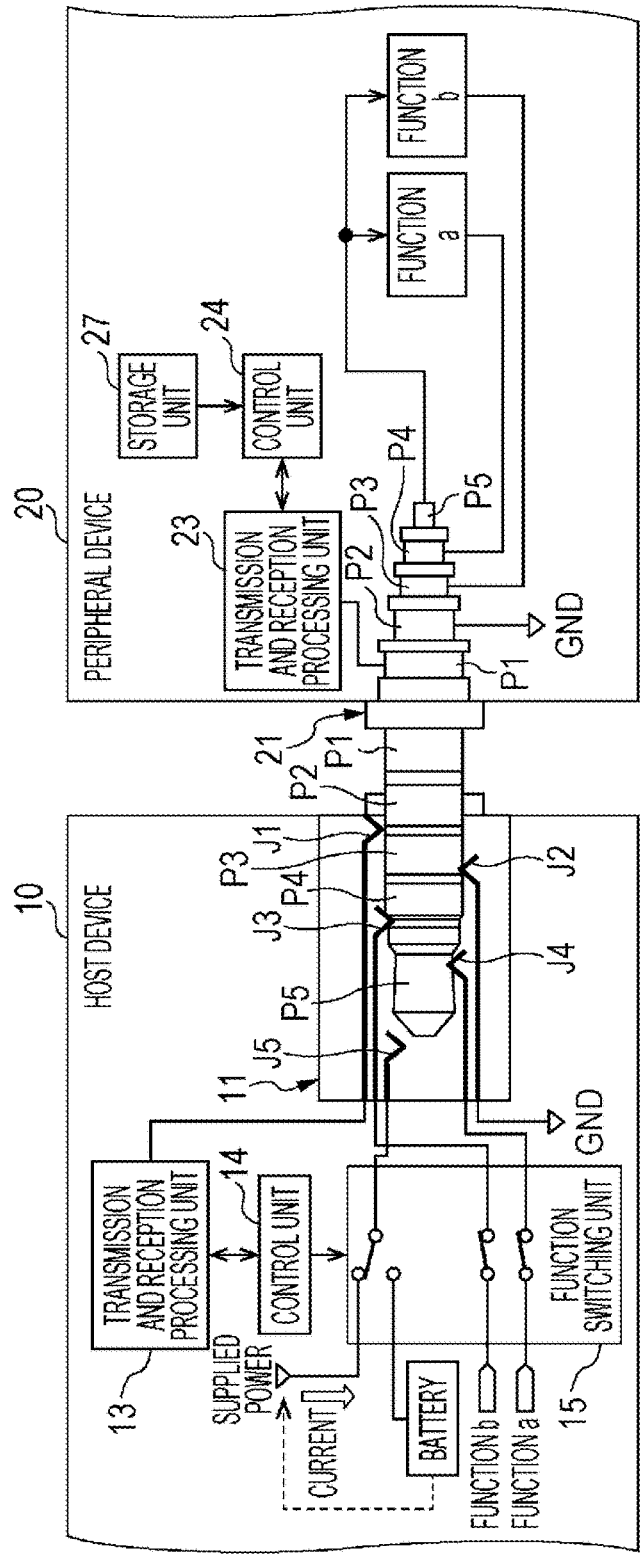
FIG. 16D is a diagram illustrating a method of preventing a power supply from being short-circuited upon insertion and removal of the plug when power that is supplied power is supplied from the host device to the peripheral device.

FIG. 16D illustrates a half insertion state during insertion of the plug 21 into the jack 11 from the removal state of FIG. 16C.

In the half insertion state of FIG. 16D, the state of the jack 11 and the plug 21 becomes the same as the half insertion state of FIG. 16B.

Therefore, since the power supply terminal J5 of the jack 11 is not short-circuited to any terminal P#n of the plug 21, power that is supplied power is not supplied from the power supply terminal J5 to the terminal P#n of the plug 21 that is not a power reception terminal.

FIG. 16E illustrates a full insertion state in which the plug 21 is further inserted into the jack 11 from the half insertion state of FIG. 16D and fully inserted into the jack 11.

In the full insertion state, the terminals J1 to J5 of the jack 11 and the terminals P1 to P5 of the plug 21 intended to be originally connected are short-circuited, as described in FIG. 16A.

Therefore, in the full insertion state, the power supplied by the battery of the host device 10 is provided as a power supply to functions a and b of the peripheral device 20 via the function switching unit 15, the power supply terminal J5 of the jack 11, and the power reception terminal P5 of the plug 21.

As described above, when the function switching unit 15 of the host device 10 connects the battery that supplies the power that is supplied power and the terminal J5 on the innermost side of the jack 11, uses the terminal J5 as the power supply terminal, and uses the terminal P5 on the head side of the plug 21 of the peripheral device 20 as a power reception terminal, that is, when the power supply function is assigned to the terminal J5 on the innermost side of the jack 11 and the terminal P5 on the head side of the plug 21, the power supply terminal J5 on the innermost side of the jack 11 is not short-circuited to the power reception terminal P5 on the head side of the plug 21 upon insertion and removal of the plug 21, and thus, when the power that is supplied power is supplied from the host device 10 to the peripheral device 20, it is possible to prevent a power supply short-circuit in which the power supply terminal J5 of the jack 11 is short-circuited to the terminal that is not a power reception terminal upon insertion and removal of the plug 21.

Further, by assigning the power supply function to the terminal J5 on the innermost side of the jack 11 and the terminal P5 on the head side of the plug 21, when the power supply short-circuit is to be prevented, it is necessary for the function switching unit 15 to switch the assignment of the function of the terminal J#n of the jack 11 according to a specification of the plug of an existing headset to be suitable for the plug after a plug with 3 poles or 4 poles of an existing headset is inserted into the jack 11 and it is detected that the existing headset is not a corresponding device, so as to maintain backward compatibility of the host device 10, as described above.

The same applies to the case in which backward compatibility of the peripheral device 20 is maintained.

FIGS. 17A to 17E are diagrams illustrating a method of preventing a power supply short-circuit upon insertion and removal of the plug 21 when power that is supplied power is supplied from the peripheral device 20 to the host device 10.

In FIGS. 17A to 17E, in the host device 10, the functional block $16_k$ having the power supply function includes a battery built thereinto, and the power that is supplied power for charging the battery is supplied to the battery.

Further, in FIGS. 17A to 17E, in the function switching unit 15 of the host device 10, the battery having a power supply function, that is, the battery receiving supply of the power that is supplied power is connected to the terminal J1 on the insertion port side of the jack 11, and thus, the terminal J1 is a power reception terminal.

Further, in FIGS. 17A to 17E, in the function switching unit 15 of the host device 10, the terminal J4 of the jack 11 is connected to function a, and the terminal J5 is connected to function b. Also, terminal J2 becomes the GND terminal, and the terminal J3 becomes the communication terminal.

Further, in FIGS. 17A to 17E, in the function switching unit 25 of the peripheral device 20, a power supply function, that is, a function of supplying power that is supplied power is connected to the terminal P1 on the root side of the plug 21, and thus, the terminal P1 is a power supply terminal.

Further, in FIGS. 17A to 17E, in the function switching unit 25 of the peripheral device 20, the terminal P4 of the plug 21 is connected to function a, and the terminal P5 is connected to function b. Also, the terminal P2 becomes the GND terminal, and the terminal P3 becomes the communication terminal.

Figure 17A:
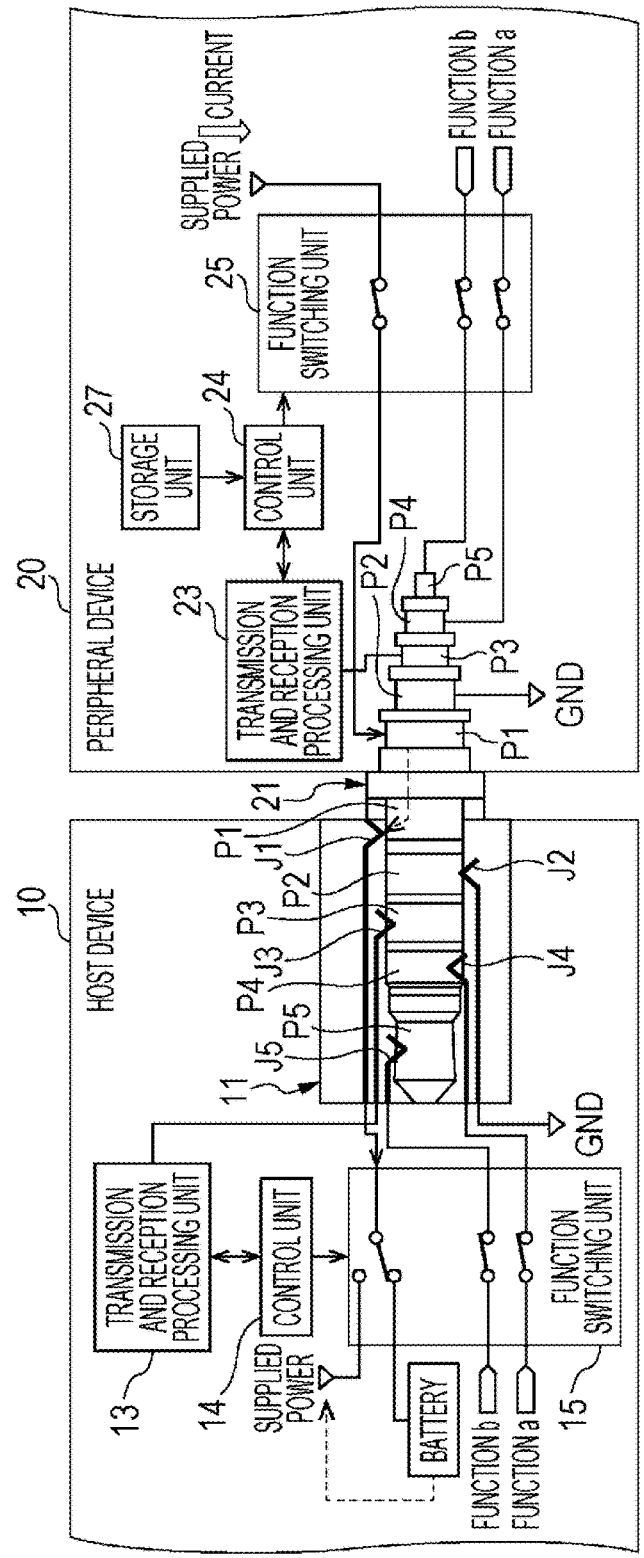
FIG. 17A is a diagram illustrating a method of preventing a power supply from being short-circuited upon insertion and removal of the plug when power that is supplied power is supplied from the peripheral device to the host device.

FIG. 17A illustrates a full insertion state in which the plug 21 is fully inserted into the jack 11.

In FIG. 17A, the terminals J1 to J5 of the jack 11 and the terminals P1 to P5 of the plug 21 intended to be originally connected are short-circuited.

In the full insertion state, the power as a power supply supplied through the power supply function of the peripheral device 20 is supplied to the battery of the host device 10 via the function switching unit 25, the power supply terminal P1 of the plug 21, the power reception terminal J1 of the jack 11, and the function switching unit 15.

Figure 17B:
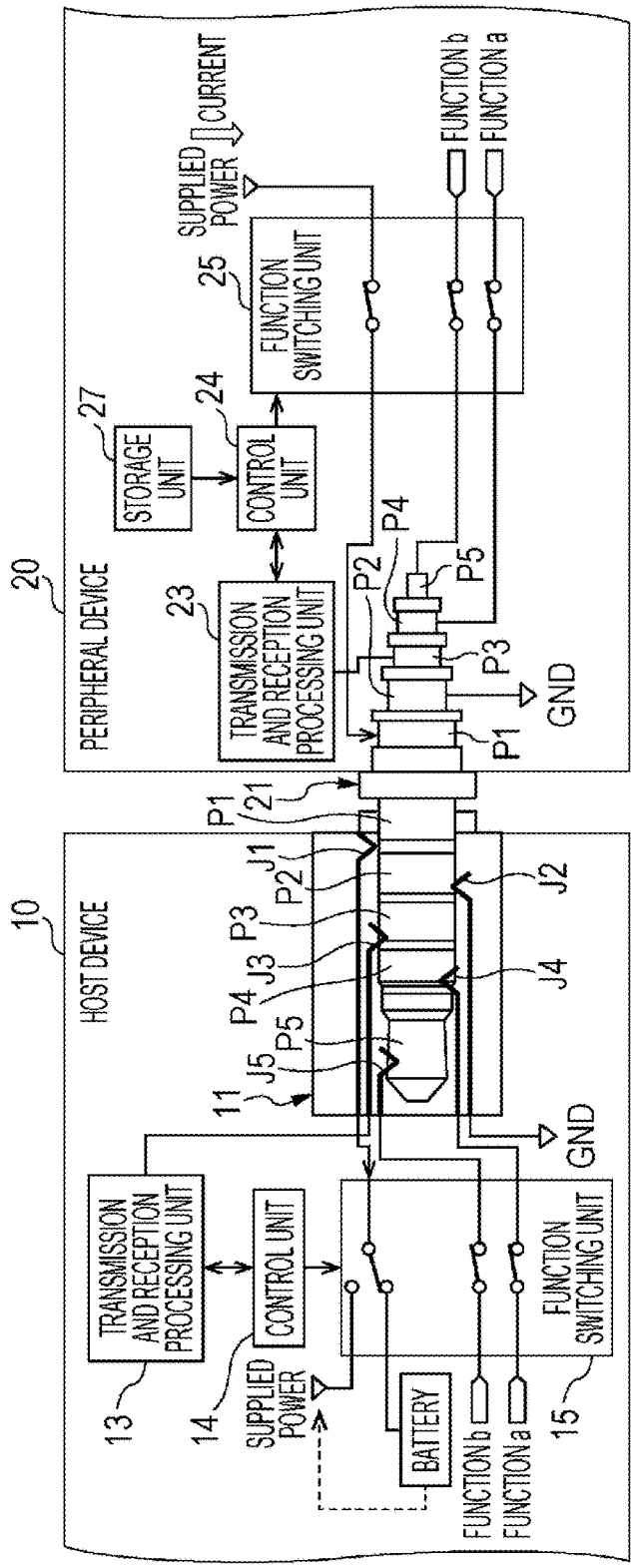
FIG. 17B is a diagram illustrating a method of preventing a power supply from being short-circuited upon insertion and removal of the plug when power that is supplied power is supplied from the peripheral device to the host device.

FIG. 17B illustrates a half insertion state during removal of the plug 21 from the jack 11 from the full insertion state of FIG. 17A.

In the half insertion state of FIG. 17B, the terminal J1 of the jack 11 is short-circuited to the GND terminal P2 of the plug 21, and the terminal J2 of the jack 11 comes in contact with the insulator between the terminals P2 and P3 of the plug 21.

Further, the terminal J3 of the jack 11 comes in contact with an insulator between the terminal P3 and P4 of the plug 21, and the terminal J4 of the jack 11 comes in contact with the insulator between the terminals P4 and P5 of the plug 21.

Further, the terminal J5 of the jack 11 is short-circuited to the terminal P5 of the plug 21, and the power supply terminal P1 of the plug 21 is not short-circuited to any terminal J#n of the jack 11.

As described above, since the power supply terminal P1 of the plug 21 is not short-circuited to any terminal J#n of the jack 11, power that is supplied power is not supplied from the power supply terminal P1 to the terminal J#n of the jack 11 that is not a power reception terminal.

Figure 17C:
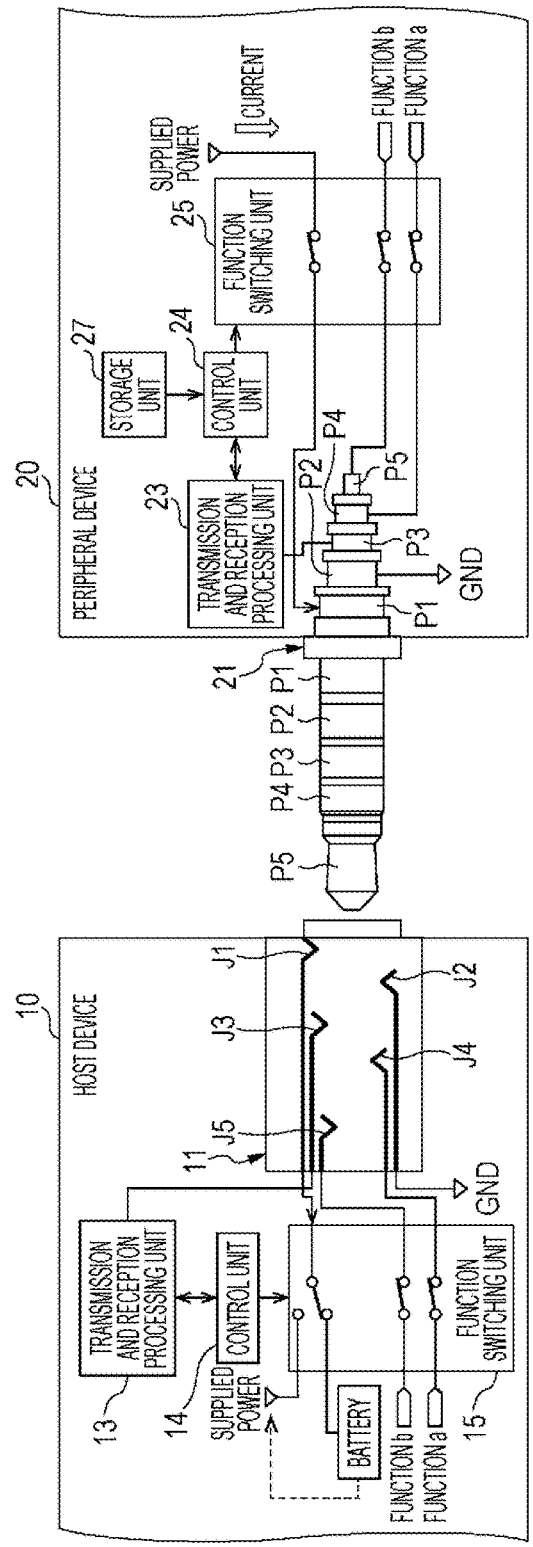
FIG. 17C is a diagram illustrating a method of preventing a power supply from being short-circuited upon insertion and removal of the plug when power that is supplied power is supplied from the peripheral device to the host device.

FIG. 17C illustrates a removal state in which the plug 21 is further removed from the jack 11 from the half insertion state of FIG. 17B and fully removed from the jack 11.

In the removal state, none of the terminals J1 to J5 of the jack 11 are connected to the terminals P1 to P5 of the plug 21.

Therefore, power that is supplied power is not supplied from the power supply terminal P1 to the terminal J#n of the jack 11 that is not a power reception terminal.

Figure 17D:
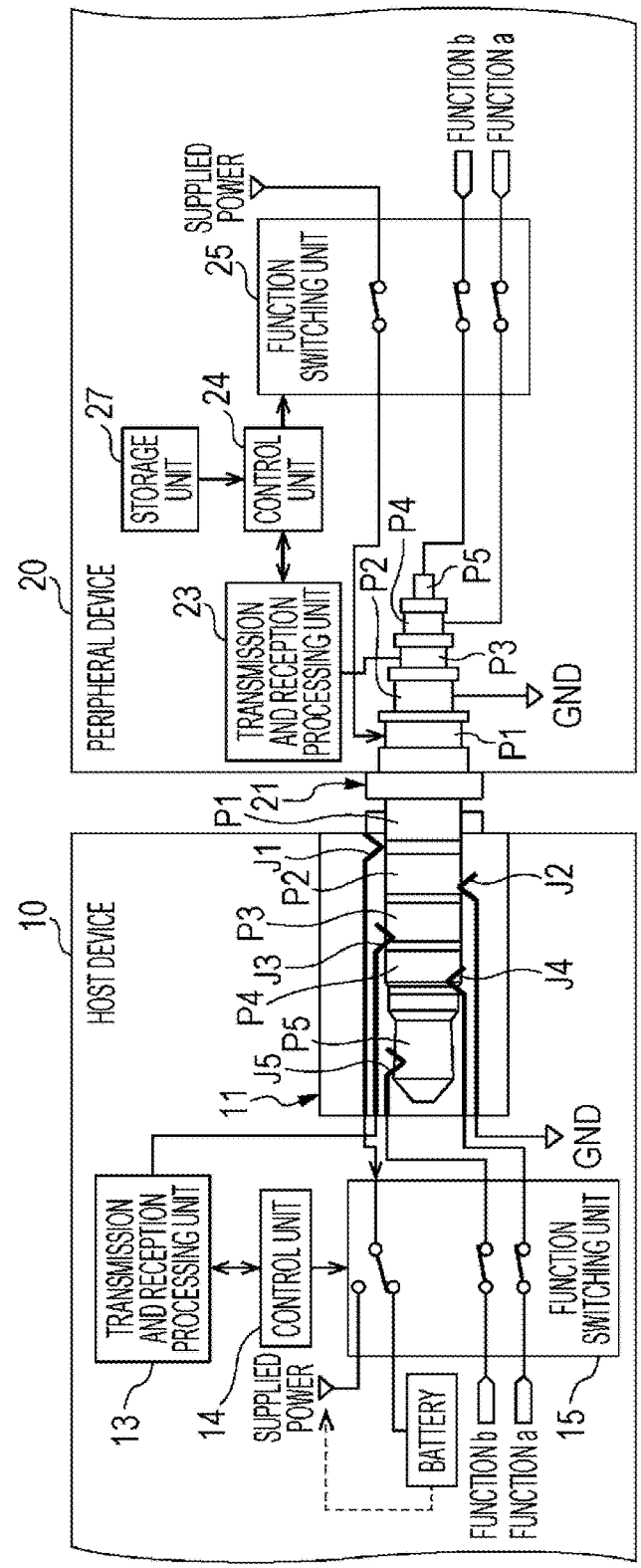
FIG. 17D is a diagram illustrating a method of preventing a power supply from being short-circuited upon insertion and removal of the plug when power that is supplied power is supplied from the peripheral device to the host device.

FIG. 17D illustrates a half insertion state during insertion of the plug 21 into the jack 11 from the removal state of FIG. 17C.

In the half insertion state of FIG. 17D, the state of the jack 11 and the plug 21 becomes the same as the half insertion state of FIG. 17B.

Therefore, since the power supply terminal P1 of the plug 21 is not short-circuited to any terminal J#n of the jack 11, the power that is supplied power is not supplied from the power supply terminal P1 to the terminal J#n of the jack 11 that is not a power reception terminal.

Figure 17E:
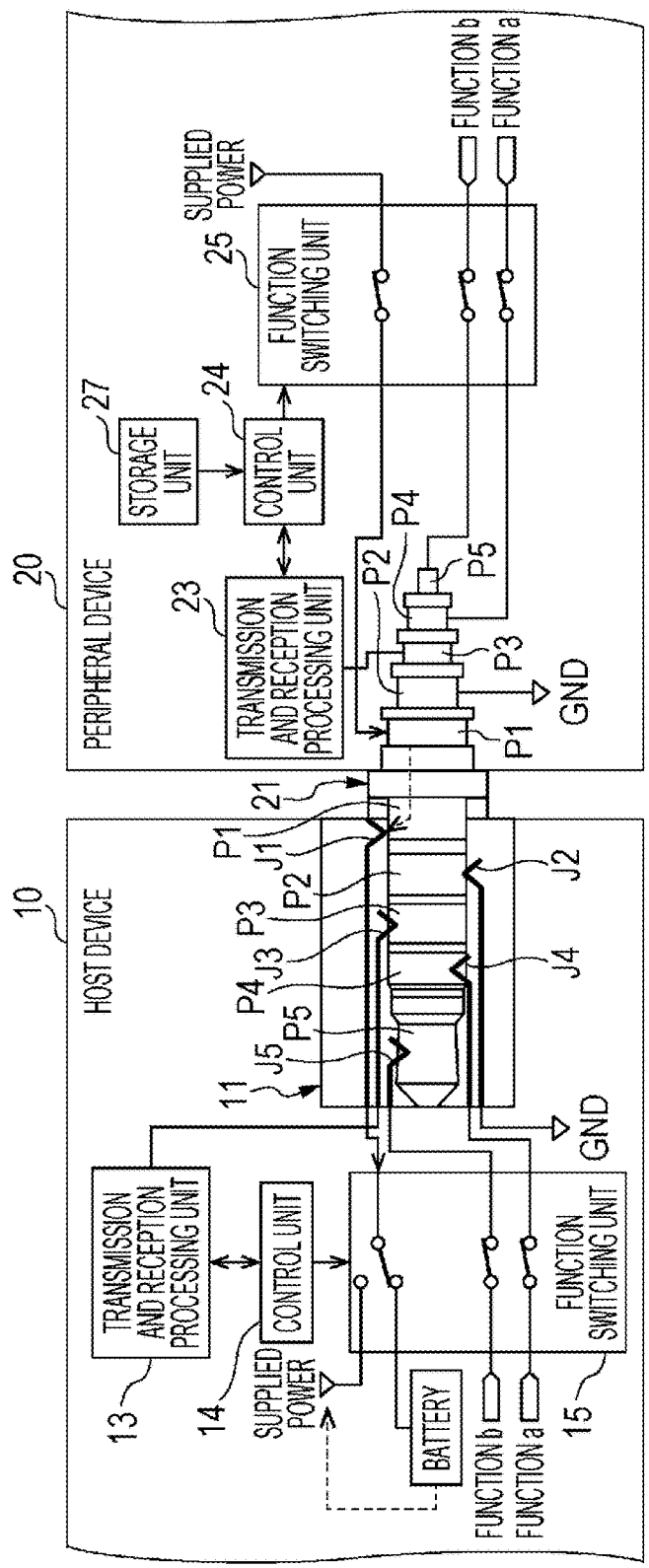
FIG. 17E is a diagram illustrating a method of preventing a power supply from being short-circuited upon insertion and removal of the plug when power that is supplied power is supplied from the peripheral device to the host device.

FIG. 17E illustrates a full insertion state in which the plug 21 is further inserted into the jack 11 from the half insertion state of FIG. 17D and is fully inserted into the jack 11.

In the full insertion state, the terminals J1 to J5 of the jack 11 and the terminals P1 to P5 of the plug 21 intended to be originally connected are short-circuited, as described in FIG. 17A.

Therefore, in the full insertion state, the power provided (supplied) by the power supply function of the peripheral device 20 is provided as a power supply to the battery via the function switching unit 25, the power supply terminal P1 of the plug 21, the power reception terminal J1 of the jack 11, and the function switching unit 15.

As described above, when the function switching unit 15 of the host device 10 connects the battery that receives supply of the power that is supplied power and the terminal J1 on the insertion port side of the jack 11 and uses the terminal J1 as the power reception terminal, and the function switching unit 25 of the peripheral device 20 connects the power supply function (a function of supplying the power that is supplied power) and the terminal P1 on the root side of the plug 21 and uses the terminal P1 as a power supply terminal, that is, when the power supply function is assigned to the terminal J1 on the insertion port side of the jack 11 and the terminal P1 on the root side of the plug 21, the power supply terminal P1 on the root side of the plug 21 is not short-circuited to the power reception terminal J1 on the insertion port side of the jack 11 upon insertion and removal of the plug 21, and thus, when the power that is supplied power is supplied from the peripheral device 20 to the host device 10, it is possible to prevent a power supply short-circuit in which the power supply terminal P1 of the plug 21 is short-circuited to the terminal that is not a power reception terminal upon insertion and removal of the plug 21.

Further, by assigning the power supply function to the terminal J1 on the insertion port side of the jack 11 and the terminal P1 on the root side of the plug 21, when the power supply short-circuit is to be prevented, it is necessary for the function switching unit 15 to switch the assignment of the function of the terminal J#n of the jack 11 according to a specification of the plug of an existing headset to be suitable for the plug after a plug with 3 poles or 4 poles of an existing headset is inserted into the jack 11 and it is detected that the existing headset is not a corresponding device, so as to maintain backward compatibility of the host device 10, as described above.

The same applies to a case in which the backward compatibility of the peripheral device 20 is maintained.

Further, when power that is supplied power is supplied from the host device 10 to the peripheral device 20 in a case in which a power supply short-circuit is prevented according to a scheme of assigning the power supply function to the terminal J#n of the jack 11 and the terminal P#n of the plug 21, it is necessary for the power supply function to be assigned to the terminal J5 on the innermost side of the jack 11 and the terminal P5 on the head side of the plug 21, as described in FIGS. 16A to 16E. On the other hand, when power that is supplied power is supplied from the peripheral device 20 to the host device 10, it is necessary for the power supply function to be assigned to the terminal J1 on the insertion port side of the jack 11 and the terminal P1 on the root side of the plug 21, as described in FIGS. 17A to 17E.

Therefore, in order to cope with both of a case in which power that is supplied power is supplied from the host device 10 to the peripheral device 20 and a case in which the power that is supplied power is supplied from the peripheral device 20 to the host device 10, it is necessary for switching units 15 and 25 to change the terminals J#n and P#n to which the power supply function is assigned depending on a direction in which the power that is supplied power is supplied.

<Description of Computer to which the Present Technology is Applied>

Next, a series of processes of the transmission and reception processing units 13 and 23, the control units 14 and 24, the signal processing unit 18, and the like described above can be performed by hardware or can be performed by software. When the series of processes are performed by software, a program constituting the software is installed in a computer such as a microcomputer.

Therefore, FIG. 18 illustrates a configuration example of an embodiment of a computer in which a program for executing a series of processes described above is installed.

The program can be recorded in a hard disk 105 or a ROM 103 as a recording medium built into the computer in advance.

Alternatively, further, the program can be stored (recorded) in a removable recording medium 111. Such a removable recording medium 111 can be provided as so-called package software. Here, examples of the removable recording medium 111 include a flexible disk, a CD-ROM (Compact Disc Read Only Memory), an MO (Magneto Optical) disk, a DVD (Digital Versatile Disc), a magnetic disk, and a semiconductor memory.

Further, the program can be not only installed in the computer from the removable recording medium 111 as described above, but also downloaded to the computer via a communication network or a broadcasting network and installed in the hard disk 105 built thereinto. That is, for example, the program can be wirelessly transferred from a downloading site to the computer via a satellite for digital satellite broadcasting or can be transferred to the computer via a network such as a LAN (Local Area Network) or the Internet in a wired manner.

The computer has a CPU (Central Processing Unit) 102 built thereinto, and an input-output interface 110 is connected to the CPU 102 via a bus 101.

When an instruction is input via the input-output interface 110, for example, by the user operating the input unit 107, the CPU 102 executes the program stored in the ROM (Read Only Memory) 103 according to the instruction. Alternatively, the CPU 102 may load the program stored in the hard disk 105 to a RAM (Random Access Memory) 104 and execute the program.

Accordingly, the CPU 102 performs the process according to the flowchart described above or the process performed by the configuration of the block diagram described above. Also, for example, the CPU 102 outputs a processing result from an output unit 106 via the input-output interface 110, transmits the processing result from a communication unit 108, or records the processing result on the hard disk 105, as necessary.

Further, the input unit 107 can include a keyboard, a mouse, or a microphone. Further, the output unit 106 can include a LCD (Liquid Crystal Display), a speaker, or the like.

Here, in this specification, the processes that the computer perform according to a program do not have to be necessarily performed in chronological order in the order described in the flowchart. That is, the process that the computer performs according to the program includes a process executed in parallel or individually (for example, a parallel process or an object-based process).

Further, the program may be processed by one computer (processor), or may be processed in a distributed manner by a plurality of computers. Further, the program may be transferred to and executed by a remote computer.

Further, in this specification, the system means a set of a plurality of components (apparatuses, modules (parts), or the like), and it does not matter whether all the components are in the same housing. Therefore, a plurality of apparatuses received in individual housings and connected over a network, and one apparatus in which a plurality of modules are received in one housing are all systems.

Further, the embodiments of the present technology are not limited to the above-described embodiments, and various changes are possible without departing from the gist of the present technology.

For example, the present technology can have a cloud computing configuration to share and process one function in a plurality of devices in conjunction via a network.

Further, each step described in the above-described flowchart can be executed by one device or can be divided and executed by a plurality of devices.

Further, when a plurality of processes are included in one step, the plurality of processes included in one step can be not only executed by one device, but also can be shared and executed by a plurality of devices.

Further, the effects described in this specification are only illustrative, and are not limited. There may be other effects.

For example, a plug that is not the single-headed plug can be adopted as the plug 21. The same applies to the jack 11.

Further, in the host device 10 having the jack 11 with 5 poles and the peripheral device 20 having the plug 21 with 5 poles, it is possible to realize data transfer in a signal standard asking for a signal line used to exchange five or less types of signal including GND by the function switching unit 15 switching a function to be assigned to all of the five terminals J1 to J5 of the jack 11, and the function switching unit 25 switching a function to be assigned to all of the five terminals P1 to P5 of the plug 21.

For example, it is possible to realize data transfer in the USB by assigning D+, D−, power supply (+5 V) and GND of USB to any four terminal sets (J#n, P#n) among the five terminal sets (J1, P1) to (J5, P5). Further, in this case, it is possible to assign, for example, the multiplexing communication function to one remaining terminal set (J#n, P#n).

Specifically, for example, it is possible to assign D+, D−, power supply (+5 V) and GND of the USB to the four terminal sets (J#n, P#n) other than the terminal set (J1, P1) among the five terminal sets (J1, P1) to (J5, P5), and to assign the multiplexing communication function to the terminal set (J1, P1). In this case, the insertion and removal of the plug 21 can be detected based on the communication state of the terminal set (J1, P1), and connection of the terminal set to which the power supply function (power supply (+5 V)) has been assigned to the power supply function is disconnected in the function switching units 15 and 25 at the time of the insertion and removal of the plug 21. Thus, it is possible to realize a technology for preventing an unintended short-circuit.

Further, it is possible to assign (connect) D+, D−, power supply (+5 V) and GND of the USB to the four terminal sets (J#n, P#n) other than the terminal set (J1, P1) among the five terminal sets (J1, P1) to (J5, P5), and to assign, for example, the signal line pulled up by a resistor to the terminal J1 or P1 of the terminal set (J1, P1). In this case, it is possible to detect the insertion and removal of the plug 21 based on transition to pulling-up of the terminal J1 or P1 or transition to pull-down.

Further, for example, it is possible to assign MHL+, MHL−, power supply (+5 V), GND, and CBUS (Control Bus) of MHL (Mobile High-definition Link) to the five terminal sets (J1, P1) to (J5, P5). In this case, it is possible to realize data transfer in the MHL.

For example, when CBUS is assigned to the terminal set (J1, P1) of the terminal J1 on the insertion port side of the jack 11 and the terminal P1 on the root side of the plug 21 in a case in which MHL+, MHL−, power supply (+5 V), GND and CBUS of MHL are assigned to the five terminal sets (J1, P1) to (J5, P5), it is possible to detect the insertion and removal of the plug 21 based on the communication state through CBUS.

Further, when the function of multiplexing communication or other communication is assigned to the terminal set (J1, P1) of the terminal J1 on the insertion port side of the jack 11 and the terminal P1 on the root side of the plug 21, insertion and removal of the plug 21 is detected based on a communication state of the terminal set (J1, P1) of the terminal J1 on the insertion port side the jack 11 and the terminal P1 on the root side of the plug 21, and the connection of the terminal of the jack 11 and the terminal of the plug 21 to the functions assigned to the terminals is disconnected at the time of the insertion and the removal of the plug 21 in the function switching units 15 and 25. Thus, it is possible to realize a technology for preventing an unintended short-circuit.

Further, for example, a multi-pole single-headed plug with 4 poles rather than a multi-pole single-headed plug with 5 poles can be adopted as the plug 21 of the peripheral device 20, and a multi-pole single-headed jack with 4 poles corresponding to the multi-pole single-headed plug with 4 poles as the plug 21 can be adopted as the jack 11 of the host device 10.

In this case, for example, it is possible to assign functions of speaker output (left), speaker output (right), GND, and multiplexing communication to the four terminals from an inner side to a front side of the jack 11 that is a multi-pole single-headed jack with 4 poles as default functions.

Further, for example, when the plug 21 which is a multi-pole single-headed plug with 4 poles is inserted into the jack 11 which is a multi-pole single-headed jack with 4 poles, for example, it is possible for the host device 10 to switch a function to be assigned to four terminals from an inner side to a front side of the jack 11 to functions of speaker output (monaural), power supply, GND, and multiplexing communication depending on the device information of the peripheral device 20, and to supply power that is supplied power of a certain magnitude from the host device 10 to the peripheral device 20.

Further, for example, in the host device 10, it is possible to switch the function to be assigned to four terminals from an inner side to a front side (insertion port) of the jack 11 to functions of multiplexing communication (for multiplexed data transmission), multiplexing communication (for multiplexed data reception), GND, and multiplexing communication (for multiplexed data reception) depending on the device information of the peripheral device 20.

In this case, since the dedicated signal line that transmits multiplexed data to the peripheral device 20 and the dedicated signal line that receives the multiplexed data transmitted from the peripheral device 20 are provided independently in the host device 10, it is possible to independently perform bidirectional communication of the transmission of the multiplexed data to the peripheral device 20 and the reception of the multiplexed data transmitted from the peripheral device 20.

Further, in this case, since two dedicated signal lines for receiving the multiplexed data transmitted from the peripheral device 20 are provided in the host device 10, it is possible to achieve an increase in the number of the channels for a signal multiplexed in the multiplexed data transmitted from the peripheral device 20 to the host device 10 or expansion of a communication band of the multiplexed data.

Further, the function assigned to the terminal J#n of the jack 11 or the terminal P#n of the plug 21 is not limited to the above-described function. That is, the function switching unit 15 or 25 can assign, for example, (a function of transmitting) a CLOCK or DATA signal of I2C or a communication signal of 1-wire to the terminal J#n of the jack 11 or the terminal P#n of the plug 21, and accordingly, the jack 11 or the plug 21 can be used as a flexible interface corresponding to various devices.

Further, the present technology can have the following configurations.

<1>
A peripheral device comprising:
a plug having a plurality of terminals and configured to be removably inserted into a jack of a host device;
at least one processor coupled to a first terminal of the plug, the at least one processor configured to transmit and/or receive multiplexed data via the first terminal;
a detector coupled to the first terminal and configured to detect, when the plug is inserted into the jack, whether the host device is capable of handling the multiplexed data; and
a function switch coupled to at least a second terminal of the plug and configured to assign an electrical function to the second terminal.

<2>
The peripheral device according to <1>,
wherein the function switching unit performs the assignment of the electrical function based at least in part on the host device.

<3>
The peripheral device according to <2>,
wherein the function switching unit performs the assignment of the electrical function based on device information regarding the host device.

<4>
The peripheral device according to <3>,
wherein the device information is received from the host device by the transmission and reception processing unit.

<5>
The peripheral device according to any one of <1> to <4>,
wherein the plug is a single-headed plug.

<6>
The peripheral device according to any one of <1> to <5>,
wherein the first terminal is a terminal on a root side of the plug.

<7>
The peripheral device according to any one of <1> to <6>,
wherein the function switching unit selects the electrical function to be assigned to the second terminal from among a plurality of functions.

<8>
The peripheral device according to any one of <1> to <7>,
wherein the plurality of functions includes a function of transferring power.

<9>
The peripheral device according to <1> to <8>,
wherein when the function of transferring power is assigned to the second terminal and power is supplied from the second terminal to the host device, the power is controlled based at least in part on a communication state of the multiplexed data.

<10>
A processing method for a peripheral device, the peripheral device comprising a plug having a plurality of terminals and configured to be removably inserted into a jack of a host device, at least one processor coupled to a first terminal of the plug, the at least one processor configured to transmit and/or receive multiplexed data via the first terminal, and a detection unit coupled to the first terminal and configured to detect, when the plug is inserted into the jack, whether the host device is capable of handling the multiplexed data, the method comprising:
causing the peripheral device to assign an electrical function to a second terminal, different from the first terminal.

<11>
A host device comprising:
a jack having a plurality of terminals and configured to receive a plug of a plug device;
at least one processor coupled to a first terminal of the jack, the at least one processor configured to transmit and/or receive multiplexed data via the first terminal;
a detection unit coupled to the first terminal and configured to detect, when the plug is inserted into the jack, whether the plug device is capable of handling the multiplexed data; and
a function switching unit coupled to at least a second terminal of the jack and configured to assign an electrical function to the second terminal.

<12>
The host device according to <11>,
wherein the function switching unit performs the assignment of the electrical function based at least in part on the plug device.

<13>
The host device according to any one of <11> to <12>,
wherein the function switching unit performs the assignment of the electrical function based on device information regarding the plug device.

<14>
The host device according to any one of <11> to <13>,
wherein the device information is received from the plug device by the transmission and reception processing unit.

<15>
The host device according any one of <11> to <14>,
wherein the jack is a single-headed jack into which a single-headed plug may be inserted.

<16>
The host device according to any one of <11> to <15>,
wherein the first terminal is a terminal on an insertion port side of the jack.

<17>
The host device according to any one of <11> to <16>,
wherein the function switching unit selects the electrical function to be assigned to the second terminal from among a plurality of functions.

<18>
The host device according to any one of <11> to <17>,
wherein the plurality of functions includes a function of transferring power.

<19>
The host device according to <18>,
wherein when the function of transferring power is assigned to the second terminal and power is supplied from the second terminal to the plug device, the power is controlled based at least in part on a communication state of the multiplexed data.

<20>
A processing method for a host device, the host device comprising a jack having a plurality of terminals and configured to receive a plug of a plug device, at least one processor coupled to a first terminal of the jack, the at least one processor configured to transmit and/or receive multiplexed data via the first terminal, and a detection unit coupled to the first terminal and configured to detect, when the plug is inserted into the jack, whether the plug device is capable of handling the multiplexed data, the method comprising:
causing the host device to assign an electrical function to a second terminal, different from the first terminal.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Host device
11 Jack
12 Correspondence detection unit
13 Transmission and reception processing unit
14 Control unit
15 Function switching unit
$16_1$ to $16_K$ Functional block
17 Storage unit
18 Signal processing unit
21 Plug
22 Correspondence detection unit
23 Transmission and reception processing unit
24 Control unit
25 Function switching unit
$26_1$ to $26_L$ Functional block
27 Storage unit
$28_1$ to $28_R$ I/F
101 Bus
102 CPU
103 ROM
104 RAM
105 Hard disk
106 Output unit
107 Input unit
108 Communication unit
109 Drive
110 Input-output interface
111 Removable recording medium

The invention claimed is:
1. A peripheral device comprising:
a plug having a plurality of terminals and configured to be removably inserted into a jack of a host device;
at least one processor coupled to a first terminal of the plug, the at least one processor configured to transmit and/or receive multiplexed data via the first terminal;
a detector coupled to the first terminal and configured to detect whether multiplexed data received by the first terminal contains a predetermined authentication pattern indicative of a function switching capability; and
a function switching unit coupled to at least a second terminal of the plug and configured to, based at least in part on detection of the predetermined authentication pattern by the detector:
select a functional block from amongst a plurality of functional blocks, wherein each of the plurality of functional blocks has one of a plurality of different associated electrical functions; and
assign an electrical function associated with the selected functional block to at least the second terminal of the plug.

2. The peripheral device according to claim 1, wherein the function switching unit performs the assignment of the electrical function based at least in part on the host device.

3. The peripheral device according to claim 2, wherein the function switching unit performs the assignment of the electrical function based on device information regarding the host device, the device information comprising an indication of at least one characteristic of the host device.

4. The peripheral device according to claim 3, wherein the device information is received from the host device by the at least one processor via the first terminal.

5. The peripheral device according to claim 1, wherein the plug is a single-headed plug.

6. The peripheral device according to claim 1, wherein the first terminal is a terminal on a root side of the plug.

7. The peripheral device according to claim 1, wherein assigning the electrical function associated with the selected functional block to the second terminal of the plug comprises electrically connecting the second terminal of the plug to the selected functional block.

8. The peripheral device according to claim 1, wherein the plurality of functional blocks includes a functional block configured to provide a function of transferring power.

9. The peripheral device according to claim 8, wherein when the function of transferring power is assigned to the second terminal and power is supplied via the second terminal, the power is controlled based at least in part on a communication state of the multiplexed data.

10. A processing method for a peripheral device, the method comprising:
causing a peripheral device to, based at least in part on detection of a predetermined authentication pattern by a detection unit of the peripheral device, wherein the peripheral device comprises a plug having a plurality of terminals and configured to be removably inserted into a jack of a host device, at least one processor coupled to a first terminal of the plug, the at least one processor configured to transmit and/or receive multiplexed data via the first terminal, and the detection unit being coupled to the first terminal and configured to detect whether multiplexed data received by the first terminal contains the predetermined authentication pattern, the pattern being indicative of a function switching capability:
select a functional block from amongst a plurality of functional blocks, wherein each of the plurality of functional blocks has one of a plurality of different associated electrical functions; and
assign an electrical function associated with the selected functional block to at least a second terminal of the plurality of terminals, different from the first terminal.

11. A host device comprising:
a jack having a plurality of terminals and configured to receive a plug of a plug device;

at least one processor coupled to a first terminal of the jack, the at least one processor configured to transmit and/or receive multiplexed data via the first terminal;

a detection unit coupled to the first terminal and configured to detect whether multiplexed data received by the first terminal contains a predetermined authentication pattern indicative of a function switching capability; and a function switching unit coupled to at least a second terminal of the jack and configured to, based at least in part on detection of the predetermined authentication pattern by the detection unit:

select a functional block from amongst a plurality of functional blocks, wherein each of the plurality of functional blocks has one of a plurality of different associated electrical functions; and assign an electrical function associated with the selected functional block to at least the second terminal of the jack.

12. The host device according to claim 11, wherein the jack is a single-headed jack into which a single-headed plug may be inserted.

13. The host device according to claim 11, wherein the first terminal is a terminal on an insertion port side of the jack.

14. The host device according to claim 11, wherein assigning the electrical function associated with the selected functional block to at least the second terminal of the jack is based at least in part on device information regarding the plug device received from the plug device via the first terminal.

15. The host device according to claim 11, wherein the plurality of functional blocks includes a functional block configured to provide a function of transferring power.

16. The host device according to claim 15, wherein when the function of transferring power is assigned to the second terminal and power is supplied via the second terminal, the power is controlled based at least in part on a communication state of the multiplexed data.

17. A processing method for a host device, the method comprising:

causing a host device to, based at least in part on detection of a predetermined authentication pattern by a detection unit of the host device, wherein the host device comprises a jack having a plurality of terminals and configured to receive a plug of a plug device, at least one processor coupled to a first terminal of the jack, the at least one processor configured to transmit and/or receive multiplexed data via the first terminal, and the detection unit being coupled to the first terminal and configured to detect whether multiplexed data received by the first terminal contains the predetermined authentication pattern, the pattern being indicative of a function switching capability:

select a functional block from amongst a plurality of functional blocks, wherein each of the plurality of functional blocks has one of a plurality of different associated electrical functions; and assign an electrical function associated with the selected functional block to at least a second terminal of the plurality of terminals, different from the first terminal.

* * * * *